(12) United States Patent
Haruta et al.

(10) Patent No.: US 7,781,033 B2
(45) Date of Patent: Aug. 24, 2010

(54) OPTICAL FILM, METHOD OF PRODUCING THE SAME, OPTICAL COMPENSATORY FILM, POLARIZING FILM, AND LIQUID CRYSTAL DISPLAY DEVICE

(75) Inventors: Hiromoto Haruta, Minami-ashigara (JP); Osamu Takahashi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 887 days.

(21) Appl. No.: 11/480,467

(22) Filed: Jul. 5, 2006

(65) Prior Publication Data

US 2007/0048458 A1 Mar. 1, 2007

(30) Foreign Application Priority Data

Jul. 6, 2005 (JP) .............................. 2005-197913

(51) Int. Cl.
*G02F 1/1335* (2006.01)

(52) U.S. Cl. .................. 428/1.3; 428/1.31; 428/1.33; 349/96; 349/117; 349/122; 427/162

(58) Field of Classification Search ................ 428/1.33, 428/1.51, 1.62, 1.3, 1.31; 349/96, 117–118, 349/122; 427/162; 252/299.01
See application file for complete search history.

(56) References Cited

U.S. PATENT DOCUMENTS

| 3,527,660 | A | * | 9/1970 | Selby ....................... 427/372.2 |
| 5,914,073 | A | * | 6/1999 | Kobayashi et al. .......... 252/585 |
| 6,008,940 | A | * | 12/1999 | Michihata et al. ........... 359/483 |
| 6,291,371 | B1 | * | 9/2001 | Shefer et al. ................... 442/96 |
| 6,565,974 | B1 | * | 5/2003 | Uchiyama et al. ........... 428/412 |
| 6,835,425 | B2 | * | 12/2004 | Fukuda et al. ............... 427/569 |
| 6,881,457 | B2 | * | 4/2005 | Tasaka et al. ................. 428/1.3 |
| 7,060,333 | B2 | * | 6/2006 | Takeuchi et al. ............. 428/1.3 |
| 7,078,078 | B2 | * | 7/2006 | Ito ............................. 428/1.1 |
| 7,220,460 | B2 | * | 5/2007 | Murakami et al. .......... 427/491 |
| 7,371,439 | B2 | * | 5/2008 | Matsunaga et al. ........... 428/1.3 |
| 7,421,974 | B2 | * | 9/2008 | Fukuda et al. ........... 118/723 E |
| 7,542,207 | B2 | * | 6/2009 | Matsunaga .................. 359/599 |
| 2002/0018956 | A1 | * | 2/2002 | Levy et al. .................... 430/202 |
| 2002/0041352 | A1 | * | 4/2002 | Kuzuhara et al. ........... 349/117 |
| 2002/0145691 | A1 | * | 10/2002 | Ito ............................. 349/117 |
| 2003/0067572 | A1 | * | 4/2003 | Umeda et al. ............... 349/117 |
| 2003/0113483 | A1 | * | 6/2003 | Tanaka ....................... 428/1.1 |
| 2003/0155558 | A1 | * | 8/2003 | Yamazaki .................... 252/585 |
| 2003/0156235 | A1 | * | 8/2003 | Kuzuhara et al. ............. 349/96 |
| 2003/0224113 | A1 | * | 12/2003 | Nakamura et al. ....... 427/372.2 |
| 2004/0027509 | A1 | * | 2/2004 | Arai et al. ..................... 349/56 |

(Continued)

FOREIGN PATENT DOCUMENTS

JP 2000-111914 * 4/2000

(Continued)

*Primary Examiner*—Sophie Hon
(74) *Attorney, Agent, or Firm*—Buchanan Ingersoll & Rooney PC

(57) ABSTRACT

An optical film comprising a layer consisting mainly of an organic compound and a layer containing inorganic fine particles wherein a content of the organic compound having a molecular weight of 1000 or less is 30% by mass or less based on a content of the inorganic fine particles. The optical film exhibits a low haze and a high contrast when being assembled into a liquid crystal display device.

13 Claims, 1 Drawing Sheet

| 6 |
|---|
| 5 |
| 4 |
| 3 |
| 2 |

U.S. PATENT DOCUMENTS

| | | | |
|---|---|---|---|
| 2004/0036828 A1* | 2/2004 | Aminaka et al. | 349/117 |
| 2004/0077752 A1* | 4/2004 | Matsufuji et al. | 524/37 |
| 2004/0080693 A1* | 4/2004 | Kuzuhara et al. | 349/117 |
| 2004/0086663 A1* | 5/2004 | Takeda et al. | 428/1.1 |
| 2004/0096594 A1* | 5/2004 | Takeuchi et al. | 428/1.2 |
| 2005/0106334 A1* | 5/2005 | Kubo et al. | 428/1.31 |
| 2005/0142304 A1* | 6/2005 | Kawanishi et al. | 428/1.31 |
| 2007/0077373 A1* | 4/2007 | Haruta et al. | 428/1.31 |

FOREIGN PATENT DOCUMENTS

WO     WO 02/073252 A1 *   9/2002

* cited by examiner

US 7,781,033 B2

OPTICAL FILM, METHOD OF PRODUCING THE SAME, OPTICAL COMPENSATORY FILM, POLARIZING FILM, AND LIQUID CRYSTAL DISPLAY DEVICE

BACKGROUND OF THE INVENTION

1. Field of the Invention

The present invention relates to an optical film that exhibits a low haze and a high contrast when being assembled into a liquid crystal display device, and method of producing the same. In particular, this invention relates to an optical compensatory film using the optical film, a polarizing film, and a liquid crystal display device.

2. Description of the Related Art

A liquid crystal display device has been widely used as an image display device that is capable of reducing power consumption and size. Conventionally, one of major disadvantages of the liquid crystal display device is high viewing angle dependency of images. However, in recent years, a VA liquid crystal mode with wide viewing angle has been put to practical use, thereby remarkably increasing demand for the liquid crystal display device in a market that requires high quality image such as television. For this reason, it is required for the liquid crystal display device, to improve the optical compensating function of optical compensatory members such as cellulose acylate film that is used for improving color, contrast, and viewing angle dependency.

Generally, the cellulose acylate film is produced by adding inorganic fine particles or an additive into the cellulose acylate solution dope, and then casting them. In this case, in the cellulose acylate solution dope, the inorganic fine particles are generally used as a matting agent so as to prevent the adhesion of film during the winding-up. However, when adding the inorganic fine particles, there are problems in that a haze of the obtained film increases and the black brightness of the liquid crystal display device with the film becomes high during black display, which causes the remarkable deterioration of the brightness. In order to cope with the above problems, a technique that hydrophobized particles are used in a process of dissolving the matting agent in the dope so as to prevent re-aggregation of the dispersed matting agent is disclosed (see JP-A No. 2001-2799). Further, in connection with a phenomenon that the haze of the stretched film increase due to the craze of the cellulose acylate, an additive that has a melting point or glass transition point (Tg) lower than the cellulose acylate is used to increase the concentration of the additive near the particles. Accordingly, it is possible to prevent the generation of craze near the particles, and to reduce the haze (see JP-A No. 2003-301049).

In recent years, it is suggested to manufacture an optical compensatory film having a high retardation value that is capable of being used even when the optical anisotropy is demanded by using a cellulose acylate film. In order to obtain high optical anisotropy, the film is generally added with a hydrophobic retardation regulating agent with high reflective index. Furthermore, in the future, it is required to improve the function of the optical compensatory film by using an additive that functions as an ultraviolet absorber and a moisture permeability regulating agent in the optical compensatory film.

However, when the additive containing the above organic compounds is added to the film, there are problems in that the haze of the optical film increases and the contrast of the liquid crystal display device using the above-mentioned film is remarkably deteriorated. Even though the technologies disclosed in JP-A Nos. 2001-2799 and 2003-301049 are used, it is difficult to satisfactorily suppress the increase in the haze of the optical film and the degradation of the contrast of the liquid crystal display device that uses the film. The above-mentioned problems are remarkable in the case of film to which a hydrophobic retardation regulating agent with high reflective index is added and in the case when high retardation is required.

SUMMARY OF THE INVENTION

Accordingly, in consideration of the above-mentioned problems, it is an object of the present invention to provide an optical film that exhibits a low haze and high contrast when being assembled into the liquid crystal display device even though the film contains an additive consisting of organic compounds and inorganic fine particles. Further, another object of the present invention is to provide a method of efficiently producing the optical film as mentioned above. Furthermore, still another object of the invention is to provide an optical compensatory film with an excellent optical property, a polarizing film, and a liquid crystal display device with a high contrast.

The present inventors of the invention have made extensive studies, as a result, have found that the above-mentioned problems are solved by the invention having the followings:

[1] An optical film comprising:

a layer consisting mainly of an organic compound; and a layer containing inorganic fine particles wherein a content of the organic compound having a molecular weight of 1000 or less is 30% by mass or less based on a content of the inorganic fine particles.

[2] An optical film produced by discharging the following two solutions from different dies for casting;

a solution consisting mainly of an organic compound, and a solution containing inorganic fine particles wherein a content of the organic compound having a molecular weight of 1000 or less is 30% by mass or less based on a content of the inorganic fine particles.

[3] The optical film according to [1] or [2], in which C log P of the organic compound satisfies the following Equation A.

$$13 < C \log P < 20 \qquad (A)$$

[4] The optical film according to any one of [1] to [3] in which the organic compound is a retardation regulating agent expressing positive or negative retardation.

[5] The optical film according to [4] in which the retardation regulating agent is a compound having two or more aromatic and/or cycloalkyl rings in a molecule.

[6] The optical film according to [4] or [5] in which the retardation regulating agent is a compound represented by the following Formula (1):

Formula (1)

wherein $Ar^1$ and $Ar^3$ each independently represent an aryl group or an aromatic heterocyclic group, $Ar^2$ represents an arylene group or a divalent aromatic heterocyclic group, $L^1$ and $L^2$ each independently represent a single bond or a divalent linking group. n represents an integer of 3 or more, $Ar^2$'s may be the same or different from each other, and $L^2$'s may be also the same or different from each other.

[7] The optical film according to any one of [1] to [6] in which the inorganic fine particles comprise silicon.

[8] The optical film according to any one of [1] to [7] in which methanol wettability (MW) of the inorganic fine particles satisfies the following Equation (B).

$$0 \leq MW \leq 80 \tag{B}$$

[9] The optical film according to any one of [1] to [8] in which wherein a primary particle size of the inorganic fine particles is 100 nm or less.

[10] The optical film according to any one of [1] to [9] in which a main component constituting the film is cellulose acylate.

[11] The optical film according to any one of [1] to [10] in which the layer containing the inorganic fine particles is disposed as an outermost layer

[12] A method of producing an optical film comprising:
discharging a solution consisting mainly of an organic compound, and a solution containing inorganic fine particles in which a content of the organic compound having a molecular weight of 1000 or less is 30% by mass or less based on a content of the inorganic fine particles, from different dies for casting.

[13] The method according to [12], further including:
stretching the film produced by the casting.

[14] An optical film produced by the method according to [12] or [13].

[15] An optical compensatory film using the optical film according to any one of [1] to [11] and [14].

[16] A polarizing plate including: a polarizer; and two protective films disposed on both sides of the polarizer, in which at least one protective film is the optical film according to any one of [1] to [11] and [14].

[17] A liquid crystal display including a liquid crystal cell; and two polarizing plates disposed on both sides of the liquid crystal cell, in which at least one polarizing plate is the polarizing plate according to [16].

DESCRIPTION OF THE PREFERRED EMBODIMENTS

Figure 1:
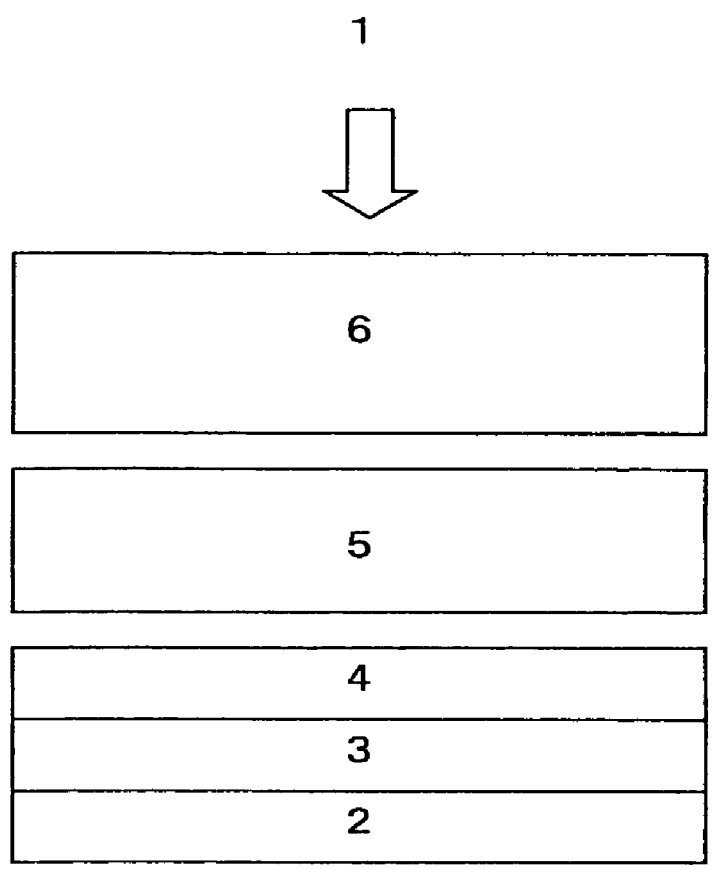
FIG. 1 is a cross-sectional view schematically showing an example of layers of a liquid crystal display device to an embodiment of the present invention.

An optical film according to exemplary embodiments of the invention will now be described in detail. Even though the following description of components is made on the basis of the representative embodiments of the invention, the invention is not limited to the embodiments. Further, in this specification, the numerical range represented by "to" refers the range containing the number described before and after "to" as upper limit and lower limit.

Characteristic of Optical Film of This Invention

An optical film according to an embodiment of the invention includes a layer consisting mainly of an organic compound, and a layer containing inorganic fine particles in which a content of an organic compound having a molecular weight of 1000 or less is 30% by mass or less of a content of the inorganic fine particles.

In the layer consisting mainly of the organic compound, the organic compound is 50% by mass or more of compounds forming the layer. The organic compound is preferably 50% by mass or more, more preferably 70% by mass or more, and most preferably 90% by mass or more. The organic compound is not limited to an organic compound having a molecular weight of 1000 or less. For example, when the layer is mainly formed of a high molecular organic compound such as a cellulose acylate, the cellulose acylate may be included as the organic compound. In the layer consisting mainly of the organic compound, the organic compound having a molecular weigh of 1000 or less and having a function for adjusting the physical property or optical property of the optical film is preferably included. The kinds or specific examples of the organic compounds will be described later. The content of the inorganic fine particles in the layer consisting mainly of the organic compound is preferably 5% by mass or less, more preferably 1% by mass or less, further preferably 0.5% by mass or less. Most preferably, the content of the inorganic fine particles in the layer consisting mainly of the organic compound is 0% by mass.

To obtain effects of the invention, in the layer that contains the inorganic fine particles so that the content of the organic compound having the molecular weight of 1000 or less is 30% by mass or less based on the inorganic particle content (hereinafter, referred to as the layer containing the inorganic fine particles for the convenience of description), the content of the organic compound having the molecular weigh of 1000 or less is preferably 10% by mass or less, and more preferably 5% by mass or less, based on the inorganic particle content.

The layer that contains the inorganic fine particles so that the content of the organic compound having the molecular weight of 1000 or less is 30% by mass or less based on the inorganic particle content is formed on at least one side of the layer consisting mostly of the organic compound. The layer containing the inorganic fine particles may be formed on both sides of the layer consisting mostly of the organic compound. An intermediate layer such as an adhesive layer may be formed between the layer consisting mostly of the organic compound and the layer containing the inorganic fine particles. Furthermore, the protective layer may be additionally formed on the layer containing the inorganic fine particles (surface). Preferably, the layer containing the inorganic fine particles is the outermost layer (surface layer).

The layer containing the inorganic fine particles includes the inorganic fine particles as an essential component. The kind, shape, and examples of the inorganic fine particles capable of being included in the layer containing the inorganic fine particles will be described later. The inorganic particle content of the layer containing the inorganic fine particles is preferably 0.0001 to 20% by mass, more preferably 0.0005 to 1% by mass, and much more preferably 0.001 to 0.1% by mass. The content of the organic compound having the molecular weight of 1000 or less in the layer containing the inorganic fine particles is 30% by mass or less based on the inorganic particle content. The content of the organic compound having the molecular weight of 1000 or less is preferably 0.1% by mass or less, more preferably 0.01% by mass or less, and much more preferably 0.001% by mass or less. Most preferably, the organic compound having the molecular weight of 1000 or less is not contained (0% by mass). The organic compound having the molecular weight of 1000 or less included in the layer containing the inorganic fine particles may or may not be the same as the organic compound contained in the layer consisting mostly of organic compound. Additionally, the organic compounds may or may not be partially the same as each other in both layers. The kind and examples of the organic particle that has the molecular weight of 1000 or less and is included in the layer containing the inorganic fine particles will be described later. Furthermore, a polymer organic compound such as cellulose acylate may be included in the layer containing the inorganic fine particles as a main material constituting the layer.

The thickness of the layer consisting mostly of the organic compound is preferably 30 to 200 μm, more preferably 50 to 150 μm, and much more preferably 70 to 100 μm. Furthermore, the thickness of the layer containing the inorganic fine particles is preferably 0.1 to 20 μm, more preferably 0.5 to 10 μm, and much more preferably 1 to 5 μm. The total thickness of the optical film of the invention depends on the structure or the purpose of the optical film, but is preferably 35 to 200 μm, more preferably 55 to 150 μm, and much more preferably 75 to 105 μm. In addition, examples of the shape of optical film of the invention are not limited to, but include a sheet and a roll. Typically, the film is produced in the roll shape during a production process and used in the sheet shape.

It is preferable that a haze of the optical film of the invention be 0.01 to 2.0%. The haze is more preferably 0.05 to 1.5%, and much more preferably 0.1 to 1.0%. Method of measuring a mass ratio of the inorganic fine particles and the organic compound The thin film, in detail, the thin film containing the inorganic fine particles formed on the layer consisting mostly of the organic compound is obliquely cut to form a cut section having a sufficient area (target side to be analyzed) so as to detect whether the specific component is present or not in the cut section of the thin film or to measure distribution of the specific component, thereby analyzing the mass ratio of the inorganic fine particles and the organic compound.

A method applied to this analysis is not limited as long as the method can qualitatively or quantitatively detect the specific component from the cut section according to the purpose. The method may be appropriately selected according to the kind of specific component and a needed detection precision. In connection with this, examples of the representative method include a TOF-SIMS analysis.

Hereinafter, a detailed description will be given of application of microtome cutting and the TOF-SIMS methods to the above-mentioned analysis when the inorganic fine particles and the organic compounds having the molecular weight of 1000 or less are selected from the layer that contains the inorganic fine particles so that the content of the organic compound having the molecular weight of 1000 or less is 30% by mass or less based on the inorganic particle content according to the invention.

The TOF-SIMS method is an abbreviation for Time-of-Flight Secondary Ion Mass Spectrometry, and a method in which secondary ions such as molecular ions or fragment ions emitted from molecules of the sample are measured using radiation of primary ions such as $Ga^+$ and $In^+$ to obtain an ion image reflecting the structure of the organic compound present on a surface of the solid sample.

A spatial resolution of the ion image is 0.1 to 0.2 μm in the TOF-SIMS method. However, if the thickness of the layer that contains the inorganic fine particles so that the content of the organic compound having the molecular weight of 1000 or less is 30% by mass or less based on the inorganic particle content according to the invention is as thin as 1 to 10 μm, the spatial resolution may be undesirable even though the section that is taken by vertically cutting the layer with respect to a surface of an image display layer is measured using the TOF-SIMS method.

In this case, it is effective to measure the cut section using the TOF-SIMS method after the layer is obliquely cut at an angle of 0.02 to 5° with respect to the surface of the image display layer using the microtome to extend a length of the transversely cut section of the image display layer 10 to 2800 times.

The detection of the secondary ions using the TOF-SIMS method is possible with respect to both cations and anions, but, in the present aspect of the invention, the cations are selected. Total secondary ions of 0 to 1000 amu (atommass unit) are measured in a raw data form in the same region of the cut section of the image display layer. Furthermore, a flood gun is used to neutralize a charge-up of the surface of the sample during the measurement.

With respect to mapping data of the total cations of 0 to 1000 amu produced using the TOF-SIMS method, an ion mapping structure that has the corresponding mass to molecular ions corresponding to a cation portion of the inorganic fine particles and the organic compound having the molecular weight of 1000 or less, or fragment ions reflecting the chemical structures of the inorganic fine particles and the organic compound having the molecular weight of 1000 or less may be obtained using the 3.41 version of the Win Cadence software (Hereinafter, referred to as Cadence software) manufactured by Physical Electronics, Inc. (PHI).

Alternatively, the cut section of the thin film may be analyzed using a μ-ESCA method.

As a representative example of the analysis method, the analysis method for distribution of the inorganic fine particles and the organic compound having the molecular weight of 1000 or less as the specific components was described. However, in the analysis method of the invention, it is possible to simultaneously analyze a plurality of components by selecting substances capable of being distinguished as the specific components.

In addition to the above-mentioned method, an analysis method such as micro FT-IR may be used according to the purpose as long as distinguishing for the specific component is possible.

The organic compound having the molecular weight of 1000 or less (Kind, Properties, and Amount of the Organic Compound Added)

Examples of the kind of the organic compound that is capable of being applied to the optical film of the invention and has the molecular weight of 1000 or less are not limited. It is preferable that the organic compound have a function capable of controlling physical or optical properties of the optical film of the invention. Examples of the organic compound include an ultraviolet absorber, a deterioration preventing agent, a peeling agent, an IR absorber, a retardation regulating agent, a water-permeability reducing agent, a cross-linking agent, and a plasticizer. The organic compound having the molecular weight of 1000 or less may be a solid or an oily substance, but the kind is not limited in view of a melting point or a boiling point. For example, the UV absorbing material having the melting point of 20° C. or lower and the UV absorbing material having the melting point of 20° C. or higher may be combined, and the plasticizers may be combined in the same manner. These combinations are disclosed in JP-A No. 2001-151901. Furthermore, a description of an IR absorption dye is disclosed in JP-A No. 2001-194522. When the optical film of the invention is produced, a time for adding the organic compound having the molecular weight of 1000 or less may be in any step of a process of producing a dope. Additionally, a process of adding an additive may be further conducted in a final step of the process of producing the dope.

The amount of the organic compound added is not limited as long as the desired function of the organic compound is assured. If the organic compounds having the same kind of function are added to a plurality of layers, the organic compounds added to the layers are the same as or different from each other in terms of the kind and amount. In addition, if the same organic compound is added to a plurality of layers, additives added to the layers may be the same as or different from each other. For example, an organic compound that is capable of being added to a film consisting mostly of cellulose acylate (cellulose acylate film) is disclosed in JP-A No. 2001-151902. Particularly, it is preferable to use the organic compound disclosed in pages 16 to 22 of Journal of Technical Disclosure issued by Japan Institute of Invention and Innovation No. 2001-1745 (Mar. 15, 2001, Japan Institute of Invention and Innovation).

The organic compound having the molecular weight of 1000 or less that is used in the optical film of the invention preferably has C log P satisfying the following Equation (A).

$$13 < C \log P < 20 \quad (A)$$

In the Equation, C log P denotes a distribution coefficient of octanol-water. In the invention, the distribution coefficient is calculated using a log P calculation program (C LOG P program organized using PC Models manufactured by Daylight Chemical Information Systems, Inc.).

With respect to the C log P value of the organic compound having the molecular weight of 1000 or less, a range of $13 < C \log P < 20$ is preferable, a range of $14 < C \log P < 19$ is more preferable, and a range of $15 < C \log P < 18$ is much more preferable.

Hereinafter, a detailed description will be given of functions of the exemplified organic compound that has the molecular weight of 1000 or less and is preferably used in the optical film of the invention. Hereinafter, for the convenience of description, only the case where cellulose acylate is a material constituting a large portion of the layer to which the organic compound having the molecular weight of 1000 or less is added will be described, but the material constituting the large portion of the layer is not limited to cellulose acylate.

(Retardation Regulating Agent)

In the film of the invention, the retardation regulating agent may be preferably used as the above-mentioned organic compound. The retardation regulating agent of the invention is added to the optical film to be stretched according to the necessity, thereby increasing or reducing retardation (Re or Rth) or dependency of retardation on a wavelength (ΔRe or ΔRth). In detail, the agent is added to the optical film to be stretched according to the necessity. Thereby, the retardation (|Re| or |Rth|) is changed so that the retardation is 10 nm longer, or the dependency (|ΔRe| or |ΔRth|) of the retardation on the wavelength is changed so that the dependency is 10 nm more in comparison with the retardation and the dependency before the addition or stretching.

In the invention, it is preferable that the retardation regulating agent be added so that the retardation of the optical film satisfies the following Equations (C) and (D).

$$30 \text{ nm} < |Re| < 300 \text{ nm} \quad (C)$$

$$50 \text{ nm} < |Rth| < 400 \text{ nm} \quad (D)$$

Re of the optical film (particularly, the cellulose acylate film) of the invention is preferably 30 to 300 nm, more preferably 50 to 200 nm, and most preferably 70 to 150 nm. Furthermore, Rth is preferably 30 to 400 nm, more preferably 50 to 300 nm, and most preferably 100 to 200 nm. Additionally, since it is not limitative for the optical film of the invention to have the optical properties, the retardation may satisfy the following Equations (E) and (F) according to the purpose.

$$0 \text{ nm} \leq |Re| < 30 \text{ nm} \quad (E)$$

$$0 \text{ nm} \leq |Rth| < 50 \text{ nm} \quad (F)$$

As used herein, Re and Rth refer to an in-plane retardation and a retardation in the thickness direction, respectively. Re(λ) is measured by entering light having a wavelength of λ nm in the normal direction of the film in the KOBRA 21ADH (manufactured by Oji Scientific Instruments Co. Ltd.). Rth(λ) is calculated by using the KOBRA 21ADH, on the basis of retardation values measured in three directions, that is, the Re(λ), a retardation value measured by entering the light of wavelength λ nm in the direction inclined to +40° over the normal direction of the film, with the in-plane retarded axis (judged by the KOBRA 21ADH) as an inclined axis (a rotation axis), and a retardation value measured by entering the light of wavelength λ nm in the direction inclined to −40° over the normal direction of the film, with the in-plane retarded axis as an inclined axis (a rotation axis). In this invention, if not otherwise specified, Re refers Re(546), and Rth refers Rth (546). Herein, an assumed value of an average refractive index may use a value in various optical film catalogs and Polymer Handbook (JOHN WILEY & SONS, INC). As to an average refractive index value other than an existent one, it can be measured using ABBE Refractometer. The value of average refractive index for the main polymer films are as follows:

Cellulose acylate film: 1.48,

Cycloolefin polymer film: 1.52,

Polycarbonate film: 1.59,

Polymethyl methacrylate film: 1.49, and

Polystyrene film: 1.59.

By inputting an assumed value of the average refractive index and the thickness of the film, KOBRA 21ADH calculates nx, ny, and nz.

The present inventors of the invention have made extensive studies, as a result, have found that as the retardation regulating agent, an additive expressing the retardation in which the maximum distance between ends is 20 Å or more, the ratio of major axis/miner axis of the molecular is 2.0 or more is effective. The maximum distance between ends and the ratio of major axis/minor axis of the molecular are estimated from results that calculates the molecular structure using a molecular orbit calculating software such as MOPAC, WinMOPAC. In this embodiment, it is preferable to add as the retardation regulating agent, a compound represented by the following formula (1).

An amount of the addition of the retardation regulating agent that is used in this embodiment is preferably 0.1 to 20% by mass with respect to 100 parts by mass of the polymer resin, more preferably 1 to 15% by mass, most preferably 1 to 10% by mass. For example, in order to mix into the cellulose acylate solution, it is preferable that the retardation expressing agent is sufficiently compatible with the cellulose acylate, the compound is not aggregated by itself. For this reason, for example, a regulating agent solution in which a solvent and the regulating agent are mixed with each other under stirring is previously prepared, the regulating agent solution is added to a small amount of cellulose acylate solution that is additionally prepared to be agitated, and then is mixed with the main cellulose acylate dope solution. However, this invention is not limited to the above-mentioned adding method.

The retardation regulating agent preferably contains at least two aromatic rings or cycloalkyl rings in the molecule.

Particularly preferable retardation regulating agents includes the compounds represented by the following formula (1).

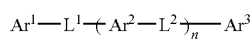

Formula (1)

In the formula (1), $Ar^1$ and $Ar^3$ each independently represent an aryl group or an aromatic heterocyclic group, $Ar^2$ represents an arylene group or a divalent aromatic heterocyclic group, $L^1$ and $L^2$ each independently represent a single bond or a divalent linking group. n represents an integer of 3 or more, $Ar^2$'s may be the same or different from each other, and $L^2$'s may be also the same or different from each other.

The aryl group represented by $Ar^1$ or $Ar^3$, and the arylene group represented by $Ar^2$ may be preferably an aryl group, an arylene group or a monocycle, having 6 to 30 carbon atoms, or may be bonded with another ring for form a condensed ring. Further, if possible, they may have a substituent, and the substituent includes a substituent T as described later. The aryl group or arylene group is the group more preferably having 6 to 20 carbon atoms, particularly preferably having 6 to 12 carbon atoms. Specific examples of the aryl group include a phenyl group, a p-methylphenyl group, a naphthyl group, and the like, and specific examples of the arylene group include a phenylene group, a p-methylphenylene group, a naphthalene group, and the like.

In the formula (1), the aromatic heterocyclic group represented by $Ar^1$, $Ar^2$ or $Ar^3$ may be any one which contains at least one of an oxygen atom, a nitrogen atom and a sulfur atom, but preferably one which contains at least one of an oxygen atom, a nitrogen atom and a sulfur atom of a 5- or 6-membered ring. Further, if possible, they may further have a substituent. Examples of the substituent include a substituent T as described later.

In the formula (1), specific examples of the aromatic heterocycle constituting the aromatic heterocyclic group represented by $Ar^1$, $Ar^2$ or $Ar^3$ include a furan ring, a pyrrole ring, a thiophene ring, an imidazole ring, a pyrazole ring, a pyridine ring, a pyrazine ring, a pyridazine ring, a triazole ring, a triazine ring, an indole ring, an indazole ring, a purine ring, a thiazoline ring, a thiazole ring, a thiadiazole ring, an oxazoline ring, an oxazole ring, an oxadiazole ring, a quinoline ring, an isoquinoline ring, a phthalazine ring, a naphthyridine ring, a quinoxaline ring, a quinazoline ring, a cinnoline ring, a pteridine ring, an acridine ring, a phenanthroline ring, a phenazine ring, a tetrazole ring, a benzimidazole ring, a benzoxazole ring, a benzthiazole ring, a benzotriazole ring, a tetrazaindene ring, a pyrolotriazole ring, a pyrazolotriazole ring, and the like. The aromatic heterocycle preferably includes a benzimidazole ring, a benzoxazole ring, a benzthiazole ring, or a benzotriazole ring.

In the formula (1), $L^1$ and $L^2$ represent a single bond, or a divalent linking group, and preferable examples of the divalent linking group include a group represented by —$NR^7$— ($R^7$ represents a hydrogen atom, or an alkyl group optionally having a substituent, or an aryl group), —$SO_2$—, —CO—, an alkylene group, a substituted alkylene group, an alkenylene group, a substituted alkenylene group, an alkynylene group, —O—, —S—, —SO—, and a group obtained by combination of the divalent groups thereof, and among them, preferred are —O—, —CO—, —$SO_2NR^7$—, —$NR^7SO_2$—, —$CONR^7$—, —$NR^7CO$—, —COO—, —OCO— and an alkynylene group, and most preferred are —$CONR^7$—, —$NR^7CO$—, —COO—, OCO— and an alkynylene group.

For the compound represented by the formula (1), $Ar^2$ binds with $L^1$ and $L^2$, but in the case where $Ar^2$ is a phenylene group, it is most preferable that $L^1$-$Ar^2$-$L^2$ and $L^2$-$Ar^2$-$L^2$ are in the para position relative to each other (1,4-position).

n represents an integer of 3 or more, preferably 3 to 7, and more preferably 3 to 5.

Among the compounds represented by the formula (1) the compound represented by the formula (2) is preferable.

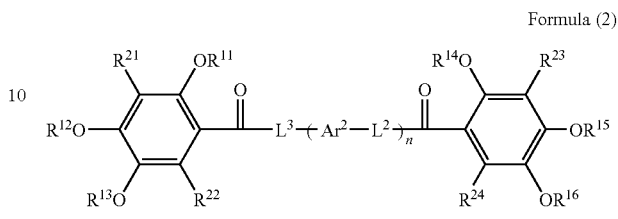

Formula (2)

In the formula (2), $R^{11}$, $R^{12}$, $R^{13}$, $R^{14}$, $R^{15}$, $R^{16}$, $R^{21}$, $R^{22}$, $R^{23}$ and $R^{24}$ each independently represent a hydrogen atom or a substituent. $Ar^2$ represents an arylene group or a divalent aromatic heterocyclic group, and $L^2$ and $L^3$ each independently represent a single bond or a divalent linking group. n represents an integer of 3 or more, $Ar^2$'s may be the same or different from each other, and $L^2$'s may be the same or different from each other.

$Ar^2$, $L^2$ and n have the same definitions and specific examples as in the formula (1). $L^3$ represents a single bond or a divalent linking group, preferable examples of the divalent linking group include a group represented by —$NR^7$— ($R^7$ represents a hydrogen atom, or an alkyl group optionally having a substituent, or an aryl group), an alkylene group, a substituted alkylene group, —O—, and a group obtained by combination of the divalent groups thereof, and among them, preferred are —O—, —$NR^7$—, —$NR^7SO_2$— and —$NR^7CO$—.

$R^{11}$, $R^{12}$, $R^{13}$, $R^{14}$, $R^{15}$ and $R^{16}$ each independently represent a hydrogen atom or a substituent, preferably a hydrogen atom, an alkyl group and an aryl group, more preferably a hydrogen atom, an alkyl group having 1 to 4 carbon atoms (e.g., a methyl group, an ethyl group, a propyl group, an isopropyl group, etc.), and an aryl group having 6 to 12 carbon atoms (e.g., a phenyl group, a naphthyl group), and even more preferably an alkyl group having 1 to 4 carbon atoms.

$R^{22}$, $R^{23}$ and $R^{24}$ each independently represent a hydrogen atom or a substituent, preferably a hydrogen atom, an alkyl group, an alkoxy group and a hydroxyl group, more preferably a hydrogen atom and an alkyl group (preferably an alkyl group having 1 to 4 carbon atoms, and more preferably a methyl group).

In the above substituents having a hydrogen atom, the hydrogen atom may be removed and further replaced by the above substituent. Examples of such functional groups include alkylcarbonylaminosulfonyl groups, arylcarbonylaminosulfonyl groups, alkylsulfonylaminocarbonyl groups, and arylsulfonylaminocarbonyl groups, and specific examples thereof include a methylsulfonylaminocarbonyl group, p-methylphenylsulfonylaminocarbonyl group, acetylaminosulfonyl group, and benzoylaminosulfonyl group.

Further, when a compound has two or more substituents, the substituents may be the same or different ones, and may be connected to each other to form a ring if possible.

Hereinbelow, specific examples of the compounds represented by the formula (1) and the formula (2) will be presented, but the compounds represented by the formula (1) and the formula (2) which can be used in the present invention are not limited to specific examples as presented below.

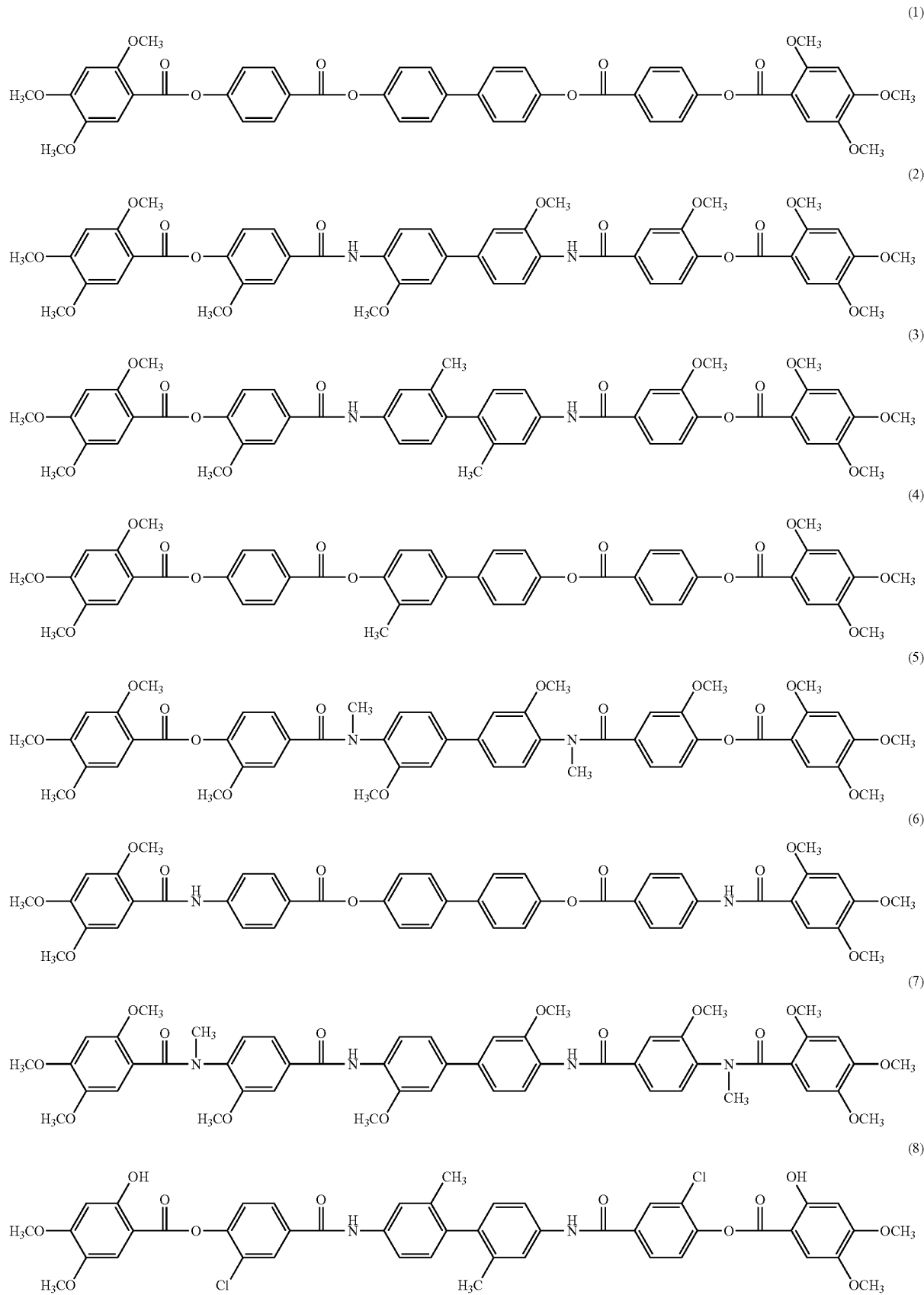

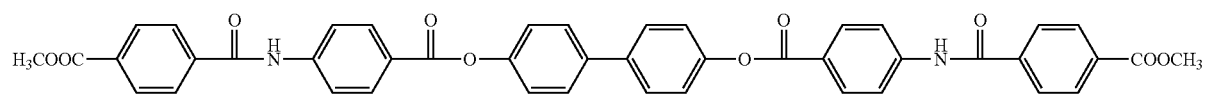
(9)
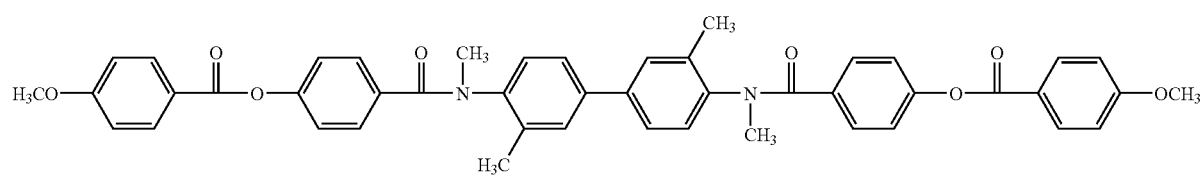
(10)
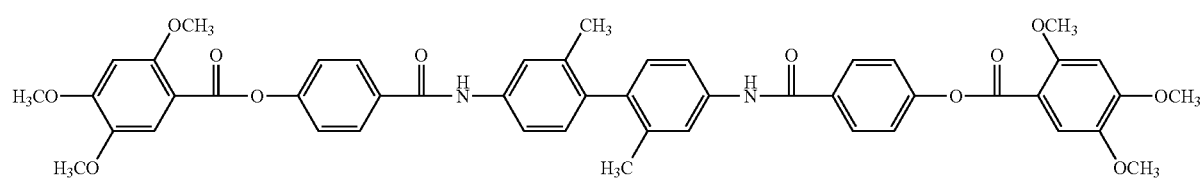
(11)
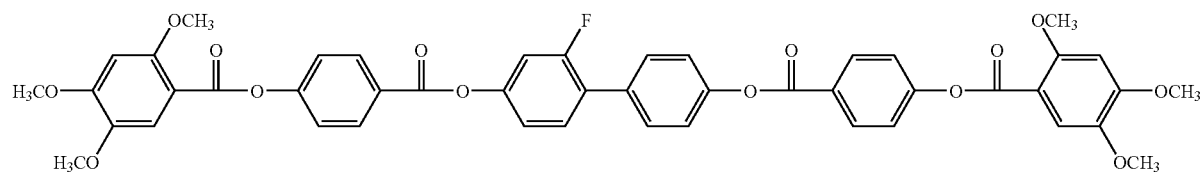
(12)
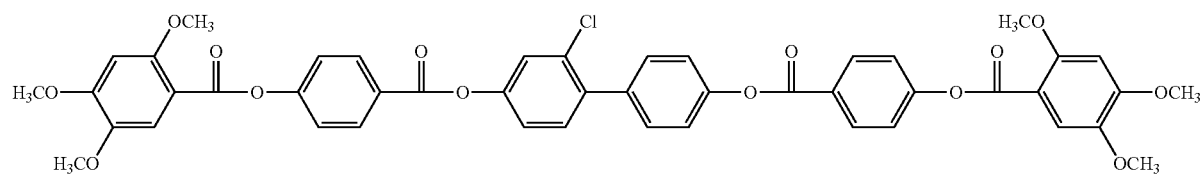
(13)
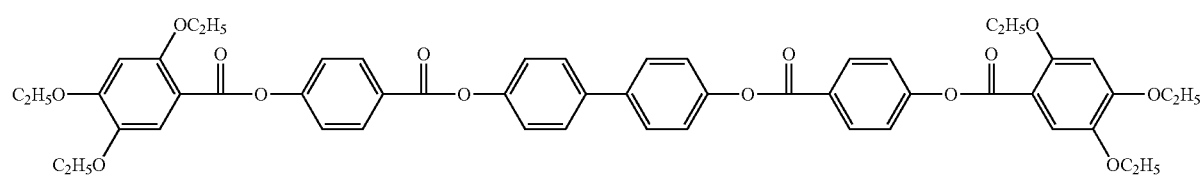
(14)
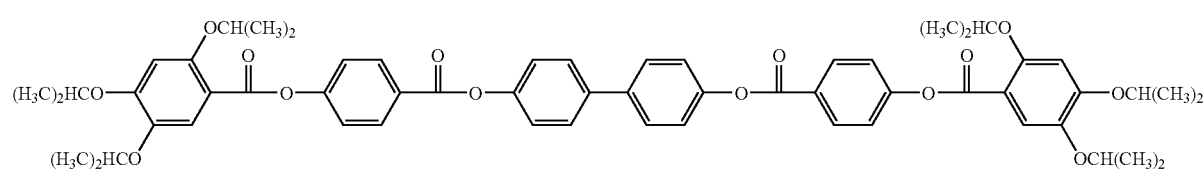
(15)
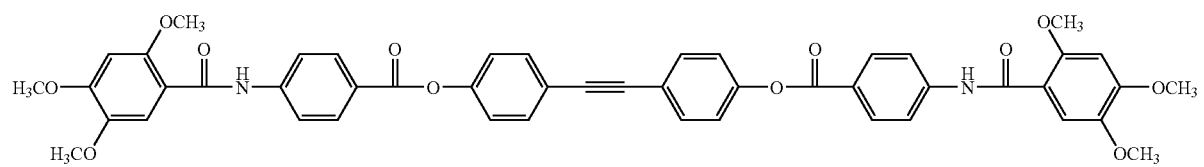
(16)

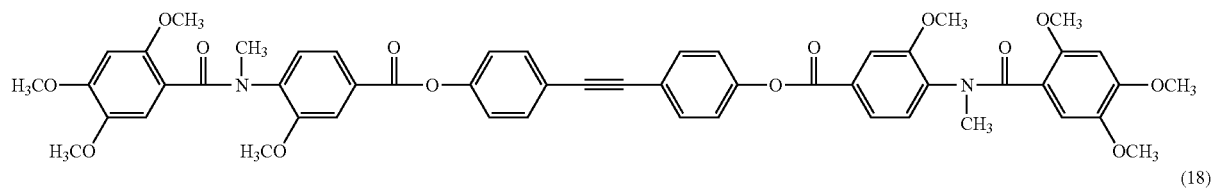
(17)
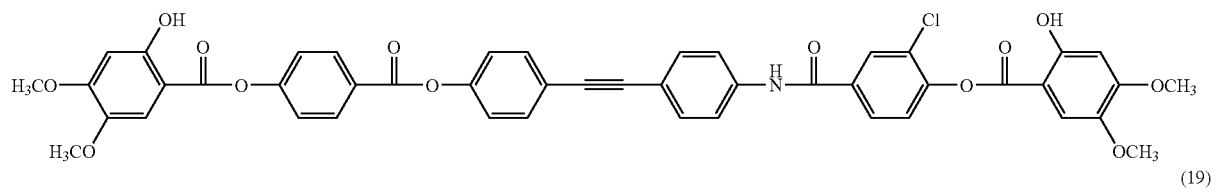
(18)
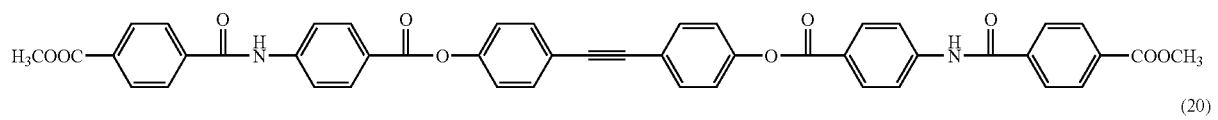
(19)
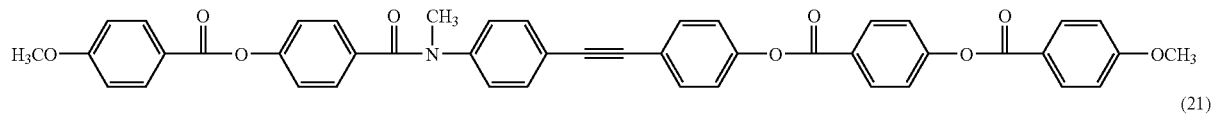
(20)
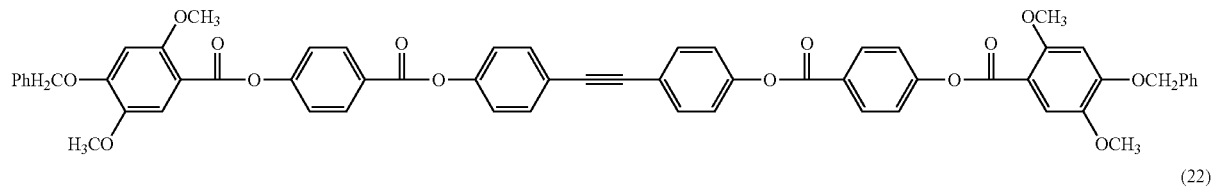
(21)
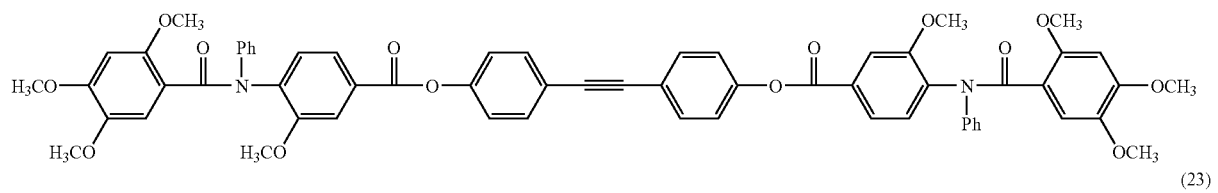
(22)
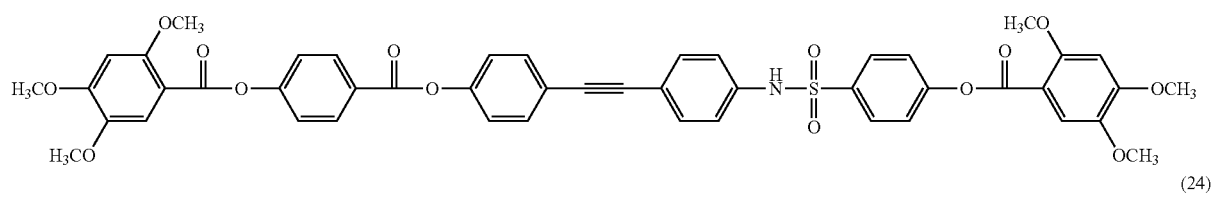
(23)
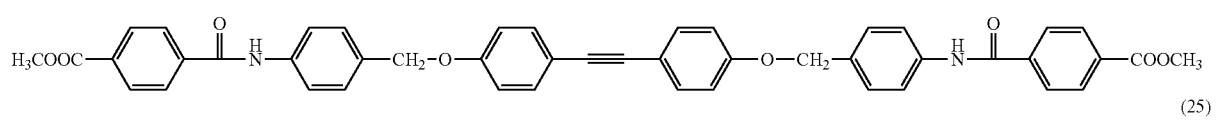
(24)
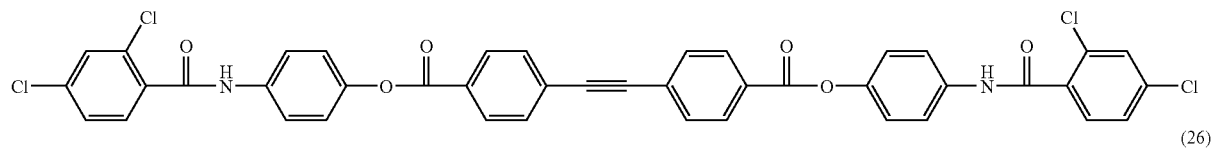
(25)
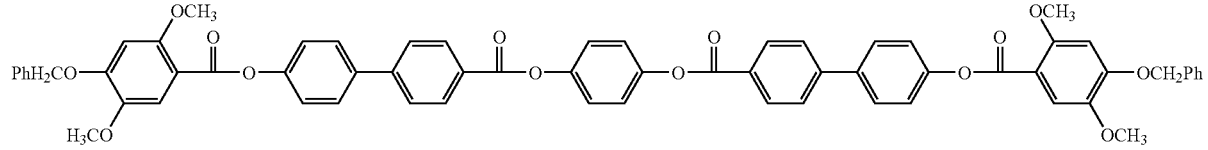
(26)

-continued
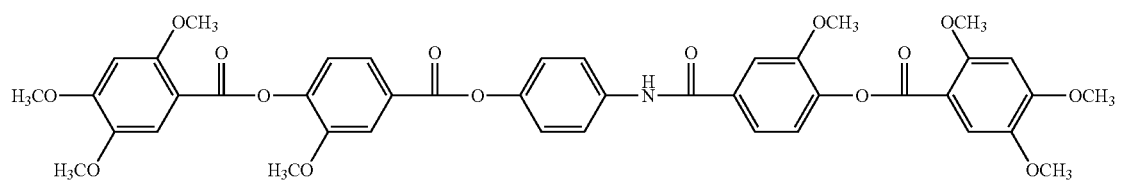
(27)
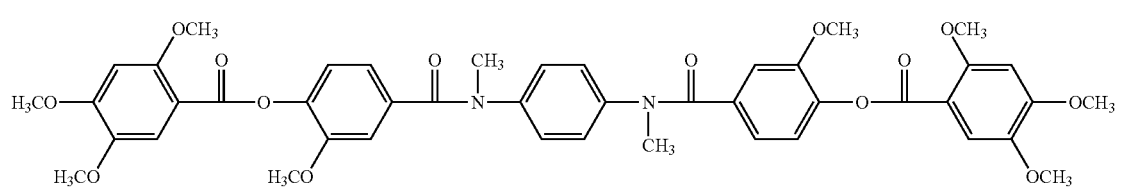
(28)
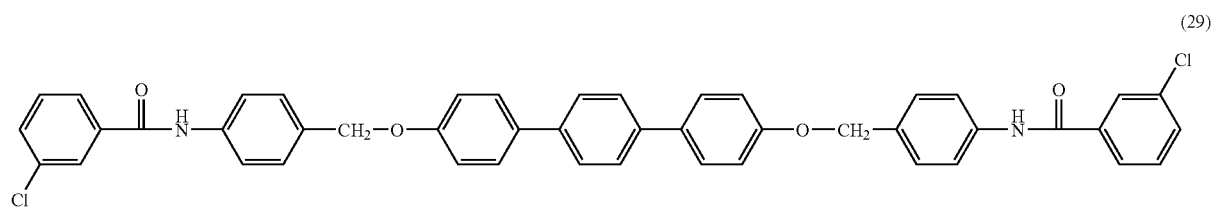
(29)
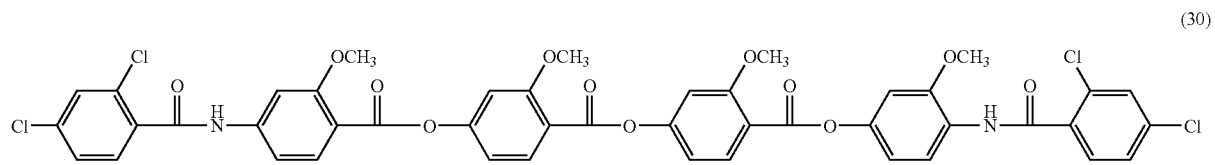
(30)
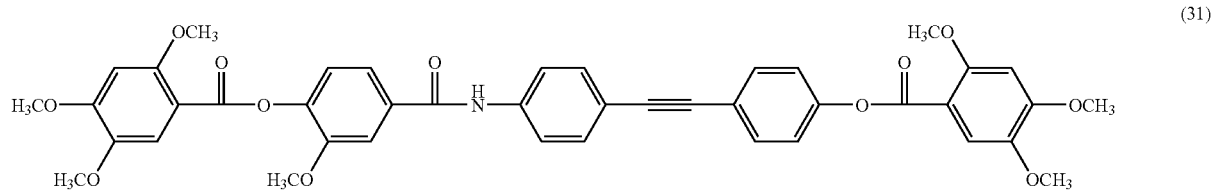
(31)
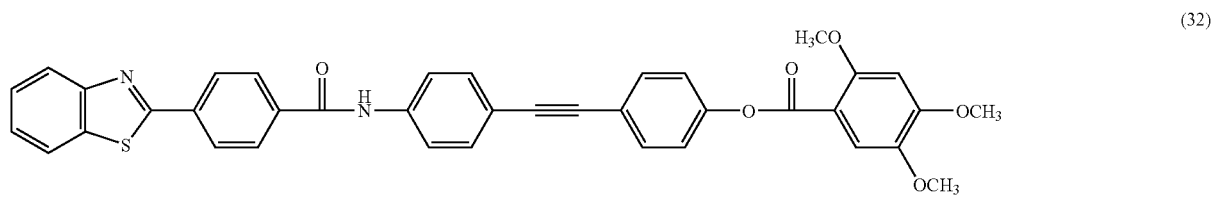
(32)
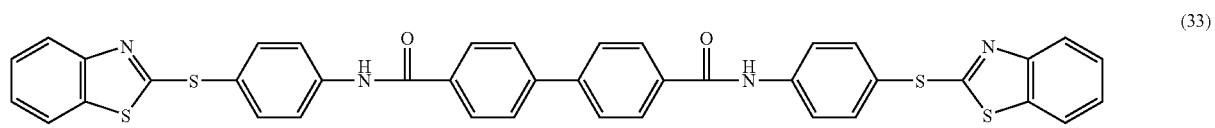
(33)
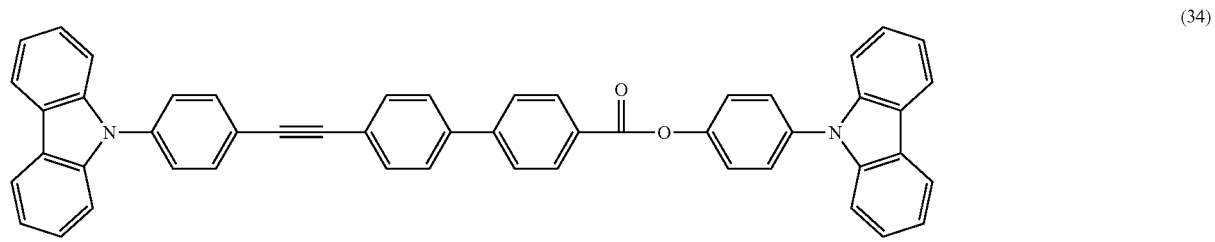
(34)

-continued
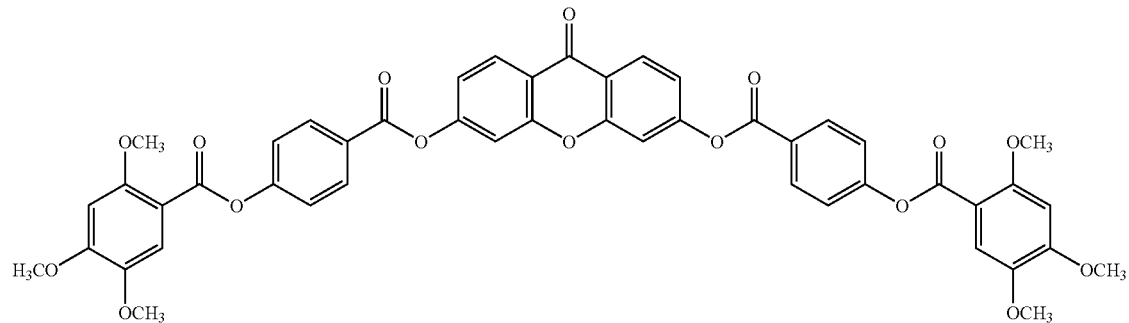
(35)
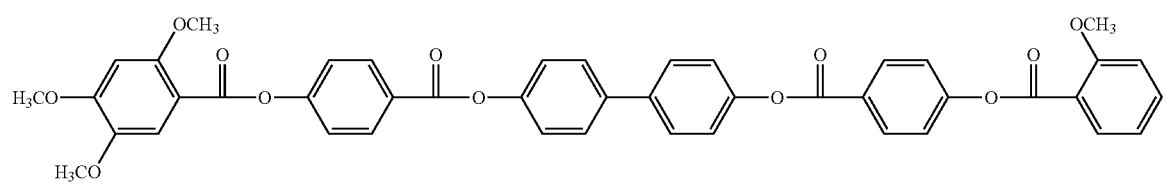
(36)
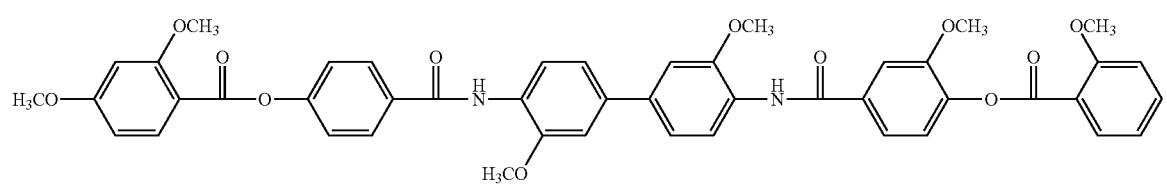
(37)
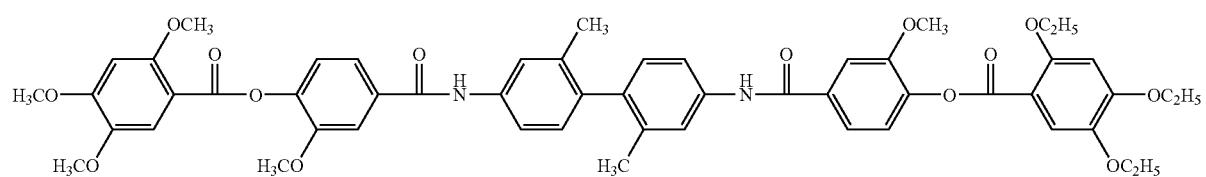
(38)
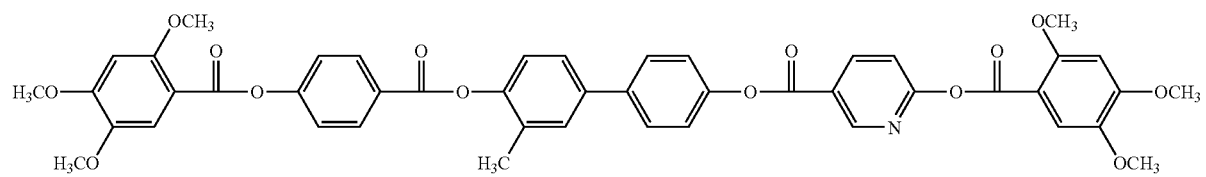
(39)

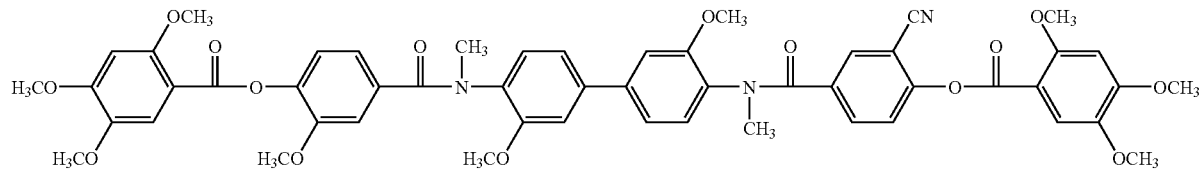

(40)

For the compound represented by the formula (1), the compound represented by the following formula (3) can be preferably used.

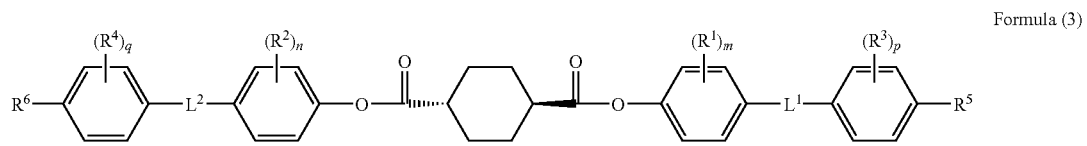

Formula (3)

In the formula (3), $R^1$, $R^2$, $R^3$, $R^4$, $R^5$ and $R^6$ each independently represent a substituent, and $L^1$ and $L^2$ each independently represent a single bond or a divalent linking group. n and m each independently represent an integer of 0 to 4, and p and q each independently represent an integer of 0 to 3.

$R^1$, $R^2$, $R^3$, $R^4$, $R^5$ and $R^6$ each independently represent a substituent (group other than a hydrogen atom). $R^1$, $R^2$, $R^3$, $R^4$, $R^5$ and $R^6$ may be the same or different from each other. Examples of the substituent include those which are preferably exemplified as the above-described substituent T. Among them, examples of the substituent include an alkyl group, an alkoxy group, an alkoxycarbonyl group, an acyl group, an alkoxycarbonyloxy group, a cycloalkyl group, an acylamino group, a cyano group, and a halogen atom. Further, in the case where there are at least two substituents, they may be the same or different from each other. Further, if possible, they may be bonded to each other to form a ring.

In the formula (3), $L^1$ and $L^2$ each independently represent a single bond or a divalent linking group. $L^1$ and $L^2$ may be the same or different from each other. Preferable examples of the divalent linking group include a group represented by —$NR^7$— ($R^7$ represents a hydrogen atom, or an alkyl group optionally having a substituent, or an aryl group), —$SO_2$—, —CO—, an alkylene group, a substituted alkylene group, an alkenylene group, a substituted alkenylene group, an alkynylene group, —O—, —S—, —SO—, and a group obtained by combination of the divalent groups thereof, and among them, preferred are —O—, —CO—, —$SO_2NR^7$—, —$NR^7SO_2$—, —$CONR^7$—, —$NR^7CO$—, —COO—, —OCO— and an alkynylene group, and most preferred are —$CONR^7$—, —$NR^7CO$—, —COO—, OCO— and an alkynylene group. Here, examples of the substituent include those exemplified as the substituent in the above-described $R^1$, $R^2$, $R^3$, $R^4$, $R^5$ and $R^6$.

n and m each independently represent an integer of 0 to 4, and in the case where m is 2 or more, $R^1$'s in the repeating unit may be the same or different from each other. In the case where n is 2 or more, $R^2$'s in the repeating unit may be the same or different from each other. p and q each independently represent an integer of 0 to 3, in the case where p is 2 or more, $R^3$'s in the repeating unit may be the same or different from each other. In the case where q is 2 or more, $R^4$'s in the repeating unit may be the same or different from each other. Further, $R^3$ and $R^5$, or $R^4$ and $R^6$ may be bonded to each other to form a ring. Further, from the respect of the retardation controlling effect, since the compound represented by the formula (3) is preferably a symmetrical compound or a nearly symmetrical compound, it is preferable that the groups having bonds in the 1,4-positions of cyclohexane located in the center of the formula (3) have identical or nearly identical structures.

Hereinbelow, specific examples of the compounds represented by the formula (3) will be presented, but the compounds represented by the formula (3) which can be used in the present invention are not limited to specific examples as presented below.

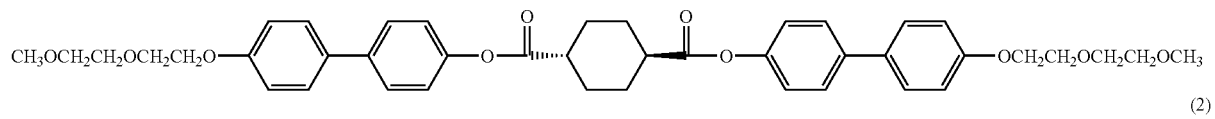
(1)
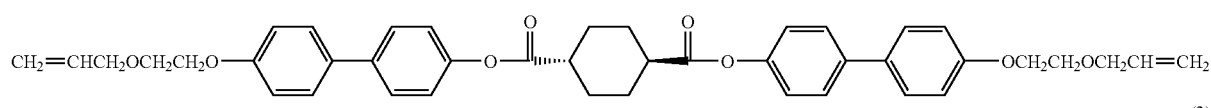
(2)
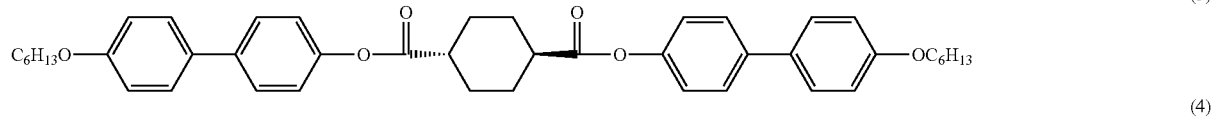
(3)
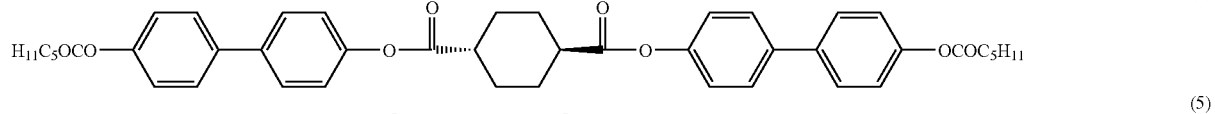
(4)
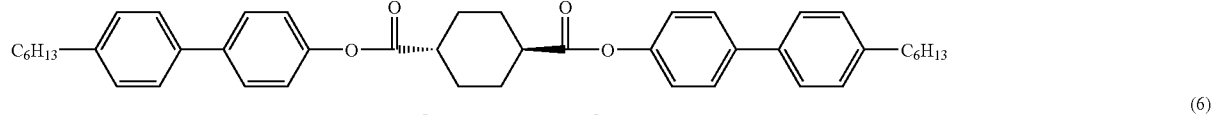
(5)
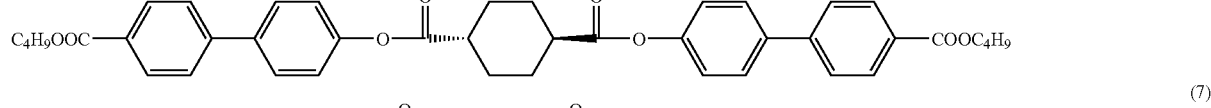
(6)
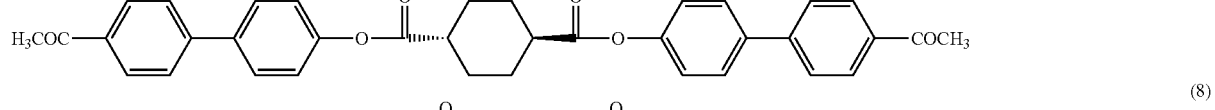
(7)
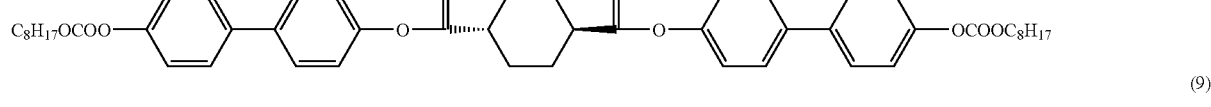
(8)
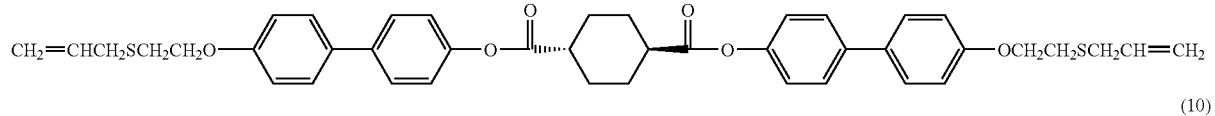
(9)
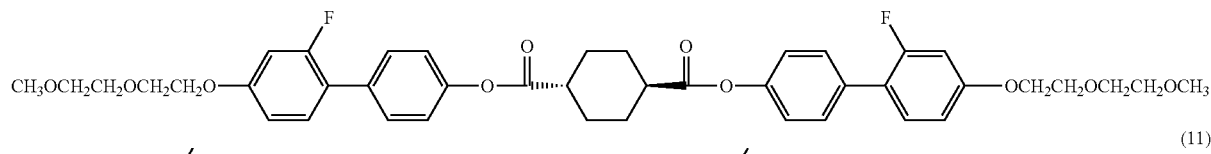
(10)
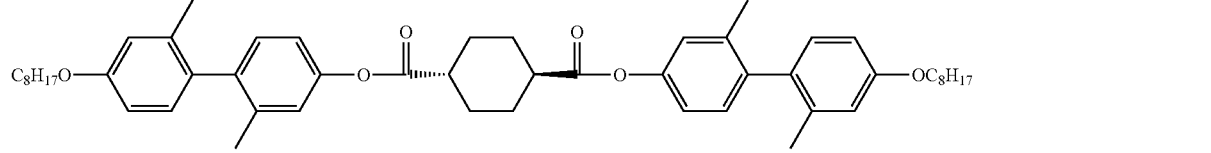
(11)
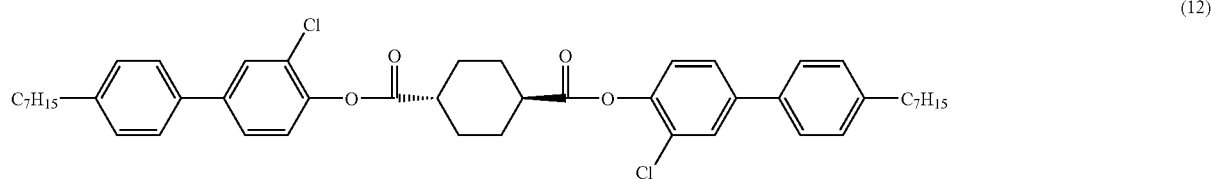
(12)
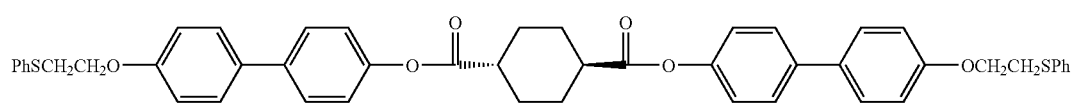
(13)

-continued
(14)
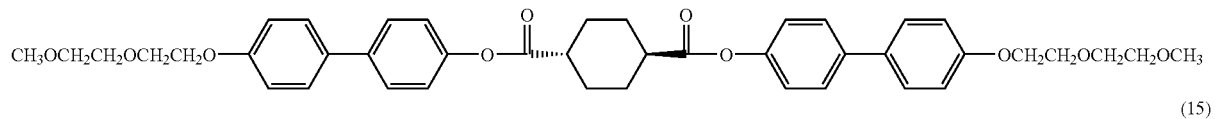
(15)
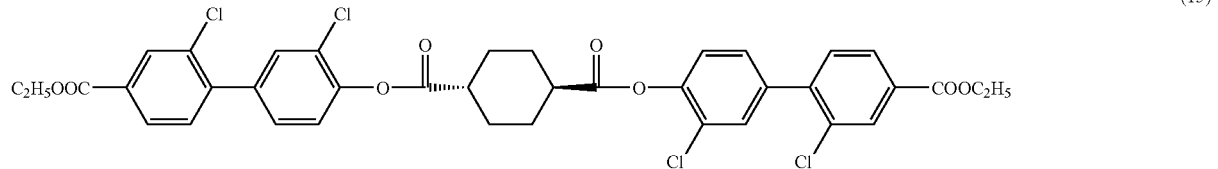
(16)
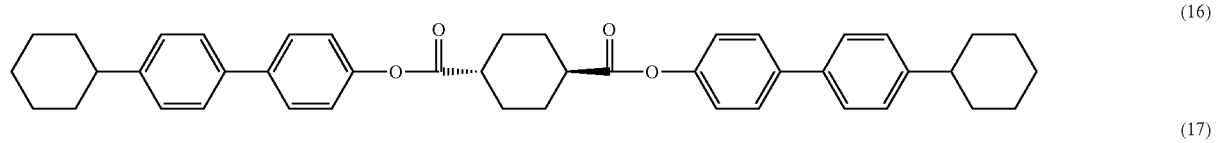
(17)
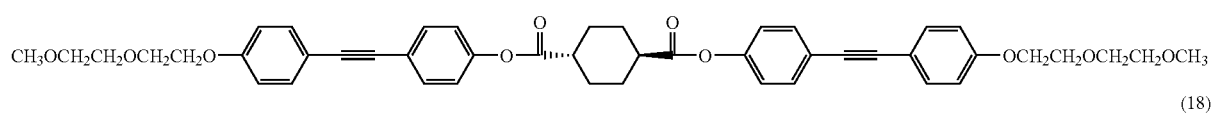
(18)
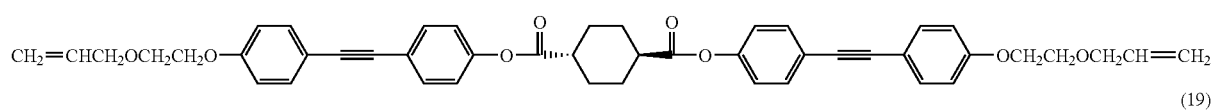
(19)
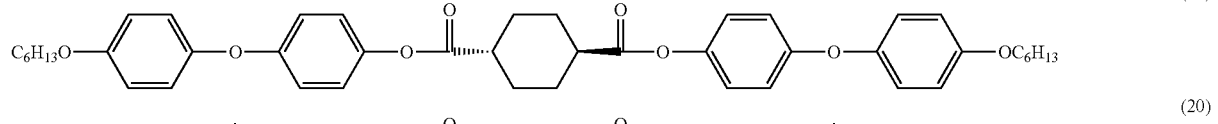
(20)
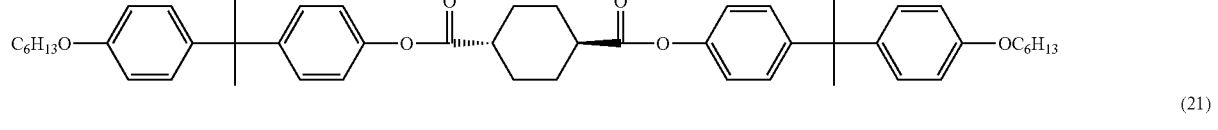
(21)
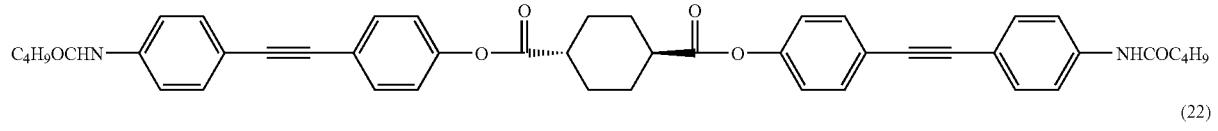
(22)
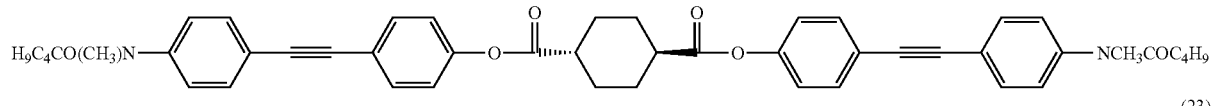
(23)
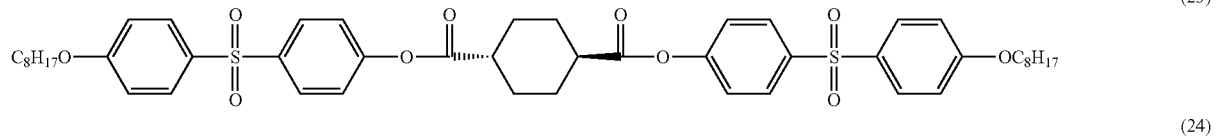
(24)
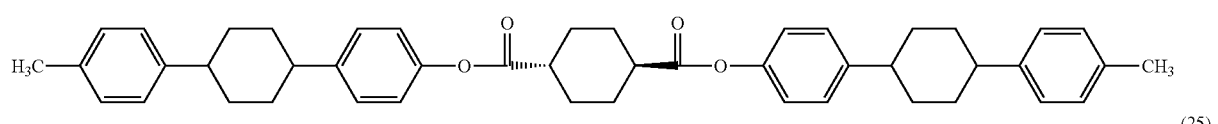
(25)
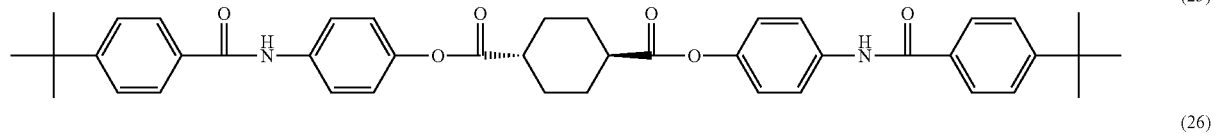
(26)
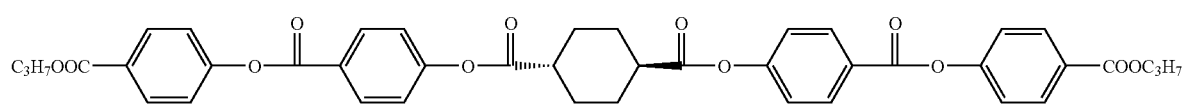

-continued
(27)
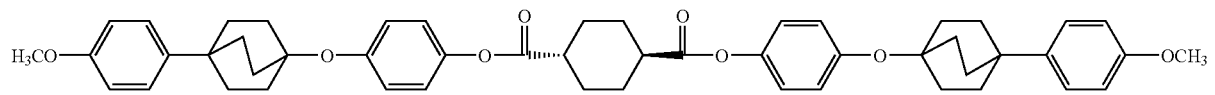
(28)
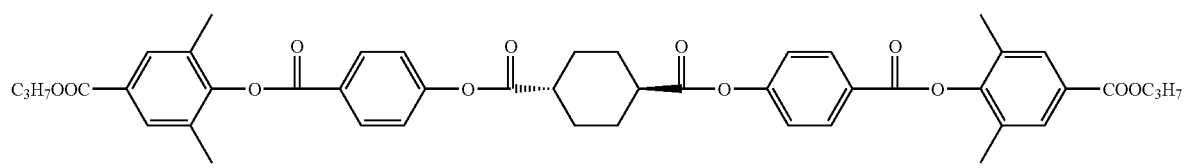
(29)
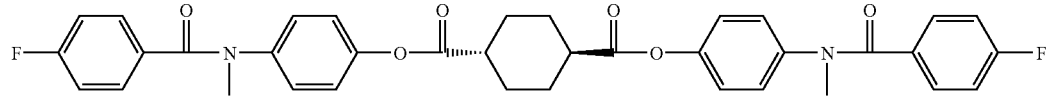
(30)
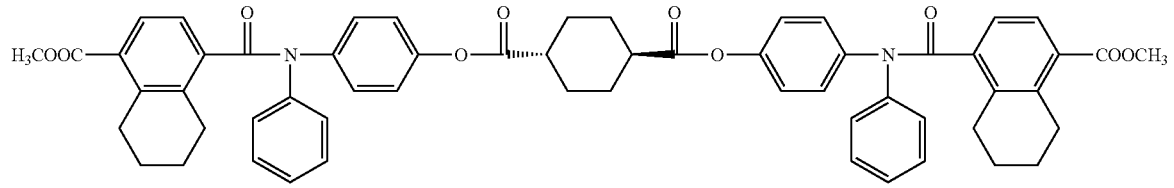
(31)
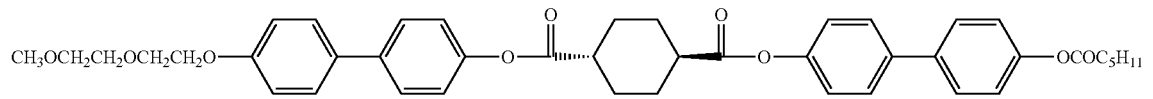
(32)
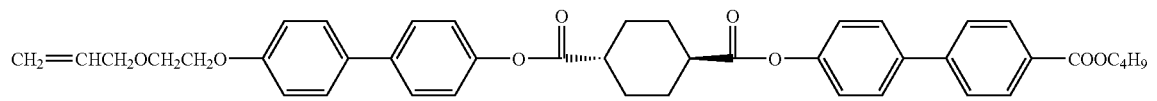
(33)
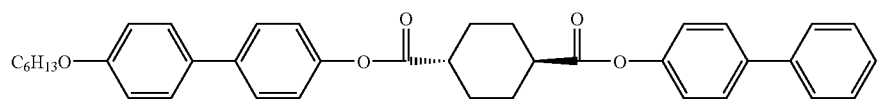
(34)
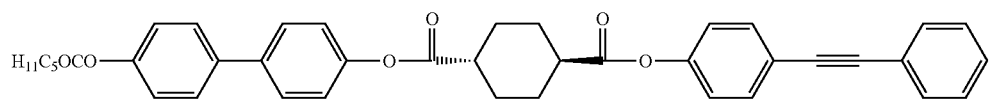
(35)
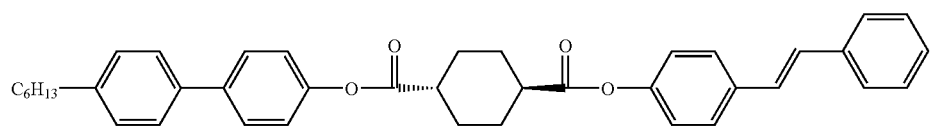

-continued

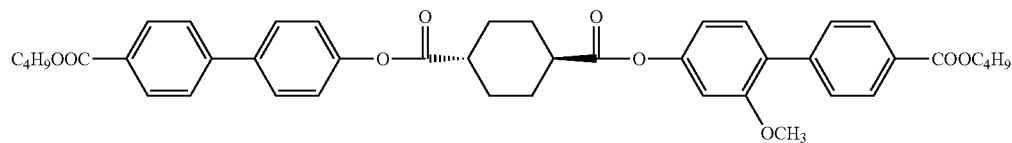

(36)

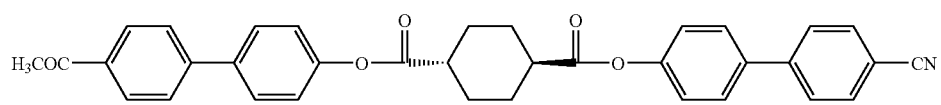

(37)

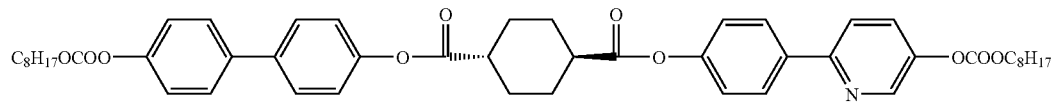

(38)

For the compound represented by the formula (1), the compound represented by the following formula (4) can be preferably used.

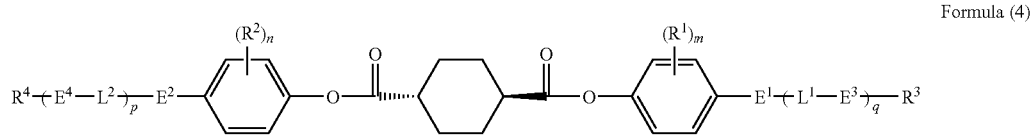

Formula (4)

In the formula (4) $R^1$, $R^2$, $R^3$ and $R^4$ each independently represent a substituent, and $E^1$, $E^2$, $E^3$ and $E^4$ each independently represent an oxygen atom or a sulfur atom. $L^1$ and $L^2$ each independently represent a divalent linking group, n and m each independently represent an integer of 0 to 4, and p and q each independently represent an integer of 1 to 10.

$R^1$ and $R^2$ each independently represent a substituent. Examples of the substituent include those which are preferably exemplified as the above-described substituent T. In the case where there are at least two substituents, they may be the same or different from each other. Further, if possible, they may be bonded to each other to form a ring.

$R^3$ and $R^4$ each independently represent a substituent. Examples of the substituent include those which are preferably exemplified as the above-described substituent T. Among them, preferred are an alkyl group, a cycloalkyl group, a non-cycloalkyl group, an alkenyl group, a cycloalkenyl group, a non-cycloalkenyl group, an alkynyl group, an aryl group, a heterocyclic group, a sulfamoyl group, an alkyl and arylsulfonyl group, an acyl group, an aryloxycarbonyl group, an alkoxycarbonyl group, and a carbamoyl group. Further, more preferred are an alkyl group, a cycloalkyl group, an alkenyl group, an aryl group, an acyl group, an aryloxycarbonyl group, an alkoxycarbonyl group, and a carbamoyl group.

$L^1$ and $L^2$ each independently represent a divalent linking group. $L^1$ and $L^2$ may be the same or different from each other. Examples of the divalent linking group include a divalent linking group other than an arylene group, preferably alkylene group, substituted alkylene group, an alkenylene group, a substituted alkenylene group, an alkynylene group, and a group obtained by combination of the divalent groups thereof, wherein in the combination of at least 2 groups, another divalent linking group may be further linked thereto. Examples of the divalent linking group include a group represented by —$NR^7$— ($R^7$ represents a hydrogen atom, or an alkyl group optionally having a substituent, or an aryl group), —O—, —S—, —SO—, —$SO_2$—, —CO—, —$SO_2NR^7$—, —$NR^7SO_2$—, —$CONR^7$—, —$NR^7CO$—, —COO— and —OCO—. Preferable examples of the substituent include those which are preferably exemplified as the above-described substituent T.

n and m each independently represent an integer of 0 to 4. In the case where m is 2 or more, $R^1$'s in the repeating unit may be the same or different from each other, and in the case where n is 2 or more, $R^2$'s in the repeating unit may be the same or different from each other. p and q each independently represent an integer of 0 to 10. In the case where p is 2 or more, $E^4$'s and $L^2$'s in the repeating unit may be the same or different from each other, and in the case where q is 2 or more, $E^3$'s and $L^1$'s in the repeating unit may be the same or different from each other. Further, from the respect of the retardation controlling effect, since the compound represented by the formula (4) is preferably a symmetrical compound or a nearly symmetrical compound, it is preferable that the groups having bonds in the 1,4-positions of cyclohexane located in the center of the formula (4) have identical or nearly identical structures.

Hereinbelow, specific examples of the compounds represented by the formula (4) will be presented, but the compounds represented by the formula (4) which can be used in the present invention are not limited to specific examples as presented below.

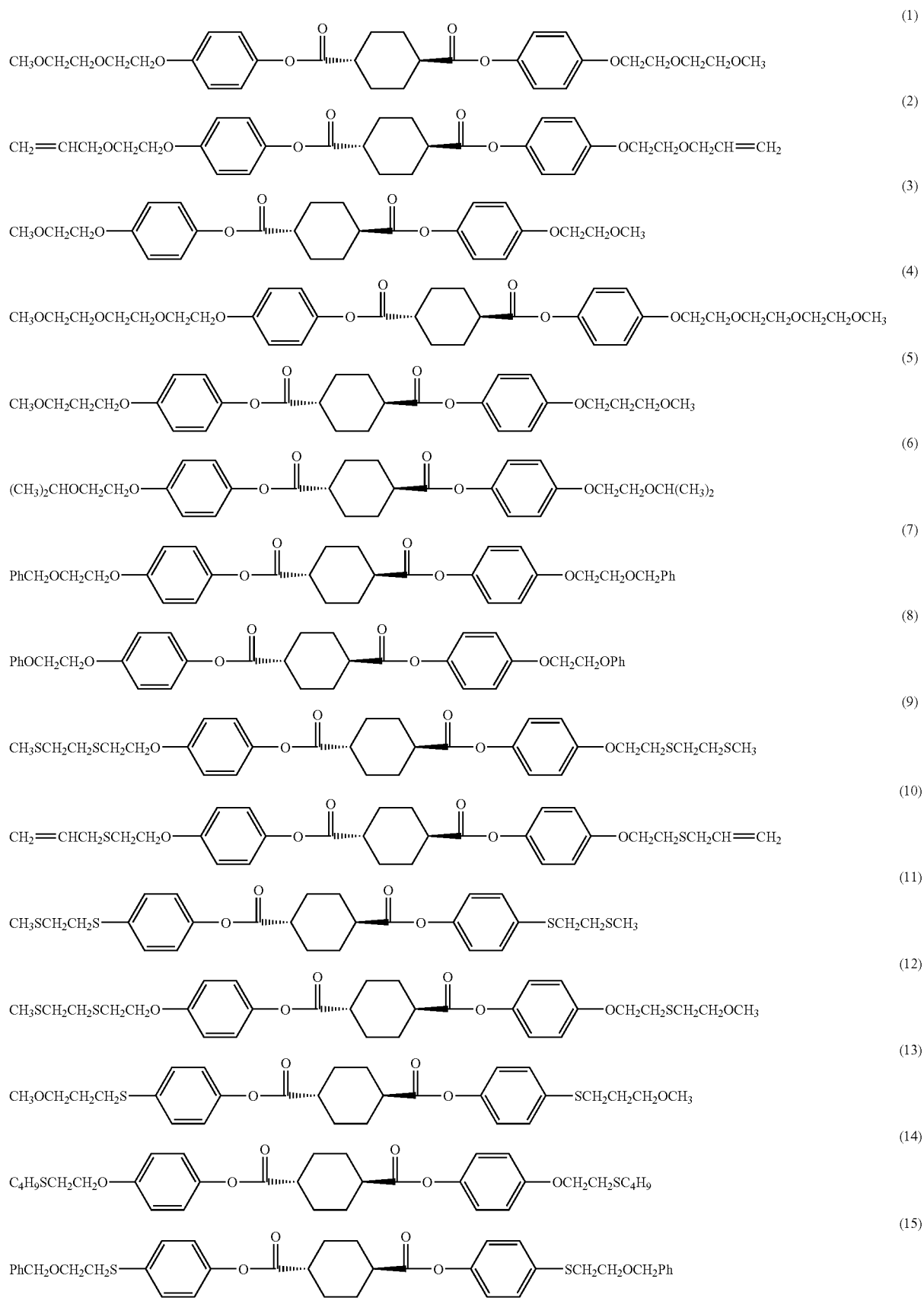

-continued
(16)
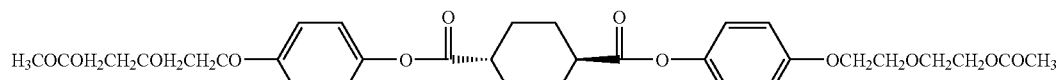
(17)
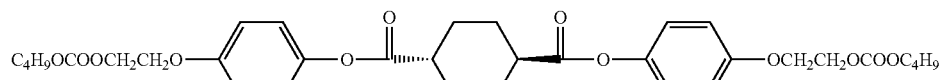
(18)
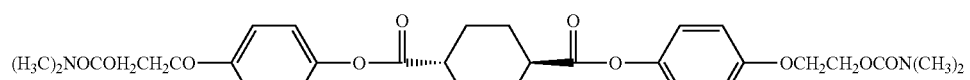
(19)
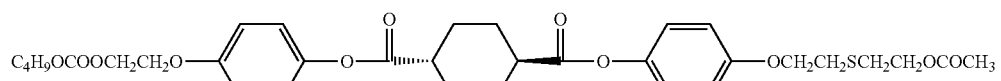
(20)
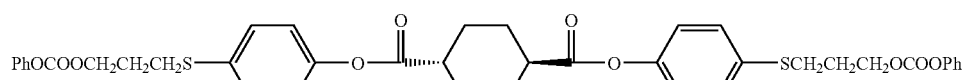
(21)
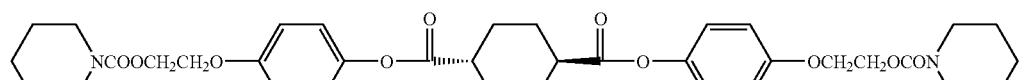
(22)
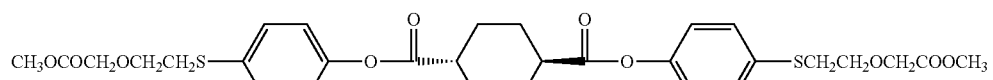
(23)
(24)
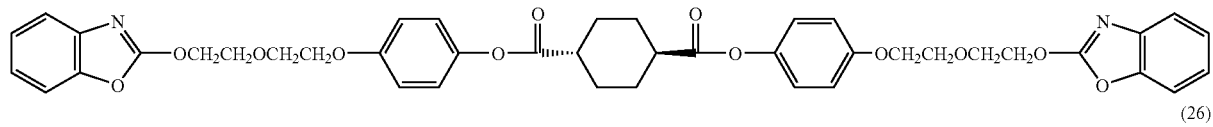
(25)
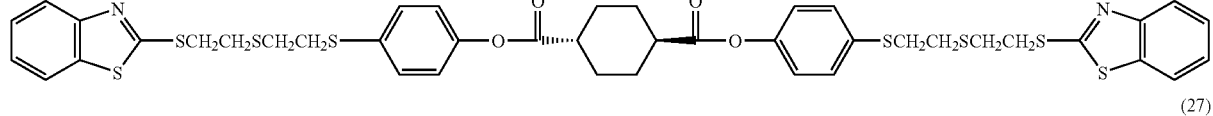
(26)
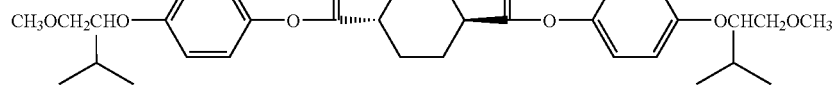
(27)
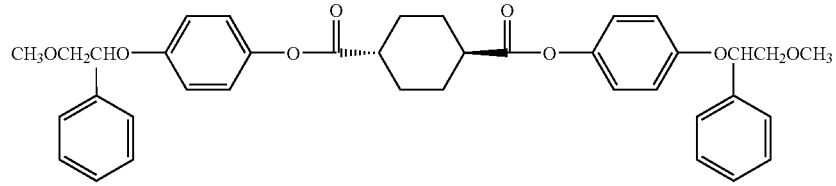
(28)

-continued

 (29)

 (30)

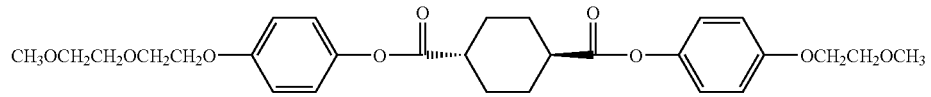 (31)

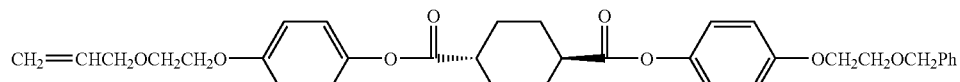 (32)

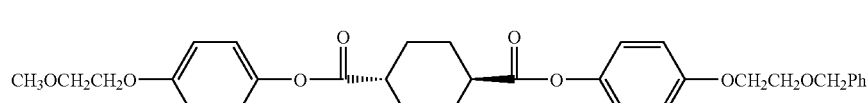 (33)

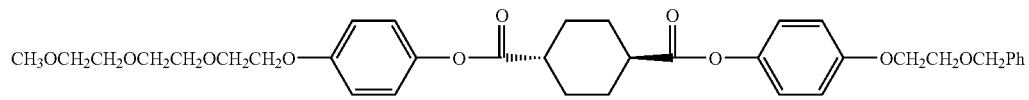 (34)

(35)

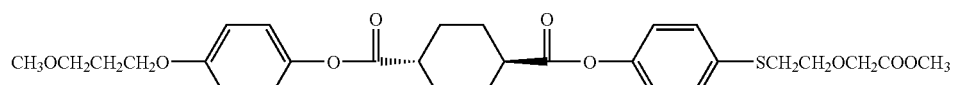 (36)

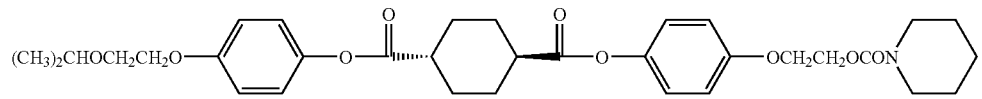 (37)

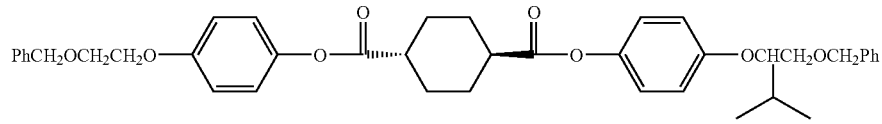 (38)

(Ultraviolet Absorber)

For the optical film of the present invention, a ultraviolet absorber can be also as an organic compound. It is preferable that the ultraviolet absorber used in the present invention has absorption in the ultraviolet region at 200 to 400 nm, imparts ultraviolet durability on the film, and has action of adjusting the retardation by using refractive anisotropy.

The ultraviolet absorber used in the present invention is those which have absorption in the ultraviolet region at 200 to 400 nm, and can particularly regulate wavelength-dependency of the short-wavelength side of a cellulose acylate film, for example, by using those having large short-wavelength side of the visible region in the chromatic dispersion of Re and Rth of the compound itself. Particularly, if a planar ultraviolet absorber is used, it is aligned parallel to the film side to enhance the effect of increasing the retardation Rth. However, the ultraviolet absorber is required to have sufficiently uniform compatibility with the cellulose acylate. The absorption band of such the compound preferably ranges from 200 to 400 nm, more preferably from 220 to 395 nm, and more preferably 240 to 390 nm.

Further, the optical member used in the liquid crystal displace device is required to have high transmission, and high spectrometric transmission in the visible region. If the optical film (particularly a cellulose acylate film) of the present invention contains the above-described ultraviolet absorber, it is preferable that the spectrometric transmission at a wavelength of 380 nm is 45% to 95%, and the spectrometric transmission at a wavelength of 350 nm is 10% or less.

It is preferable that the molecular weight of the ultraviolet absorber used in the present invention is 250 to 1000, more preferably 260 to 800, even more preferably 270 to 800, and particularly preferably 300 to 800, from the standpoint of volatility. Within these ranges of the molecular weight, the ultraviolet absorber may have specific monomer structures, and may have oligomer structures or polymer structures with a plurality of the bonds of their monomer units.

Further, the ultraviolet absorber used in the present invention is one which is preferably a liquid at 25° C. in the viewpoint of handlability and solubility in a dope, or a solid having a melting point of 25 to 250° C., more preferably a liquid at 25° C. or a solid having a melting point of 25 to 200° C. It is preferable that the ultraviolet absorber used in the present invention is not volatile in the viewpoint of dope flexibility in the production of a cellulose acylate film or drying.

The amount of the ultraviolet absorber to be added is preferably 0.01 to 30% by mass relative to a polymer resin (preferably cellulose acylate), more preferably 0.1 to 20% by mass, and particularly preferably 0.2 to 10% by mass. Further, the time point for adding the ultraviolet absorber may be in any step during the process for the production of a dope, and the absorber may be added in an additional process after production of a dope.

Specific examples of the ultraviolet absorber which is preferably used in the present invention include a benzotriazole-based compound, a benzophenone-based compound, a cyano group-containing compound, an oxybenzophenone-based compound, a salicylic ester-based compound, a nickel complex salt-based compound, and the like, but the ultraviolet absorber which can be used in the present invention is limited thereto. Among them, preferred are the compounds represented by the following formulae (101) to (103), more preferred is the compound represented by the formula (101) or the compound represented by the formula (102), and even more preferred is the compound represented by the formula (101):

    Formula (101)

[In the formula (101), $Q^1$ represents nitrogen-containing aromatic heterocyclic group, and $Q^2$ represents a divalent aromatic ring.]

$Q^1$ represents a nitrogen-containing aromatic heterocyclic group, preferably a 5- to 7-membered nitrogen-containing aromatic heterocyclic group, and more preferably a 5- or 6-membered nitrogen-containing aromatic heterocyclic group. Examples of the nitrogen-containing aromatic heterocyclic group constituting the nitrogen-containing aromatic heterocyclic group include the rings such as an imidazole ring, a pyrazole ring, a triazole ring, a tetrazole ring, a thiazole ring, an oxazole ring, a selenazole ring, a benzotriazole ring, a benzothiazole ring, a benzoxazole ring, a benzoselenazole ring, a thiadiazole ring, an oxadiazole ring, a naphthothiazole ring, a naphthooxazole ring, an azabenzimidazole ring, a purine ring, a pyridine ring, a pyrazine ring, a pyrimidine ring, a pyridazine ring, a triazine ring, a triazaindene ring, a tetrazaindene ring, and the like, more preferably a 5-membered nitrogen-containing aromatic heterocycle, or a triazine ring, and specifically preferred is an imidazole ring, a pyrazole ring, a triazole ring, a tetrazole ring, a thiazole ring, an oxazole ring, a benzotriazole ring, a benzothiazole ring, a benzoxazole ring, a thiadiazole ring, an oxadiazole ring, a 1,3,5-triazine ring, or the like, and particularly preferred is a benzotriazole ring or a 1,3,5-triazine ring, or the like.

The nitrogen-containing aromatic heterocycle represented by $Q^1$ may have a substituent, and examples of the substituent include those exemplified as the above-described substituent T. Further, if there are a plurality of substituents, they may be further condensed with each other to form a ring.

The aromatic ring represented by $Q^2$ may be an aromatic hydrocarbon ring hydrocarbon ring or an aromatic heterocycle. However, these may be monocycles, and they may be further condensed with another ring to form a condensed ring. Examples of the aromatic hydrocarbon ring preferably include a monocyclic or bicyclic aromatic hydrocarbon ring having 6 to 30 carbon atoms (e.g., a benzene ring, a naphthalene ring, and the like), more preferably an aromatic hydrocarbon ring having 6 to 20 carbon atoms, and even more preferably an aromatic hydrocarbon ring having 6 to 12 carbon atoms. Further more preferred is a benzene ring.

The aromatic heterocycle is preferably a nitrogen atom- or a sulfur atom-containing aromatic heterocycle. Specific examples of heterocycle include the rings such as a thiophene ring, an imidazole ring, a pyrazole ring, a pyridine ring, a pyrazine ring, a pyridazine ring, a triazole ring, a triazine ring, an indole ring, an indazole ring, a purine ring, a thiazoline ring, a thiazole ring, a thiadiazole ring, an oxazoline ring, an oxazole ring, an oxadiazole ring, a quinoline ring, an isoquinoline ring, a phthalazine ring, a naphthyridine ring, a quinoxaline ring, a quinazoline ring, a cinnoline ring, a pteridine ring, an acridine ring, a phenanthroline ring, a phenazine ring, a tetrazole ring, a benzimidazole ring, a benzoxazole ring, a benzthiazole ring, a benzotriazole ring, a tetrazaindene ring, and the like. The aromatic heterocycle is preferably a pyridine ring, a triazine ring, or a quinoline ring.

The aromatic ring represented by $Q^2$ is preferably aromatic hydrocarbon ring, more preferably a naphthalene ring, a benzene ring, and particularly preferably a benzene ring. $Q^2$ may further have a substituent, and preferred examples of the substituent include those exemplified as the above-described substituent T.

Among the compounds represented by the formula (101), preferred is the compound represented by the following formula (101-A).

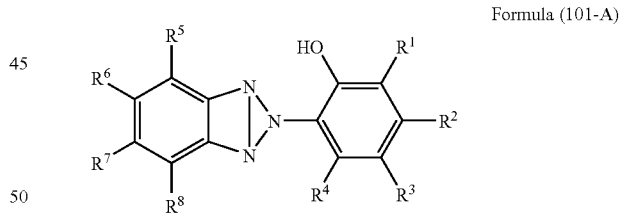

In the formula (101-A), $R^1$, $R^2$, $R^3$, $R^4$, $R^5$, $R^6$, $R^7$ and $R^8$ each independently represent a hydrogen atom or a substituent.

$R^1$, $R^2$, $R^3$, $R^4$, $R^5$, $R^6$, $R^7$, $R^8$ and $R^9$ each independently represent a hydrogen atom or a substituent, and examples of the substituent include those exemplified as the above-described substituent T. Further, these may be further substituted by another substituent, or the substituents may be condensed with each other to form a ring.

Examples of $R^1$ and $R^3$ preferably include a hydrogen atom, an alkyl group, an alkenyl group, an alkynyl group, an aryl group, a substituted or unsubstituted amino ring, an alkoxy group, an aryloxy group, a hydroxyl group, a halogen atom, more preferably a hydrogen atom, an alkyl group, an aryl group, an alkyloxy group, and an aryloxy group, a halogen atom, even more preferably a hydrogen atom, an alkyl group having 1 to 12 carbon atoms, and particularly preferably an alkyl group having 1 to 12 carbon atoms (preferably 4 to 12 carbon atoms).

Examples of $R^2$ and $R^4$ preferably include a hydrogen atom, an alkyl group, an alkenyl group, an alkynyl group, an aryl group, a substituted or unsubstituted amino group, an alkoxy group, an aryloxy group, a hydroxyl group, and a halogen atom, more preferably a hydrogen atom, an alkyl group, an aryl group, an alkyloxy group, an aryloxy group, and a halogen atom, even more preferably a hydrogen atom, an alkyl group having 1 to 12 carbon atoms, particularly preferably a hydrogen atom, and a methyl group, and most preferably a hydrogen atom.

Examples of $R^5$ and $R^8$ preferably include a hydrogen atom, an alkyl group, an alkenyl group, an alkynyl group, an aryl group, a substituted or unsubstituted amino group, an alkoxy group, an aryloxy group, a hydroxyl group, and a halogen atom, more preferably a hydrogen atom, an alkyl group, an aryl group, an alkyloxy group, an aryloxy group, and a halogen atom, even more preferably a hydrogen atom, and an alkyl group having 1 to 12 carbon atoms, and particularly preferably a hydrogen atom, and a methyl group, and most preferably a hydrogen atom.

Examples of $R^6$ and $R^7$ preferably include a hydrogen atom, an alkyl group, an alkenyl group, an alkynyl group, an aryl group, a substituted or unsubstituted amino group, an alkoxy group, an aryloxy group, a hydroxyl group, and a halogen atom, more preferably a hydrogen atom, an alkyl group, an aryl group, an alkyloxy group, an aryloxy group, and a halogen atom, even more preferably a hydrogen atom, and a halogen atom, and particularly preferably a hydrogen atom, and a chlorine atom.

Among the compounds represented by the formula (101), preferred is the compound represented by the following formula (101-B).

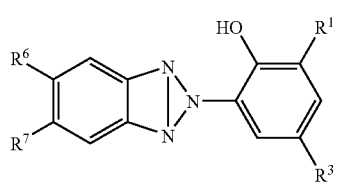

Formula (101-B)

In the formula (101-B), $R^1$, $R^3$, $R^6$ and $R^7$ have the same definitions and preferable ranges for the formula (101-A), respectively.

Other examples of the compound represented by the formula (101) include the compound represented by the following formula (101-C).

$Q^1$-$Q^2$-OH    Formula (101-C)

[In the formula (101-C), $Q^1$ represents a 1,3,5-triazine ring, and $Q^2$ represents a divalent aromatic ring.]

In the formula (101-C), $Q^1$ represents a 1,3,5-triazine ring and may further have a substituent. Examples of the substituent include those exemplified for the above-described substituent T. Further, if there are a plurality of substituents, they may be further condensed with each other to form a ring. Examples of the aromatic ring represented by $Q^2$ include those as defined for the formula (101).

Among the compounds represented by the formula (101), preferred is the compound represented by the following formula (101-D).

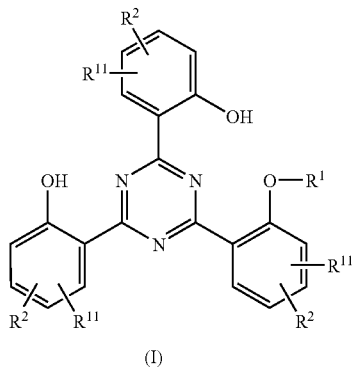

Formula (101-D)

In the formula (101-D), $R^1$ represents a hydrogen atom or a substituent, and $R^2$ and $R^{11}$ each independently represent substituent.

In the formula (101-D), $R^1$ preferably represents any one of the following substituents of (a), (b) and (c) Specifically, it is preferable that (a) $R^1$ represents an alkyl group having 1 to 18 carbon atoms; a cycloalkyl group having 5 to 12 carbon atoms; an alkenyl group having 3 to 18 carbon atoms; a phenyl group; an alkyl group having 1 to 18 carbon atoms substituted by a phenyl group, OH, an alkoxy group having 1 to 18 carbon atoms, a cycloalkoxy group having 5 to 12 carbon atoms, an alkenyloxy group having 3 to 18 carbon atoms, a halogen atom, —COOH—, —COOR$^4$—, —O—CO—R$^5$, —O—CO—O—R$^6$, —CO—NH$_2$, —CO—NHR$^7$, —CO—N(R$^7$)(R$^8$), CN, NH$_2$, NHR$_7$, —N(R$^7$)(R$^8$), —NH—CO—R$^5$, a phenoxy group, a phenoxy group substituted by an alkyl group having 1 to 18 carbon atoms, a phenylalkoxy group having 1 to 4 carbon atoms, a non-cycloalkoxy group having 6 to 15 carbon atoms, a non-cycloalkylalkoxy group having 6 to 15 carbon atoms, a non-cycloalkenylalkoxy group having 6 to 15 carbon atoms, or a tricycloalkoxy group having 6 to 15 carbon atoms; a cycloalkyl group having 5 to 12 carbon atoms substituted by OH, an alkyl group having 1 to 4 carbon atoms, an alkenyl group having 2 to 6 carbon atoms or —O— CO—R$^5$; a glycidyl group; —CO—R$^9$ or —SO$_2$—R$^1$, (b) $R^1$ represents an alkyl group having 3 to 50 carbon atoms interrupted by, at least one oxygen atom and/or substituted by OH, a phenoxy group or an alkylphenoxy group having 7 to 18 carbon atoms, or (c) $R^1$ represents -A; —CH$_2$—CH(XA)-CH$_2$—O—R$^{12}$; —CR$^{13}$R$'^{13}$—(CH$_2$)$_m$—X-A; —CH$_2$—CH(OA)-R$^{14}$; —CH$_2$—CH(OH) —CH$_2$—XA;

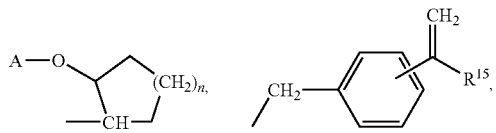

—CR$^{15}$R'$_{15}$—C(=CH$_2$)—R"$^{15}$; —R$^{13}$R'$^{13}$—(CH$_2$)$_m$—CO—X-A; —CR$^{13}$R'$^{13}$—(CH$_2$)$_m$—CO—O—CR$^{15}$R'$^{15}$—C(=CH$_2$)—R"$^{15}$ or —CO—O—CR$^{15}$R'$^{15}$—C(=CH$_2$)—R"$^{15}$ (wherein A represents —CO—CR$^{16}$=CH—R$^{17}$).

Preferably, $R^2$'s each independently represent an alkyl group having 6 to 18 carbon atoms; an alkenyl group having 2 to 6 carbon atoms; a phenyl group; a phenylalkyl group having 7 to 11 carbon atoms; COOR$^4$; CN; —NH—CO—R$^5$; a halogen atom; a trifluoromethyl group; or —O—R$^3$.

R$^3$ has the same definition for R$^1$. R$^4$ represents an alkyl group having 1 to 18 carbon atoms; an alkenyl group having 3 to 18 carbon atoms; a phenyl group; a phenylalkyl group having 7 to 11 carbon atoms; or a cycloalkyl group having 5 to 12 carbon atoms; or R$^4$ represents an alkyl group having 3 to 50 carbon atoms interrupted by at least one of —O—, —NH—, —NR$^7$— and —S— and/or substituted by OH, a phenoxy group or an alkylphenoxy group having 7 to 18 carbon atoms.

R$^5$ represents a hydrogen atom; an alkyl group having 1 to 18 carbon atoms; an alkenyl group having 2 to 18 carbon atoms; a cycloalkyl group having 5 to 12 carbon atoms; a phenyl group; a phenylalkyl group having 7 to 11 carbon atoms; a non-cycloalkyl group having 6 to 15 carbon atoms; a non-cycloalkenyl group having 6 to 15 carbon atoms; or a tricycloalkyl group having 6 to 15 carbon atoms.

R$^6$ represents a hydrogen atom; an alkyl group having 1 to 18 carbon atoms; an alkenyl group having 3 to 18 carbon atoms; a phenyl group; a phenylalkyl group having 7 to 11 carbon atoms; or a cycloalkyl group having 5 to 12 carbon atoms.

R$^7$ and R$^8$ each independently represent an alkyl group having 1 to 12 carbon atoms; an alkoxyalkyl group having 3 to 12 carbon atoms; a dialkylaminoalkyl group having 4 to 16 carbon atoms; or cycloalkyl group having 5 to 12 carbon atoms, or R$^7$ and R$^8$ are combined with each other to form an alkylene group having 3 to 9 carbon atoms, an oxaalkylene group having 3 to 9 carbon atoms, or an azaalkylene group having 3 to 9 carbon atoms.

R$^9$ represents an alkyl group having 1 to 18 carbon atoms; an alkenyl group having 2 to 18 carbon atoms; a phenyl group; a cycloalkyl group having 5 to 12 carbon atoms; a phenylalkyl group having 7 to 11 carbon atoms; a non-cycloalkyl group having 6 to 15 carbon atoms; a non-cycloalkylalkyl group having 6 to 15 carbon atoms; a non-cycloalkenyl group having 6 to 15 carbon atoms; or a tricycloalkyl group having 6 to 15 carbon atoms.

R$^{10}$ represents an alkyl group having 1 to 12 carbon atoms; a phenyl group; a naphthyl group; or an alkylphenyl group having 7 to 14 carbon atoms.

R$^{11}$'s each independently represent a hydrogen atom; an alkyl group having 1 to 18 carbon atoms; an alkenyl group having 3 to 6 carbon atoms; a phenyl group; a phenylalkyl group having 7 to 11 carbon atoms; a halogen atom; or an alkoxy group having 1 to 18 carbon atoms.

R$^{12}$ represents an alkyl group having 1 to 18 carbon atoms; an alkenyl group having 3 to 18 carbon atoms; a phenyl group; a phenyl group having 1 to 3 substituents such as an alkyl group having 1 to 8 carbon atoms, an alkoxy group having 1 to 8 carbon atoms, an alkenoxy group having 3 to 8 carbon atoms, a halogen atom or a trifluoromethyl group; a phenylalkyl group having 7 to 11 carbon atoms; a cycloalkyl group having 5 to 12 carbon atoms; a tricycloalkyl group having 6 to 15 carbon atoms; a non-cycloalkyl group having 6 to 15 carbon atoms; a non-cycloalkylalkyl group having 6 to 15 carbon atoms; a non-cycloalkenylalkyl group having 6 to 15 carbon atoms; or —CO—R$^5$, or R$^{12}$ represents an alkyl group having 3 to 50 carbon atoms interrupted by at least one of —O—, —NH—, —NR$^7$ and —S— and substituted by OH, a phenoxy group or an alkylphenoxy group having 7 to 18 carbon atoms.

R$^{13}$ and R$^{'13}$ each independently represent H; an alkyl group having 1 to 18 carbon atoms; or a phenyl group.

R$^{14}$ represents an alkyl group having 1 to 18 carbon atoms; an alkoxyalkyl group having 3 to 12 carbon atoms; a phenyl group; or a phenyl group substituted by an alkyl group having 1 to 4 carbon atoms.

R$^{15}$, R$^{'15}$ and R$^{''15}$ each independently represent a hydrogen atom or CH$_3$; R$^{16}$ represents a hydrogen atom; —CH$_2$—COO—R$^4$; an alkyl group having 1 to 4 carbon atoms; or CN, R$^{17}$ represents a hydrogen atom; —COOR$^4$; an alkyl group having 1 to 17 carbon atoms; or phenyl group.

X represents —NH—; —NR$_7$—; —O—; —NH—(CH$_2$)$_p$—NH—; or —O—(CH$_2$)$_q$—NH—; and an exponent m represents the number of 0 to 19; n represents the number of 1 to 8; p represents the number of 0 to 4; and q represents the number of 2 to 4, provided that in the formula (101-D), at least one of the groups R$^1$, R$^2$ and R$^{11}$ contains at least two carbon atoms.

Further, the compound of the formula (101-D) will be explained.

The groups R$^1$ to R$^{10}$, R$^{12}$ to R$^{14}$, R$^{16}$ and R$^{17}$ as the alkyl group is a branched or non-branched alkyl group, such as a methyl group, an ethyl group, a propyl group, an isopropyl group, an n-butyl group, a sec-butyl group, an isobutyl group, a tert-butyl group, a 2-ethylbutyl group, an n-pentyl group, an isopentyl group, a 1-methylpentyl group, a 1,3-dimethylbutyl group, an n-hexyl group, a 1-methylhexyl group, an n-heptyl group, an isoheptyl group, a 1,1,3,3-tetramethylbutyl group, a 1-methylheptyl group, a 3-methylheptyl group, an n-octyl group, a 2-ethylhexyl group, a 1,1,3-trimethylhexyl group, a 1,1,3,3-tetramethylpentyl group, a nonyl group, a decyl group, an undecyl group, a 1-methylundecyl group, a dodecyl group, a 1,1,3,3,5,5-hexamethylhexyl group, a tridecyl group, a tetradecyl group, a pentadecyl group, a hexadecyl group, a heptadecyl group, or an octadecyl group.

The groups R$^1$, R$^3$ to R$^9$ and R$^{12}$ as the cycloalkyl group having 5 to 12 carbon atoms include, for example, a cyclopentyl group, a cyclohexyl group, a cycloheptyl group, cyclooctyl group, a cyclononyl group, a cyclodecyl group, a cycloundecyl group, and a cyclododecyl group. Preferred are a cyclopentyl group, a cyclohexyl group, a cyclooctyl group and a cyclododecyl group.

R$^6$, R$^9$, R$^{11}$ and R$^{12}$ as the alkenyl group particularly include an allyl group, an isoprophenyl group, a 2-butenyl group, a 3-butenyl group, an isobutenyl group, an n-penta-2,4-diethyl group, a 3-methyl-but-2-enyl group, an n-oct-2-enyl group, an n-dodec-2-enyl group, an iso-dodecenyl group, an n-dode-2-enyl group, and an n-octadec-4-enyl group.

The substituted alkyl group, cycloalkyl group or phenyl group may have at least one substituent, and may have a substituent in the carbon atom bonded thereto (in the α-position) or other carbon atoms. If the substituent is bonded via a heteroatom (e.g., an alkoxy group), it is preferably not in the α-position, and the substituted alkyl group contains 2, particularly 3, or more carbon atoms. At least two substituents preferably bond with other carbon atoms.

Further, the alkyl group interrupted by —O—, —NH—, —NR$^7$— or —S— may have at least one interruption with the group(s). In each case, generally one group is inserted in one bond, and there is no occurrence of a hetero-hetero bond, such as O—O, S—S, NH—NH, or the like; and if the interrupted alkyl group has a further substituent, the substituent is generally not in the α-position relative to the heteroatom. If one group has interruption by at least two of —O—, —NH—, —NR$^7$— and —S—, the same applies thereto.

The aryl group is generally an aromatic hydrocarbon group, such as a phenyl group, a non-phenyl group and a naphthyl group, preferably a phenyl group and a non-phenyl group. The aralkyl is generally an aryl group, particularly an alkyl group substituted by a phenyl group; and thus aralkyl having 7 to 20 carbon atoms includes, for example, a benzyl group, an α-methylbenzyl group, a phenylethyl group, a phenylpropyl group, a phenylbutyl group, a phenylpentyl group and a phenylhexyl group; the phenylalkyl group having 7 to 11 carbon atoms is preferably a benzyl group, an α-methylbenzyl group or an α,α-dimethylbenzyl group.

The alkylphenyl group and the alkylphenoxy group are a phenyl group and a phenoxy group which are substituted by an alkyl group, respectively.

The halogen atom as a halogen substituent is a fluorine atom, a chlorine atom, a bromine atom, or an iodine atom, more preferably a fluorine atom or a chlorine atom, and particularly preferably a chlorine atom.

The alkylene group having 1 to 20 carbon atoms includes, for example, a methylene group, an ethylene group, a propylene group, a butylenes group, a pentylene group, a hexylene group, and the like. Here, the alkyl chain may be branched, and it includes, for example, an isopropylene group.

The cycloalkenyl group having 4 to 12 carbon atoms includes, for example, a 2-cyclobuten-2-yl group, a 2-cyclopenten-1-yl group, a 2,4-cyclopentadien-1-yl group, a 2-cyclohexen-1-yl group, a 2-cyclohepten-1-yl group, and a 2-cyclooecten-1-yl group.

The non-cycloalkyl group having 6 to 15 carbon atoms includes, for example, a bornyl group, a norbornyl group, and a [2.2.2]non-cyclooctyl group, preferably a bornyl group and a norbornyl group, and particularly preferably a bornyl group and a norborn-2-yl group.

The non-cycloalkoxy group having 6 to 15 carbon atoms includes, for example, a bornyloxy group and a norborn-2-yloxy group.

The non-cycloalkyl-alkyl group or -alkoxy group having 6 to 15 carbon atoms is an alkyl group or alkoxy group, which is substituted by a non-cycloalkyl group, and has the total number of carbon atoms of 6 to 15; and specific examples thereof include a norbornane-2-methyl group and a norbornyl-2-methoxy group.

The non-cycloalkenyl group having 6 to 15 carbon atoms includes, for example, a norbornenyl group and a norbornadienyl group, preferably a norbornenyl group, and particularly preferably a norborn-5-ene group.

The non-cycloalkenylalkoxy group having 6 to 15 carbon atoms is an alkoxy group which is substituted by a non-cycloalkenyl group, and has the total number of carbon atoms of 6 to 15; and specific examples thereof include a norborn-5-ene-2-methoxy group.

The tricycloalkyl group having 6 to 15 carbon atoms includes, for example, a 1-adamantyl group and a 2-adamantyl group, and preferably a 1-adamantyl group.

The tricycloalkoxy group having 6 to 15 carbon atoms is, for example, an adamantyloxy group. The heteroaryl group having 3 to 12 carbon atoms is preferably a pyridinyl group, a pyrimidinyl group, a triazinyl group, a pyrrolyl group, a furanyl group, a thiophenyl group, or a quinolinyl group.

The compound represented by the formula (101-D) is more preferably any one of the following (a'), (b') and (c'). Specifically, it is preferable that (a') $R^1$ represents an alkyl group having 1 to 18 carbon atoms; a cycloalkyl group having 5 to 12 carbon atoms; an alkenyl group having 3 to 12 carbon atoms; a phenyl group; an alkyl group having 1 to 18 carbon atoms substituted by a phenyl group, OH, an alkoxy group having 1 to 18 carbon atoms, a cycloalkoxy group having 5 to 12 carbon atoms, an alkenyloxy group having 3 to 18 carbon atoms, a halogen atom, —COOH—, —COOR$^4$, —O—CO—R$^5$, —O—CO—O—R$^6$, —CO—NH$_2$, —CO—NHR$_7$, —CO—N(R$^7$)(R$^8$), CN, NH$_2$, NHR$^7$, —N(R$^7$)(R$^8$), —NH—CO—R$^5$, a phenoxy group, a phenoxy group substituted by an alkyl group having 1 to 18 carbon atoms, a phenylalkoxy group having 1 to 4 carbon atoms, a bornyloxy group, a norborn-2-yloxy group, a norbornyl-2-methoxy group, a norborn-5-ene-2-methoxy group, or an adamantyloxy group; a cycloalkyl group having 5 to 12 carbon atoms substituted by OH, an alkyl group having 1 to 4 carbon atoms, an alkenyl group having 2 to 6 carbon atoms and/or —O—CO—R$^5$—; a glycidyl group; —CO—R$^9$ or —SO$_2$—R$^{10}$, or (b') $R^1$ represents an alkyl group having 3 to 50 carbon atoms which is interrupted by at least one oxygen atom and/or substituted by OH, a phenoxy group, or an alkylphenoxy group having 7 to 18 carbon atoms, or (c') $R^1$ represents any one of -A; —CH$_2$—CH(XA)-CH$_2$—O—R$^{12}$; —CR$^{13}$R'$^{13}$—(CH$_2$)$_m$—X-A; —CH$_2$—CH(OA)-R$^{14}$; —CH$_2$—CH(OH)—CH$_2$—XA;

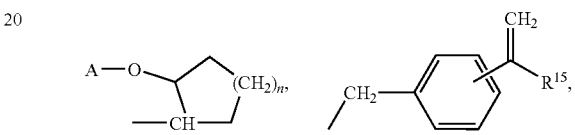

—CR$^{15}$R'$^{15}$—C(=CH$_2$)—R''$^{15}$; —CR$^{13}$R'$^{13}$—(CH$_2$)$_m$—CO—X-A; —CR$^{13}$R'$^{13}$—(CH$_2$)$_m$—CO—O—CR$^{15}$R'$^{15}$—C(=CH$_2$)—R''$^{15}$ and —CO—O—CR$^{15}$R'$^{15}$—C(=CH$_2$)—R''$^{15}$ (wherein A represents —CO—CR$^{16}$=CH—R$^{17}$).

$R^2$ represents an alkyl group having 6 to 18 carbon atoms; an alkenyl group having 2 to 6 carbon atoms; a phenyl group; —O—R$^3$ or —NH—CO—R$^5$, $R^3$ has the same definition for $R^1$, and $R^3$'s are independent from each other. $R^4$ represents an alkyl group having 1 to 18 carbon atoms; an alkenyl group having 3 to 18 carbon atoms; a phenyl group; a phenylalkyl group having 7 to 11 carbon atoms; or a cycloalkyl group having 5 to 12 carbon atoms; or $R^4$ represents an alkyl group having 3 to 50 carbon atoms which is interrupted by at least one of —O—, —NH—, —NR$^7$— and —S—, and substituted by OH, a phenoxy group or an alkylphenoxy group having 7 to 18 carbon atoms.

$R^5$ represents a hydrogen atom; an alkyl group having 1 to 18 carbon atoms; an alkenyl group having 2 to 18 carbon atoms; a cycloalkyl group having 5 to 12 carbon atoms; a phenyl group; a phenylalkyl group having 7 to 11 carbon atoms; a norborn-2-yl group; a norborn-5-ene-2-yl group; or an adamantyl group.

$R^6$ represents a hydrogen atom; an alkyl group having 1 to 18 carbon atoms; an alkenyl group having 3 to 18 carbon atoms; a phenyl group; a phenylalkyl group having 7 to 11 carbon atoms; or a cycloalkyl group having 5 to 12 carbon atoms.

$R^7$ and $R^8$ each independently represents an alkyl group having 1 to 12 carbon atoms; an alkoxyalkyl group having 3 to 12 carbon atoms; a dialkylaminoalkyl group having 4 to 16 carbon atoms; or a cycloalkyl group having 5 to 12 carbon atoms; or $R^7$ and $R^8$ may be combined with each other to form an alkylene group having 3 to 9 carbon atoms; an oxaalkylene group having 3 to 9 carbon atoms or an azaalkylene group having 3 to 9 carbon atoms.

$R^9$ represents an alkyl group having 1 to 18 carbon atoms; an alkenyl group having 2 to 18 carbon atoms; a phenyl group; a cycloalkyl group having 5 to 12 carbon atoms; a phenylalkyl group having 7 to 11 carbon atoms; a norborn-2-yl group; a norborn-5-en-yl group; or an adamantyl group.

$R^{10}$ represents an alkyl group having 1 to 12 carbon atoms; a phenyl group; a naphthyl group; or an alkylphenyl group having 7 to 14 carbon atoms.

$R^{11}$'s each independently represent a hydrogen atom; an alkyl group having 1 to 18 carbon atoms; or a phenylalkyl group having 7 to 11 carbon atoms.

$R^{12}$ represents an alkyl group having 1 to 18 carbon atoms; an alkenyl group having 3 to 18 carbon atoms; a phenyl group; a phenyl group having 1 to 3 substituents such as an alkyl group having 1 to 8 carbon atoms, an alkoxy group having 1 to 8 carbon atoms, an alkenoxy group having 3 to 8 carbon atoms, a halogen atom or a trifluoromethyl group; a phenylalkyl group having 7 to 11 carbon atoms; a cycloalkyl group having 5 to 12 carbon atoms; a 1-adamantyl group; a 2-adamantyl group; a norbornyl group; a norbornane-2-methyl-; or —CO—$R_5$; or $R^{12}$ represents an alkyl group having 3 to 50 carbon atoms which is interrupted by at least one of —O—, —NH—, —$NR^7$— or —S, and substituted by OH, a phenoxy group or an alkylphenoxy group having 7 to 18 carbon atoms.

$R^{13}$ and $R'^{13}$ each independently represent a hydrogen atom; an alkyl group having 1 to 18 carbon atoms; or a phenyl group.

$R^{14}$ represents an alkyl group having 1 to 18 carbon atoms; an alkoxyalkyl group having 3 to 12 carbon atoms; a phenyl group; or a phenyl-alkyl group having 1 to 4 carbon atoms.

$R^{15}$, $R'^{15}$ and $R''^{15}$ each independently represent H or $CH_3$; $R^{16}$ represents a hydrogen atom; —$CH_2$—COO—$R^4$; an alkyl group having 1 to 4 carbon atoms; or CN; and $R^{17}$ represents a hydrogen atom; —$COOR^4$; an alkyl group having 1 to 17 carbon atoms; or a phenyl group.

X represents —NH—; —$NR^7$—; —O—; —NH—$(CH_2)_p$—NH—; or —O—$(CH_2)_q$—NH—, m represents the number of 0 to 19, n represents the number of 1 to 8, p represents the number of 0 to 4, and q represents a number of 2 to 4.

The compounds represented by the formula (101-C) and (101-D) can be obtained by a conventionally used method, for example, the method as described in European Patent Publication No. 434608 or H. Brunetti and C. E. Luthi, Helv. Chim. Acta 55, 1566 (1972), or similarly by a Friedel-Crafts addition of halotriazine to the corresponding phenol as in the production of a well-known compound.

Hereinbelow, preferable examples of the compound represented by the formula (101) will be presented, but the ultraviolet absorbers which can be used in the present invention are not limited to specific examples as presented below.

TABLE 1

| Compound No | $R^3$ | $R^1$ |
|---|---|---|
| UV-1 | —$CH_2CH(OH)CH_2OC_4H_{9\text{-}n}$ | —$CH_3$ |
| UV-2 | —$CH_2CH(OH)CH_2OC_4H_{9\text{-}n}$ | —$C_2H_5$ |

TABLE 1-continued

| Compound No | $R^3$ | $R^1$ |
|---|---|---|
| UV-3 | $R^3 = R^1 = $ —$CH_2CH(OH)CH_2OC_4H_{9\text{-}n}$ | |
| UV-4 | —$CH(CH_3)$—CO—O—$C_2H_5$ | —$C_2H_5$ |
| UV-5 | $R^3 = R^1 = $ —$CH(CH_3)$—CO—$C_2H_5$ | |
| UV-6 | —$C_2H_5$ | —$C_2H_5$ |
| UV-7 | —$CH_2CH(OH)CH_2OC_4H_{9\text{-}n}$ | —$CH(CH_3)_2$ |
| UV-8 | —$CH_2CH(OH)CH_2OC_4H_{9\text{-}n}$ | —$CH(CH_3)$—$C_2H_5$ |
| UV-9 | $R^3 = R^1 = $ —$CH_2CH(C_2H_5)$—$C_4H_{9\text{-}n}$ | |
| UV-10 | —$C_8H_{17\text{-}n}$ | —$C_8H_{17\text{-}n}$ |
| UV-11 | —$C_3H_{7\text{-}n}$ | —$CH_3$ |
| UV-12 | —$C_3H_{7\text{-}n}$ | —$C_2H_5$ |
| UV-13 | —$C_3H_{7\text{-}n}$ | —$C_3H_{7\text{-}n}$ |
| UV-14 | —$C_3H_7\_\text{iso}$ | —$CH_3$ |
| UV-15 | —$C_3H_7\_\text{iso}$ | —$C_2H_5$ |
| UV-16 | —$C_3H_7\_\text{iso}$ | —$C_3H_7\_\text{iso}$ |
| UV-17 | —$C_4H_{9\text{-}n}$ | —$CH_3$ |
| UV-18 | —$C_4H_{9\text{-}n}$ | —$C_2H_5$ |
| UV-19 | —$C_4H_{9\text{-}n}$ | —$C_4H_{9\text{-}n}$ |

TABLE 2

| Compound No | $R^3$ | $R^1$ |
|---|---|---|
| UV-20 | —$CH_2CH(CH_3)_2$ | —$CH_3$ |
| UV-21 | —$CH_2CH(CH_3)_2$ | —$C_2H_5$ |
| UV-22 | —$CH_2CH(CH_3)_2$ | —$CH_2CH(CH_3)_2$ |
| UV-23 | n-hexyl | —$CH_3$ |
| UV-24 | n-hexyl | —$C_2H_5$ |
| UV-25 | n-hexyl | n-hexyl |
| UV-26 | —$C_7H_{15\text{-}n}$ | —$CH_3$ |
| UV-27 | —$C_7H_{15\text{-}n}$ | —$C_2H_5$ |
| UV-28 | —$C_7H_{15\text{-}n}$ | —$C_7H_{15\text{-}n}$ |
| UV-29 | —$C_8H_{17\text{-}n}$ | —$CH_3$ |
| UV-30 | —$C_8H_{17\text{-}n}$ | —$C_2H_5$ |
| UV-31 | —$CH_2CHCH(CH_3)_2$ | —$CH_2CHCH(CH_3)_2$ |
| UV-32 | —$C_5H_{11\text{-}n}$ | —$C_5H_{11\text{-}n}$ |
| UV-33 | —$C_{12}H_{25\text{-}n}$ | —$C_{12}H_{25\text{-}n}$ |
| UV-34 | —$C_{16}H_{33\text{-}n}$ | —$C_2H_5$ |
| UV-35 | —$CH_2$—CO—O—$C_2H_5$ | —$CH_2$—CO—O—$C_2H_5$ |

TABLE 2-continued

| Compound No | R³ | R¹ |
|---|---|---|
| UV-1' | (benzotriazolyl-phenol with t-Bu and OC₃H) | |
| UV-2' | (benzotriazolyl-di-t-butylphenol) | |
| UV-3' | (5-chloro-benzotriazolyl-di-t-butylphenol) | |
| UV-4' | (5-bromo-benzotriazolyl-di-t-butylphenol) | |
| UV-5' | (benzotriazolyl-phenol with 1-ethylpropyl and t-Bu) | |
| UV-6' | (benzotriazolyl-phenol with t-Bu and OC₈H₁₇) | |
| UV-7' | (benzotriazolyl-phenol with di-t-amyl) | |
| UV-8' | (benzotriazolyl-phenol with two cumyl groups) | |

TABLE 2-continued

Compound No | R³ | R¹
---|---|---

UV-9'

UV-10'

UV-11'

UV-12'

UV-13'

UV-14'

UV-15'

UV-16'

TABLE 2-continued

Further, as the organic compound used in the present invention, the chromatic dispersion regulating agent represented by the following formula (102) may be used.

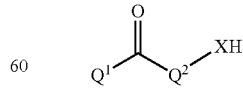

Formula(102)

wherein $Q^1$ represents a monovalent aromatic ring, $Q^2$ represents a divalent aromatic ring, and X is NR (wherein R is a hydrogen atom or a substituent), an oxygen atom or a sulfur atom.

The aromatic ring represented by Q¹ and Q² may be an aromatic hydrocarbon ring or an aromatic heterocyclic ring. These substituents may be monocyclic or may form a fused ring with other rings.

The aromatic hydrocarbon ring represented by Q¹ and Q² is a monocyclic or bicyclic aromatic hydrocarbon ring having 6 to 30 carbon atoms (e.g., a benzene ring, a naphthalene ring, etc.), more preferably an aromatic hydrocarbon ring having 6 to 20 carbon atoms, and even more preferably an aromatic hydrocarbon ring having 6 to 12 carbon atoms. Particularly preferred is a benzene ring.

The aromatic heterocyclic ring represented by Q¹ and Q² is preferably an aromatic heterocyclic rings containing at least one selected from an oxygen atom, a nitrogen atom and a sulfur atom. Specific examples of the heterocyclic ring include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. Preferred examples of the aromatic heterocyclic ring are pyridine, triazine and quinoline.

The aromatic ring represented by Q¹ and Q² is preferably an aromatic hydrocarbon ring, more preferably an aromatic hydrocarbon ring having 6 to 10 carbon atoms, and even more preferably a substituted or unsubstituted benzene ring.

Q¹ and Q² may be further substituted, and the substituent is preferably the following substituent T. However, the substituent does not include carboxylic acids, sulfonic acids or quaternary ammonium salts. If possible, the substituents may be bonded to each other to form a ring structure.

X is NR (where R is a hydrogen atom or a substituent, and the substituent may be exemplified by the following substituent T), an oxygen atom or a sulfur atom. X is preferably NR (wherein R is preferably an acyl group or a sulfonyl group, and these substituents may be further substituted) or O, and particularly preferably O.

The compound represented by Formula (102) is preferably a compound represented by the following Formula (102-A):

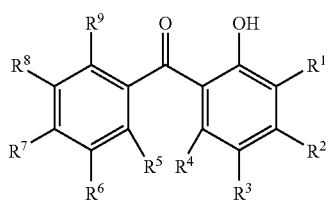

Formula(102-A)

wherein R¹, R², R³, R⁴, R⁵, R⁶, R⁷, R⁸ and R⁹ are each independently a hydrogen atom or a substituent.

R¹, R², R³, R⁴, R⁵, R⁶, R⁷, R⁸ and R⁹ each independently represent a hydrogen atom or a substituent, and the substituent may be exemplified by the above-described substituent T. These substituents may be further substituted with other substituents, and the substituents may be condensed to form a ring structure.

R¹, R³, R⁴, R⁵, R⁶, R⁸ and R⁹ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; and particularly preferably a hydrogen atom or a methyl group; and most preferably a hydrogen atom.

R² is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably an alkoxy group having 1 to 20 carbon atoms; and particularly preferably an alkoxy group having 1 to 12 carbon atoms.

R⁷ is preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 20 carbon atoms (preferably having 1 to 12 carbon atoms, more preferably 1 to 8 carbon atoms, and even more preferably a methyl group); and particularly preferably a methyl group or a hydrogen atom.

The compound represented by Formula (102) is more preferably a compound represented by the following Formula (102-B):

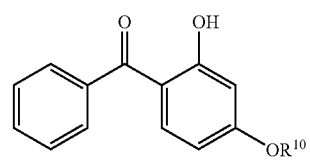

Formula (102-B)

wherein R¹⁰ is a hydrogen atom, a substituted or unsubstituted alkyl group, a substituted or unsubstituted alkenyl group, a substituted or unsubstituted alkynyl group, or a substituted or unsubstituted aryl group.

R¹⁰ is a hydrogen atom, a substituted or unsubstituted alkyl group, a substituted or unsubstituted alkenyl group, a substituted or unsubstituted alkynyl group, or a substituted or unsubstituted aryl group, and the substituents on the aforementioned groups can be exemplified by the substituent T.

R¹⁰ is preferably a substituted or unsubstituted alkyl group, more preferably a substituted or unsubstituted alkyl group having 5 to 20 carbon atoms, even more preferably a substituted or unsubstituted alkyl group having 5 to 12 carbon atoms (e.g., a hexyl group, a 2-ethylhexyl group, an octyl group, a decyl group, a dodecyl group, a benzyl group, etc.), and particularly preferably a substituted or unsubstituted alkyl group having 6 to 12 carbon atoms (e.g., a 2-ethylhexyl group, an octyl group, a decyl group, a dodecyl group or a benzyl group).

The compound represented by Formula (102) can be synthesized by a known method described in JP-A No. 11-12219.

Specific examples of the compound represented by Formula (102) are given below but the compounds which can be used in the present invention are not limited thereto.

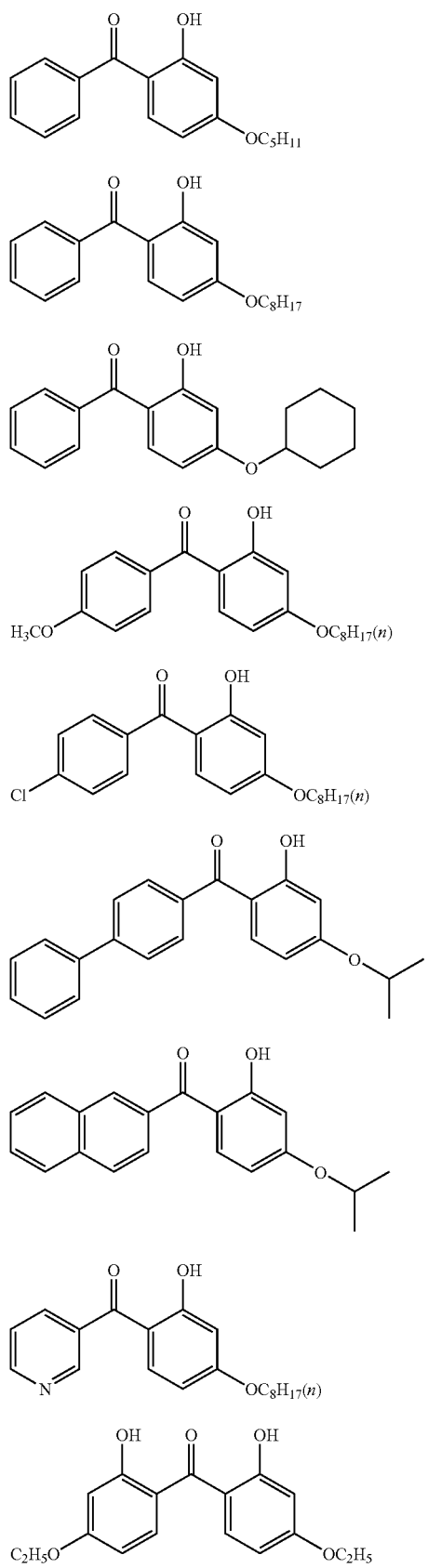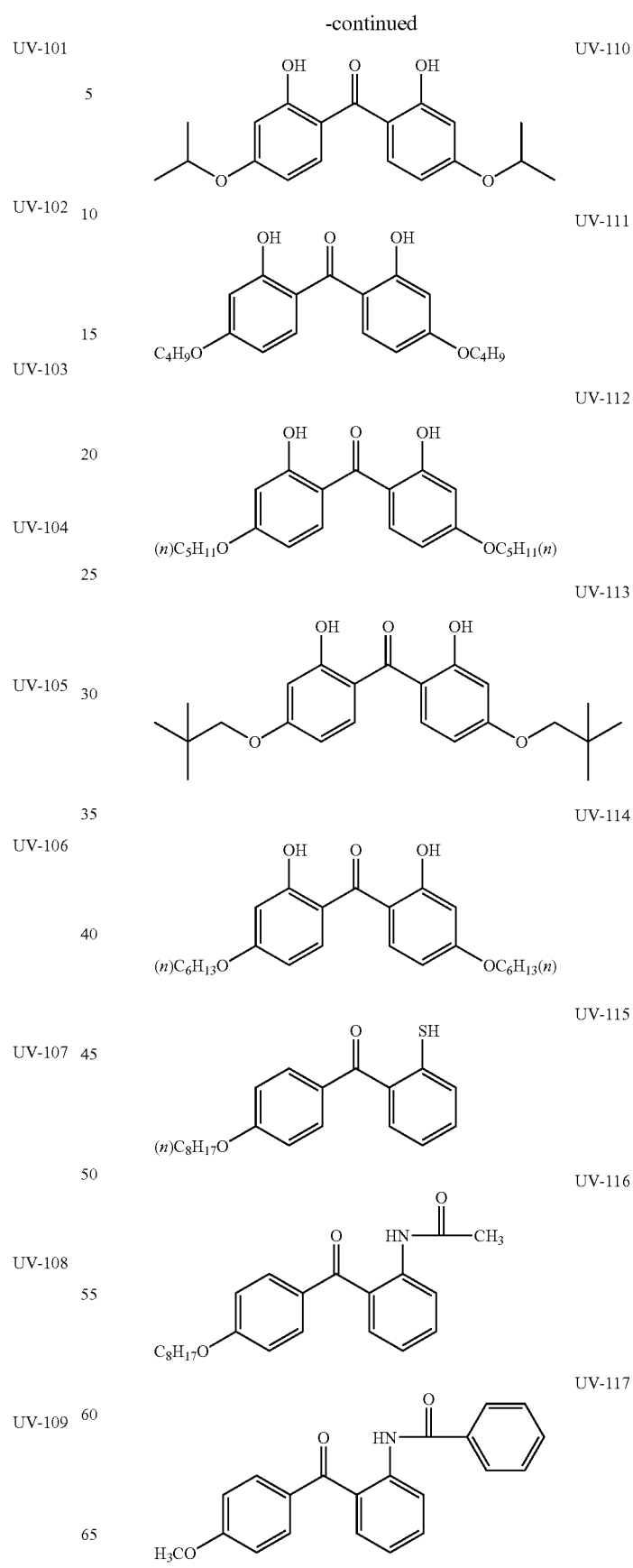

-continued

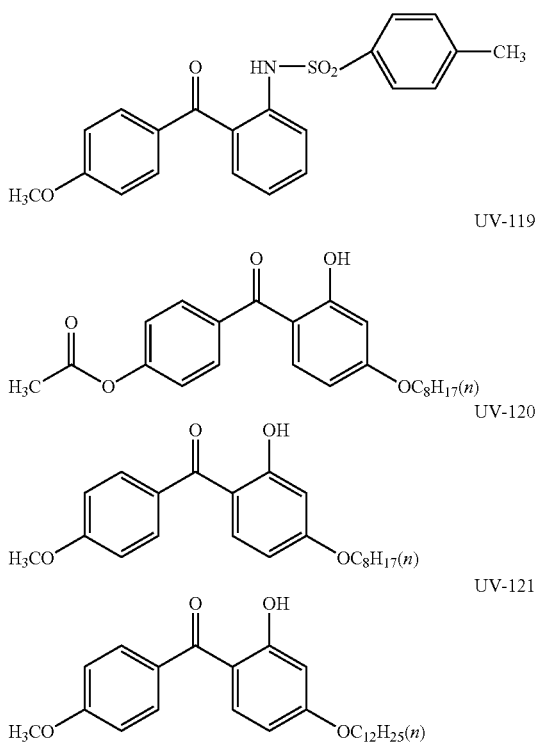

Further, as another organic compound used in the present invention, the chromatic dispersion regulating agent represented by the following Formula (103) may be preferably used.

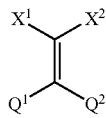

Formula(103)

wherein $Q^1$ and $Q^2$ are each independently an aromatic ring. $X^1$ and $X^2$ are each a hydrogen atom or a substituent, and at least one of them is a cyano group.

The aromatic ring indicated as $Q^1$ and $Q^2$ may be an aromatic hydrocarbon ring or an aromatic heterocyclic ring. Further, these may be monocyclic or may for a fused ring with other rings.

The aromatic hydrocarbon ring is preferably a monocyclic or bicyclic aromatic hydrocarbon ring having 6 to 30 carbon atoms (e.g., benzene ring, naphthalene ring, etc.), more preferably an aromatic hydrocarbon ring having 6 to 20 carbon atoms, even more preferably an aromatic hydrocarbon ring having 6 to 12 carbon atoms, and particularly preferably a benzene ring.

The aromatic heterocyclic ring is preferably an aromatic heterocyclic ring containing a nitrogen atom or a sulfur atom. Specific examples of the heterocyclic ring include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzothiazole, benzotriazole, tetrazaindene and the like. The aromatic heterocyclic ring is preferably pyridine, triazine or quinoline.

The aromatic ring indicated as $Q^1$ and $Q^2$ is preferably an aromatic hydrocarbon ring, and more preferably a benzene ring.

$Q^1$ and $Q^2$ may be further substituted, and the above-mentioned T is preferably used.

$X^1$ and $X^2$ are a hydrogen atom or a substituent and at least one group is a cyano group. Preferable substituents represented by $X^1$ and $X^2$ are the above-mentioned substituent T. In addition, the substituent represented by $X^1$ and $X^2$ may be further substituted by other substituents and each substituent represented by $X^1$ and $X^2$ may be annelated to form a ring structure.

$X^1$ and $X^2$ are preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; and even more preferably a cyano group or a carbonyl group; and particularly preferably a cyano group or an alkoxycarbonyl group (—C(=O)OR (R is an alkyl group having 1 to 20 carbon atoms, an aryl group having 6 to 12 carbon atoms, and a combination thereof).

The compound represented by Formula (103) is preferably a compound represented by the following Formula (103-A):

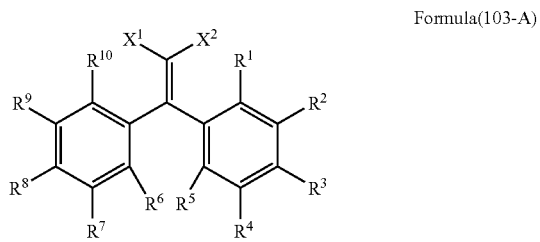

Formula(103-A)

wherein $R^1$, $R^2$, $R^3$, $R^4$, $R^5$, $R^6$, $R^7$, $R^8$, $R^9$ and $R^{10}$ are each independently a hydrogen atom or a substituent. $X^1$ and $X^2$ have the same meanings as those in Formula (103) and their preferable ranges are the same as those in Formula (103).

$R^1$, $R^2$, $R^3$, $R^4$, $R^5$, $R^6$, $R^7$, $R^8$, $R^9$ and $R^{10}$ each independently represent a hydrogen atom or a substituent, and the substituent may be exemplified by the above-described substituent T. These substituents may be further substituted with other substituents, and the substituents may be annelated to form a ring structure.

$R^1$, $R^2$, $R^4$, $R^5$, $R^6$, $R^7$, $R^9$ and $R^{10}$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group, an aryl group, an alkyloxy group, an aryloxy group or a halogen atom; even more preferably a hydrogen atom or an alkyl group having 1 to 12 carbon atoms; and particularly preferably a hydrogen atom or a methyl group; and most preferably a hydrogen atom.

$R^3$ and $R^8$ are each preferably a hydrogen atom, an alkyl group, an alkenyl group, an alkynyl group, an aryl group, a substituted or unsubstituted amino group, an alkoxy group, an aryloxy group, a hydroxyl group, or a halogen atom; more preferably a hydrogen atom, an alkyl group having 1 to 20 carbon atoms, an amino group having 0 to 20 carbon atoms, an alkoxy group having 1 to 12 carbon atoms, an aryloxy group having 6 to 12 carbon atoms, or a hydroxyl group; even more preferably a hydrogen atom, an alkyl group having 1 to 12 carbon atoms, or an alkoxy group having 1 to 12 carbon atoms; and particularly preferably a hydrogen atom.

The compound represented by Formula (103) is more preferably a compound represented by the following Formula (103-B):

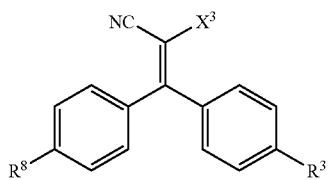

Formula(103-B)

wherein $R^3$ and $R^8$ have the same meanings as those in Formula (103-A) and their preferable ranges are the same as those in Formula (103-A). $X^3$ represents a hydrogen atom or a substituent.

$X^3$ represents a hydrogen atom or a substituent, and the substituent may be exemplified by the above-described substituent T. The substituent may be further substituted with other substituents, if possible. $X^3$ is preferably a hydrogen atom, an alkyl group, an aryl group, a cyano group, a nitro group, a carbonyl group, a sulfonyl group or an aromatic heterocyclic ring; more preferably a cyano group, a carbonyl group, a sulfonyl group or an aromatic heterocyclic ring; and even more preferably a cyano group or a carbonyl group; and particularly preferably a cyano group or an alkoxycarbonyl group (—C(=O)OR (R is an alkyl group having 1 to 20 carbon atoms, an aryl group having 6 to 12 carbon atoms, and a combination thereof).

The compound represented by Formula (103) is more preferably a compound represented by the following Formula (103-C):

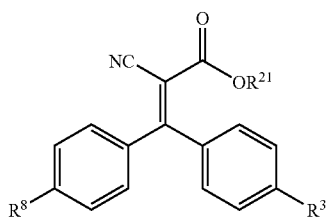

Formula(103-C)

wherein $R^3$ and $R^8$ have the same meanings as those in Formula (103-A) and their preferable ranges are the same as those in Formula (103-A). $R^{21}$ represents an alkyl group having 1 to 20 carbon atoms.

When both of $R^3$ and $R^8$ are a hydrogen atom, $R^{21}$ is preferably an alkyl group having 2 to 12 carbon atoms, more preferably an alkyl group having 4 to 12 carbon atoms, even more preferably an alkyl group having 6 to 12 carbon atoms, particularly preferably an octyl group, a tert-octyl group, a 2-ethylhexyl group, a decyl group, or a dodecyl group, and most preferably 2-ethylhexyl group.

When $R^3$ and $R^8$ are not a hydrogen atom, the compound represented by the Formula (103-C) has a molecular weight of 300 or more and $R^{21}$ is preferably an alkyl group having 20 or less carbon atoms The compound represented by Formula (103) of the invention can be synthesized by a method described in Journal of American Chemical Society, Vol. 63, pp. 3452 (1941).

Specific examples of the compound represented by Formula (103) are given below but the compounds which can be used in the present invention are not limited thereto.

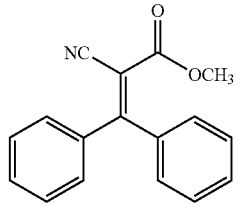

UV-201

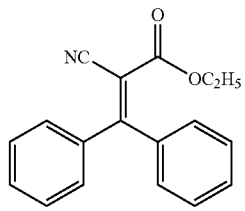

UV-202

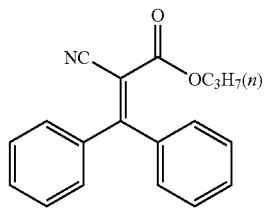

UV-203

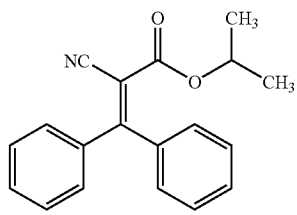

UV-204

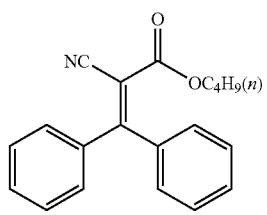

UV-205

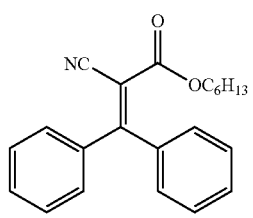

UV-206

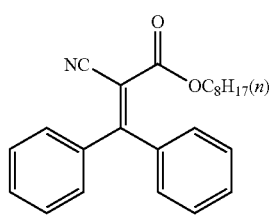

UV-207

-continued
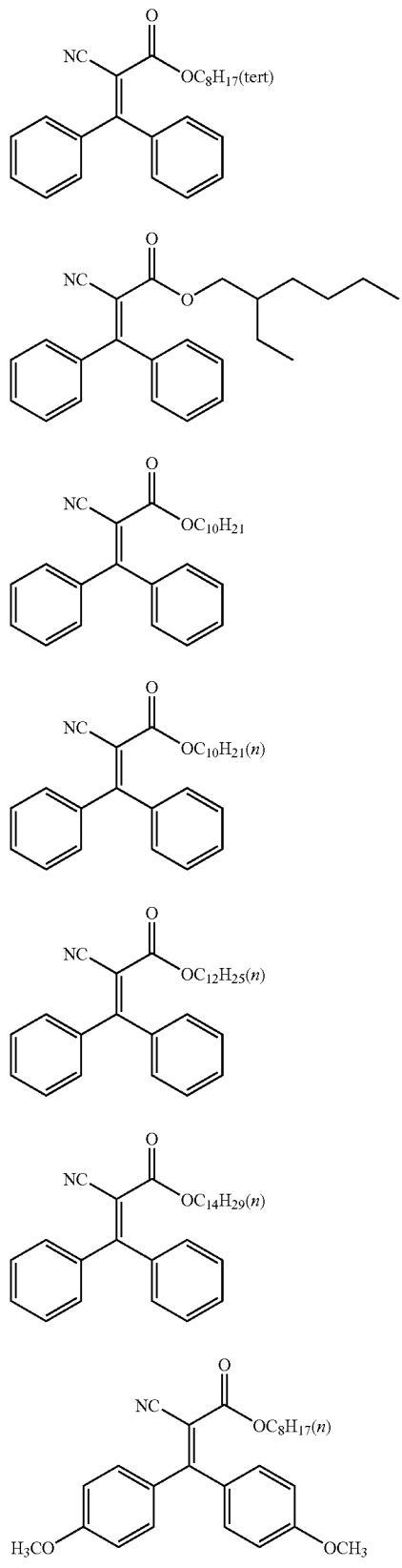
UV-208
UV-209
UV-210
UV-211
UV-212
UV-213
UV-214
-continued
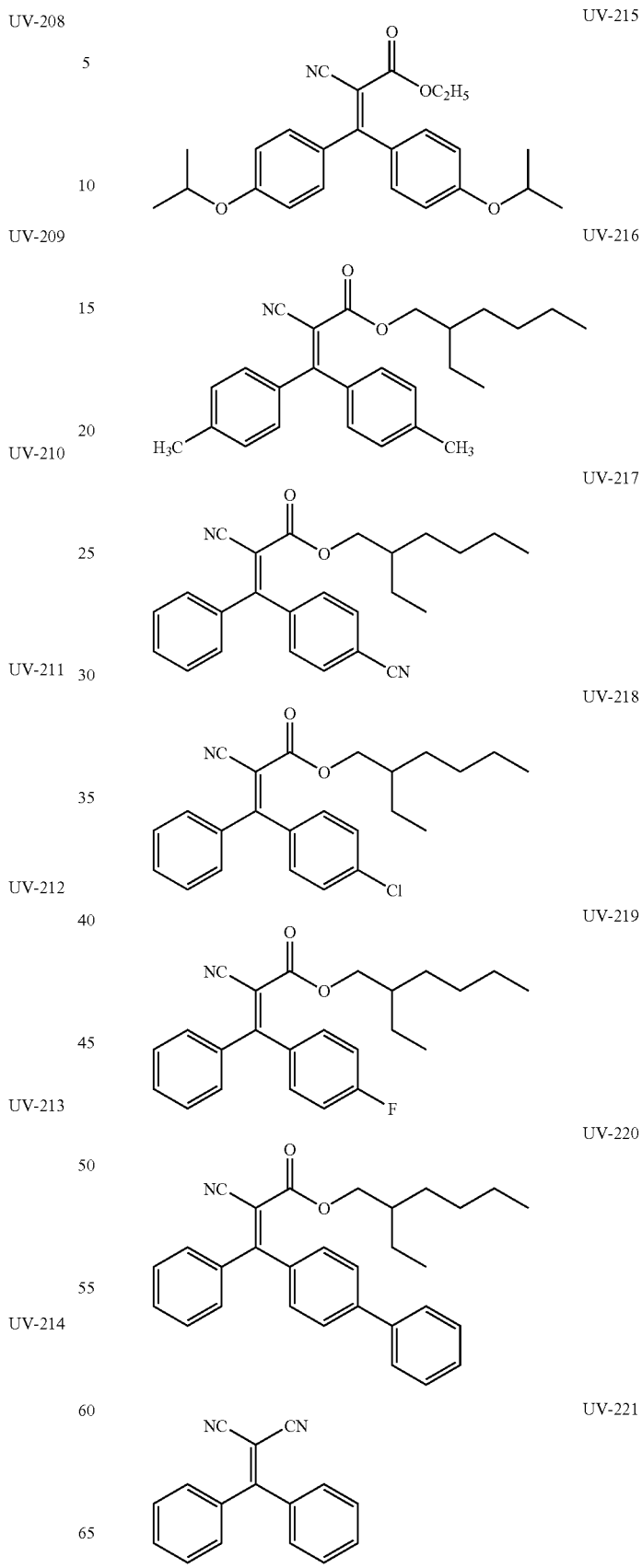
UV-215
UV-216
UV-217
UV-218
UV-219
UV-220
UV-221

-continued

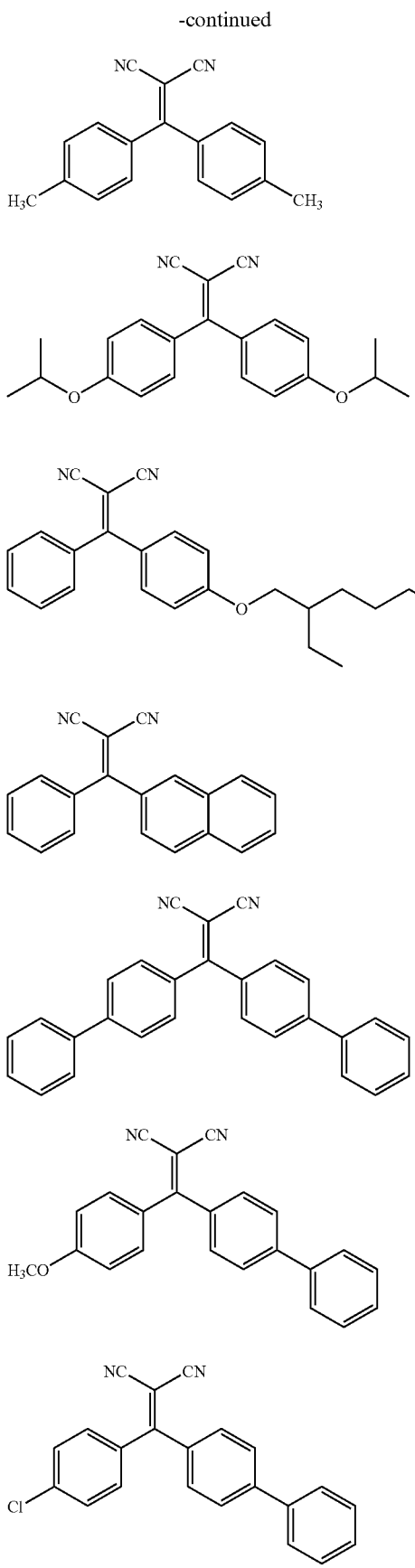

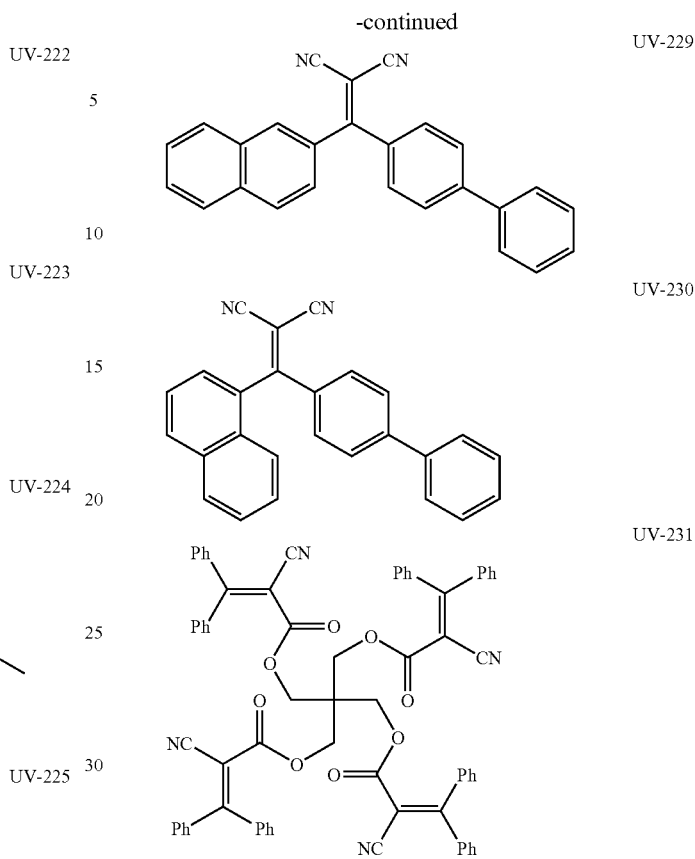

(Cross-Linking Agent)

In the invention, the cross-linking agent can be used as an organic compound. For example, when cellulose acylate is used as materials mainly constituting an optical film of the invention, the cross-linking agent used can be selected from cross-linking agents used in any method known as a method of cross-linking a cellulose unit-containing copolymer.

Examples of the cross-linking agent include divinyl compounds; aldehyde compounds such as monoaldehyde typified by formaldehyde and dialdehyde; isocyanate compounds such as tolylenediisocyanate, 4,4'-diphenylmethane diisocyanate, hexamethylene diisocyanate, xylylene diisocyanate, m-xylylene diisocyanate, 1,5-naphthalene diisocyanate, hydrogenated diphenylmethane diisocyanate, hydrogenated tolylenediisocyanate, hydrogenated xylylene diisocyanate and isophorone diisocyanate; burette polyisocyanate compounds such as Sumidur N (manufactured by SUMITOMO BAYER URETHANE CO., LTD.); isocyanurate ring-containing polyisocyanate compounds such as Desmodur IL and HL (manufactured by BAYER AG) and Coronate EH (manufactured by NIPPON POLYURETHANE INDUSTRY CO., LTD.); adduct polyisocyanate compounds such as Sumidur L (manufactured by SUMITOMO BAYER URETHANE CO., LTD.); and adduct polyisocyanate compounds such as Coronate HL (manufactured by NIPPON POLYURETHANE INDUSTRY CO., LTD.) and Crisvon NX (manufactured by DAINIPPON INK AND CHEMICALS, INCORPORATED). These may be used alone or in a combination of two or more kinds. Further, blocked isocyanates may also be used. In addition to these, there are inorganic cross-linking agents such as boron compounds; phosphoric acid and phosphates such as phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate and didecyl phosphate; propylene oxide, butylene oxide, cyclohexene oxide, glycidyl methacrylate, glycidol, acrylglycidyl ether, γ-glycidoxypropyltrimethoxysilane, γ-glycidoxypropyltriethoxysilane, γ-glycidoxypropylmethyldimethoxysilane, (3,4-epoxycyclohexyl)ethyltrimethoxysilane, commercially available products of bisphenol A diglycidyl ether, such as Epikote 827, Epikote 828, Epikote 834, Epikote 1001, Epikote 1004, Epikote 1007, Epikote 1009 and Epikote 825 (trade names, manufactured by Yuka-Shell Epoxy Co., Ltd.), Araldite GY250 and Araldite GY6099 (trade names, manufactured by Nihon Ciba-Geigy K.K.), ERL2774 (trade name, manufactured by Union Carbide Corporation), DER332, DER331 and DER661 (trade names, manufactured by The Dow Chemical Company). There are commercially available products of epoxy phenol novolac, such as Epikote 152 and Epikote 154 (trade names, manufactured by Yuka-Shell Epoxy Co., Ltd.), DEN438 and DEN448 (trade names, manufactured by The Dow Chemical Company), Araldite EPN1138 and Araldite EPN1139 (trade names, manufactured by Nihon Ciba-Geigy K.K.), commercially available products of epoxy cresol novolac, such as Araldite ECN1235, Araldite ECN1273 and Araldite ECN1280 (trade names, manufactured by Nihon Ciba-Geigy K.K.), commercially available products of a brominated epoxy resin, such as Epikote 5050 (trade name, manufactured by Yuka-Shell Epoxy Co., Ltd.) and BREN (trade name, manufactured by Nippon Kayaku Co., Ltd.). In addition to these, there are bisphenol F diglycidyl ether (diglycidyl ester compound obtained by the reaction of dibasic acid such as phthalic acid, dihydrophthalic acid and tetrahydrophthalic acid and epihalohydrin), an epoxy compound obtained by the reaction of an aromatic amine such as aminophenol and bis(4-aminophenyl)methane and epihalohydrin, an alicyclic epoxy compound obtained by the reaction of 1,1,1,3,3,3-hexafluoro-2,2-[4-(2,3-epoxypropoxy)phenyl]propane, dicyclopentadiene or the like and a peracetic acid or the like, 1,4-butanediol diglycidyl ether, 1,6-hexanediol diglycidyl ether, and Epikote 604 (trade name, Yuka-Shell Epoxy Co., Ltd.). These functional groups can be also added to a branched chain of cellulose.

The amount of the cross-linking agent added in the invention is not particularly limited, but the amount is in the range of preferably 0.5 to 30% by mass, more preferably 1 to 10% by mass with regard to a substrate polymer, in terms of film strength and flatness.

When the amount is 0.5% by mass or more, a cellulose ester resin can be sufficiently cross-linked, sufficient heat resistance and mechanical strength can be easily obtained and adhesiveness to a polarizing plate can be also easily obtained. In addition, when the amount is 30% by mass or less, the cross-linking rapidly proceeds, toughness is good and no cracking or the like in the cross-linked resin is generated upon handling, and thus yield is good.

Inorganic Fine Particles (Kinds, Properties and Amount Added of Inorganic Fine Particles)

Examples of the inorganic fine particles used in the optical film of the invention include silicon dioxide, titanium dioxide, aluminum oxide, zirconium oxide, calcium carbonate, talc, clay, calcined kaolin, calcined calcium silicate, hydrate calcium silicate, aluminum silicate, magnesium silicate, and calcium phosphate. The inorganic fine particles preferably contain silicon because of having a low cloudiness, and in particular silicon dioxide is preferable. It is preferable that fine particles of silicone dioxide have an average primary particle size of 20 nm or less and an apparent specific gravity of 70 g/l or more. Fine particles having a small average primary particle size of 5 to 16 nm are more preferable, since the haze of the optical film can be lowered. The apparent specific gravity is preferably 90 to 200 g/l or more and more preferably 100 to 200 g/l. A higher apparent specific gravity makes it possible to prepare a dispersion having higher concentration, thereby improving haze and aggregates.

These inorganic fine particles form a secondary particle having usually an average particle size of 0.1 to 3.0 μm. In a film, these inorganic fine particles occur as aggregates of the primary particles and provide irregularities of 0.1 to 3.0 μm on the film surface. The average secondary particle size is preferably 0.2 to 1.5 μm, more preferably 0.4 to 1.2 μm, and most preferably 0.6 to 1.1 μm. When an average particle size of silicon dioxide dielectric is too large, light transmission properties are damaged, whereas when an average particle size of silicon dioxide dielectric is too small the effect of improving the adhesion is not obtained. The primary or secondary particle size is determined by observing a particle in the film under a scanning electron microscope and referring the diameter of its circumcircle as the particle size. 200 particles are observed at various sites and the mean thereof is referred to as the average particle size.

As the fine particles of silicon dioxide, use can be made of commercially available products such as AEROSIL R-7200, R-711, R-104, R-106, R-8200, R-202, R972, R972V, R974, R812, 200, 200V, 300, R202, OX50 and TT600 (each manufactured by NIPPON AEROSIL CO., LTD.). As the fine particles of zirconium oxide, use can be made of products commercially available under the trade name of, for example, AEROSIL R976 and R811 (each manufactured by NIPPON AEROSIL CO., LTD.).

Among these products, AEROSIL 200V and AEROSIL R972V are particularly preferable, since they are fine particles of silicon dioxide having an average primary particle size of 20 nm or less and an apparent specific gravity of 70 g/l or more and exert an effect of largely lowering the coefficient of friction while maintaining the cloudiness of the optical film at a low level.

It is preferred that fine particles of silicon dioxide used in the invention do not include coarse particles of 5 μm or more through dispersion and/or filtration. Therefore, it is possible to prevent inhibition of light transmission properties due to the coarse particles and to prevent decrease in the product value of the film due to defects in the back side generated by the coarse particles. To obtain a cellulose acylate film having particles with a small average secondary particle size in the invention, some techniques may be proposed in the step of preparing a dispersion of the inorganic fine particles. For example, the inorganic fine particles are mixed with a solvent under stirring to preliminarily give an inorganic fine particle dispersion. Thereafter, this inorganic fine particle dispersion is added to a small amount of a cellulose acylate solution having been prepared separately and dissolved therein under stirring. Then it is further mixed with a main cellulose acylate dope solution. This is a preferable preparation method from the viewpoints of achieving a high dispersibility of the fine particles of silicon dioxide while causing little re-aggregation of the fine particles of silicon dioxide. An alternative method comprises adding a small amount of cellulose ester to a solvent, dissolving it under stirring, adding inorganic fine particles thereto, dispersing the inorganic fine particles in a dispersing machine to give a solution of the inorganic fine particle additive, and then sufficiently mixing the solution of the inorganic fine particle additive with a dope solution in an in-line mixer. Although the invention is not restricted to these methods, it is preferable in the step of mixing and dispersing the fine particles of silicon dioxide in a solvent that the silicon oxide concentration ranges preferably from 5 to 30% by mass, more preferably from 10 to 25% by mass and most preferably from 15 to 20% by mass. A higher dispersion concentration is preferred, since the solution cloudiness to the amount added is lowered and thereby haze and aggregation are improved. The final content of the matting agent in the cellulose acylate dope solution ranges preferably from 0.01 to 1.0 g, more preferably from 0.03 to 0.3 g and most preferably from 0.08 to 0.16 g per 1 $m^2$.

(Methanol Wettability)

The inorganic fine particles used in the invention have methanol wettability (MW) showing hydrophilicity/hydrophobicity, which satisfies preferably the following equation (G): $0 \leq MW \leq 80$, more preferably $30 < MW \leq 75$, and particularly preferably $50 < MW \leq 70$. In general, the methanol wettability (MW) can be used as properties exhibiting hydrophilicity/hydrophobicity on the surface of inorganic fine particles. The method of measuring MW employed in the invention is described in the following.

A mixed solution of 45 parts by volume of methanol and 55 parts by volume of pure water is prepared (in this case, the volume of the prepared mixed solution is not always 100 parts by volume). Seven ml of the mixed solution obtained and 0.2 g of inorganic fine particle powders are placed in a 10 ml settling pipe. The settling pipe is covered by a lid and the resulting mixture is mixed with shaking at 90 rpm for 30 seconds using a tubular mixer and further particles are settled using a centrifuge at 3500 rpm for 10 minutes. The volume of the inorganic fine particles settled is read out and is referred to as Aml. Separately from this, a mixed solution of 75 parts by volume of methanol and 25 parts by volume of pure water is prepared. Seven ml of the mixed solution obtained is used and treated in the same manner as in the above to settle inorganic fine particles. The volume of the inorganic fine particles settled is read out and is referred to as Bml. MW (%) is obtained by calculating A/B×100.

The inorganic fine particles having higher MW are settled regardless of the composition of methanol, since their surfaces are easily covered with water. On the other hand, although hydrophobic inorganic fine particles are mixed with shaking and centrifuged, the fine particles are not settled and thus MW is reduced. When the cellulose acylate film is produced, a method of adding the inorganic fine particles previously dispersed in a cellulose acylate solution is generally used. In this case, it is preferable to use the inorganic fine particles having low MW and hydrophobicity. Specifically, when the inorganic fine particles having high MW are used, it is easy to cause a problem that the inorganic fine particles added are re-aggregated in cellulose acylate solution and the haze and black luminance of the resulting film are increased.

When hydrophobic inorganic fine particles are added in a cellulose acylate solution, more hydrophobic additives contained in the solution are more easily aggregated to the inorganic fine particles. Therefore, it is required to pay attention to a method of adding them to a cellulose composition. In order to suppress the re-aggregation of the inorganic fine particles, it is possible to take some techniques. For example, it includes a method in which aggregation with hydrophobic additives is suppressed using hydrophilic inorganic fine particles or the circumference of inorganic fine particles is included in additives or the like by containing additives (mainly a plasticizer or ultraviolet absorber) or cellulose acylate in an inorganic fine particle dispersion. On the other hand, it includes a method in which additives are used and then amphiphilic additives (mainly a plasticizer or ultraviolet absorber) or the like are contained in the inorganic fine particle dispersion. Further, it is preferable to use a method in which the inorganic fine particles are added and then an inorganic fine particle dispersion and additives (retardation-developing agent) are separately added in a cellulose acylate film dope, or it is preferable to add an inorganic fine particle dispersion to a cellulose composition immediately before casting is performed as far as possible. The above description represents an example showing a case where hydrophilic fine particles are added to a cellulose acylate solution, but should not be construed as being limited thereto.

Main Component of Optical Film

Main materials constituting the optical film of the invention are preferably cellulose acylate or cycloolefin polymer, and in particular cellulose acylate is preferred.

(1) Cellulose Acylate (Starting Cotton Material)

Examples of cellulose, which is a starting material of cellulose acylate used in the invention, include cotton linter and wood pulp (hardwood pulp and softwood pulp). Use can be made of cellulose acylate obtained from any cellulose material and a mixture thereof is also usable in some cases. These cellulose materials are described in detail in, for example, "The Course of Plastic Materials (17) Cellulosic Resins (Maruzawa and Uda, The Nikkan Kogyo Shinbun, Ltd., 1970)" and pages 7 to 8 of Journal of Technical Disclosure issued by Japan Institute of Invention and Innovation No. 2001-1745 (Mar. 15, 2001, published by Japan Institute of Invention and Innovation). Namely, use may be made of cellulose materials reported therein and the material of the cellulose acylate film of the invention is not particularly limited.

(Degree of Substitution)

Next, the cellulose acylate according to the invention which is produced starting with the cellulose material as described above will be illustrated. In the cellulose acylate of the invention, hydroxyl groups in cellulose have been acylated. As the substituents, use may be made of acetyl groups having 2 to 22 carbon atoms, of acyl groups. In the cellulose acylate of the invention, the degree of substitution of hydroxyl groups in the cellulose is not particularly limited. The substitution degree can be determined by measuring the degree of binding of acetic acid and/or fatty acids having 3 to 22 carbon atoms substituting hydroxyl groups in cellulose and calculating. The measurement can be carried out in accordance with ASTM D-817-91. The term "degree of substitution" as used in the present specification means the sum of ratios in which hydrogen atoms in hydroxyl groups at the 2-, 3- and 6-positions of cellulose are substituted. When the total hydrogen atoms in hydroxyl groups at the 2-, 3- and 6-positions of cellulose are substituted by acyl groups, the degree of substitution is 3.

As described above, although the degree of substitution of hydroxyl groups in the cellulose is not particularly restricted in the cellulose acylate of the invention, the degree of substitution of hydroxyl groups by acyl groups is preferably 1.50 to 3.00, more preferably 2.00 to 2.95, and even more preferably 2.50 to 2.90 by considering retardation developing properties by stretching.

Among the acetic acid or fatty acids having 3 to 22 carbon atoms substituting hydroxyl groups in cellulose, the acyl group having 2 to 22 carbon atoms may be an aliphatic group or an aromatic group without particular restriction. Either a single group or a mixture of two or more groups may be used.

Use may be made of, for example, alkylcarbonyl esters, alkenylcarbonyl esters or aromatic carbonylesters and aromatic alkylcarbonyl esters of cellulose each optionally having additional substituents. Preferable examples of the acyl group include acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Among them, acetyl, propionyl, butanoyl, dodecanoyl, octadecanoyl, t-butanoyl, oleoyl, benzoyl, naphthylcarbonyl cinnamoyl groups are preferable, and acetyl, propionyl and butanoyl groups are more preferable.

(Degree of Polymerization)

The degree of polymerization (expressed in viscosity-average degree of polymerization) of the cellulose acylate preferably used in the invention ranges from 180 to 700. In cellulose acetate, the degree of polymerization preferably ranges from 180 to 550, more preferably from 180 to 400 and particularly preferably from 180 to 350. In the case where the degree of polymerization is too high, a dope solution of the cellulose acylate has a high viscosity and thus a film can be hardly formed by casting. In the case where the degree of polymerization is too low, the strength of the film formed is low. The average polymerization degree can be measured by a limiting viscosity method by Uda et al., (Kazuo Uda and Hideo Saito, "The Journal of the Society of Fiber Science and Technology, Japan", vol. 18, No. 1, pages 105 to 120, 1962). This method is described in detail in JP-A No. 9-95538.

Further, the molecular weight distribution of the cellulose acylate preferably used in the invention is evaluated by gel permeation chromatography. A smaller polydispersity index Mw/Mn (Mw: weight-average molecular weight, Mn: number-average molecular weight) and a narrower molecular weight distribution are preferred. More specifically, Mw/Mn preferably ranges from 1.0 to 3.0, more preferably from 1.0 to 2.0, and most preferably from 1.0 to 1.6.

When low-molecular weight components are removed, the average molecular weight (degree of polymerization) is elevated but the viscosity becomes lower than common cellulose acylates, thereby becoming useful. Cellulose acylate containing less low-molecular weight components can be obtained by removing the low-molecular weight components from cellulose acylate synthesized by a conventional method. The low-molecular weight components can be removed by washing cellulose acylate with an appropriate organic solvent. Furthermore, in the case of producing cellulose acylate containing less low-molecular weight components, it is preferable to control the amount of the sulfuric acid catalyst in the acetylation to 0.5 to 25 parts by mass per 100 parts by mass of cellulose acylate. By controlling the amount of the sulfuric acid catalyst within the range as described above, it is possible to synthesize cellulose acylate preferable from the viewpoint of molecular weight distribution (i.e., having a uniform of molecular weight distribution). In the production of cellulose acylate according to the invention, use is made of cellulose acylate having a water content ratio of preferably 2% by mass or less, more preferably 1% by mass or less and particularly preferably 0.7% by mass or less. In general, cellulose acylate contains water and it is known that the water content ratio thereof ranges from 2.5 to 5% by mass. To regulate to this water content ratio of cellulose acylate in the invention, it is required to dry the cellulose acylate. The drying method is not particularly restricted so long as the desired water content ratio can be established thereby. The starting cotton material and the synthesis method for these cellulose acylates used in the invention are described in detail in pages 7 to 12 of Journal of Technical Disclosure issued by Japan Institute of Invention and Innovation No. 2001-1745 (Mar. 15, 2001, JP-A Nos. 2000-95876, 12-95877, 10-324774, 8-152514, 10-330538, 9-95538, 9-95557, 10-235664, 12-63534, 11-21379, 10-182853, 10-278056, 10-279702, 10-323853, 10-237186, 11-60807, 11-152342, 11-292988 and 11-60752. The above-described publications also disclose preferred embodiments for properties of the cellulose acylate solution and coexisting substances used together therewith.

(Process of Producing Cellulose Acylate Film)

A cellulose acylate solution (dope) of the invention is not restricted in a method of dissolution, and may be prepared at a room temperature, or by a cooled dissolving method or a high-temperature dissolving method, or a combination thereof. For a process of preparation of a cellulose acylate solution of the invention, and processes of concentration and filtration of the solution associated with the dissolving process, there can be preferably used a manufacturing process described in detail in pages 22 to 25 of Journal of Technical Disclosure of Japan Institute of Invention and Innovation No. 2001-1745 (Mar. 15, 2001, published by Japan Institute of Invention and Innovation).

The cellulose acylate solution preferably has a dope transparency of preferably 85% or higher, more preferably 88% or higher and more preferably 90% or higher. It was confirmed that various additives are sufficiently dissolved in the cellulose acylate solution (dope) of the invention. For the specific calculation method of dope transparency, the dope solution is filled in glass cell of 1 cm square and absorbance at 550 nm is measured using the spectrophotometer (UV-3150, manufactured by Shimadzu Corporation). The absorbance of the solvent is previously measured as the blank, and the transparency of cellulose acylate is calculated from a ratio to the absorbance of the published by Japan Institute of Invention and Innovation).

In the invention, cellulose acylate may be used in one kind alone or in combination of two or more kinds.

(Organic Solvent of Cellulose Acylate Solution)

In the invention, the cellulose acylate film is preferably produced according to a solvent cast method, in which a solution of cellulose acylate dissolved in an organic solvent (dope) is use to produce a film. An organic solvent which is preferably used as a main solvent of the invention is selected from esters having 3 to 12 carbon atoms, ketones having 3 to 12 carbon atoms, ethers having 3 to 12 carbon atoms and halogenated hydrocarbons having 1 to 7 carbon atoms. These esters, ketones and ethers may have cyclic structure. It is also possible to use, as the main solvent, compounds having two or more functional groups (i.e., —O—, —CO— and —COO—) of esters, ketones and ethers. For example, the solvent may have other functional groups such as an alcoholic hydroxyl group. If the main solvent is a compound having two or more kinds of functional groups, the number of carbon atoms of the solvent may be within the limitation for a compound having either of the functional groups.

Halogenated (chlorinated) hydrocarbons may be used as a main solvent for cellulose acylate and the nonchlorinated solvents as described in pages 12 to 16 of Journal of Technical Disclosure issued by Japan Institute of Invention and Innovation No. 2001-1745 (Mar. 15, 2001, published by Japan Institute of Invention and Innovation) may be used as the main solvent.

In addition to these, preferred embodiments for a cellulose acylate solution, solvents thereof, a dissolution method thereof and the like are described in, for example, blank.

Next, the process of producing a film using the cellulose acylate solution of the invention will be described below. The cellulose acylate film of the invention can be produced by the method and apparatus conventionally used for preparation of the cellulose triacetate films according to the solution casting method and solution casting apparatus. First, the dope (cellulose acylate solution) prepared in a dissolving tank (pot) is stored into a stock tank, defoamed and finally prepared. Various kinds of dopes are produced by changing the kind of additive or content depending on the purpose, and then the dopes are ejected from a dope discharging port. Then, the dope is sent from outlet to a pressurized die through a quantitative gear pump of pressing kind, which can quantitatively send the dope with high precision, for example, according to rotation number, and from a metal fittings of the pressurized die (slit), the dope is evenly cast on a metal support of casting part running endlessly. At the peeling point where the metal support nearly once rotates, the insufficiently dried dope film (which is referred to as web) is peeled from the metal support. While both sides of the web are fixed with clips to keep the width, the web is transferred and dried with a tenter, then the web is successively transferred with rollers of drying apparatus to complete drying, and wound up by a winder in a predetermined length. The combination of the tenter and the rollers of drying apparatus can be varied according to the purpose. In the solution casting method used for the functional protection film of optical member for electric display or silver halide photosensitive material, in which the cellulose acylate films according to the invention are mainly used, in addition to the solution casting apparatus, a coating apparatus is also often used for the purpose of providing processing of the film surface such as an undercoating layer, an antistatic layer, an anti-halation layer and a protection layer. This is described in detail in pages 25 to 30 of Journal of Technical Disclosure issued by Japan Institute of Invention and Innovation No. 2001-1745 (Mar. 15, 2001, published by Japan Institute of Invention and Innovation), and classified as casting (including co-cast), metal support, drying and peeling, which is preferably used in the invention. The thickness of the cellulose acylate film is preferably in the range of 10 to 120 μm, more preferably 20 to 100 μm, and more preferably 30 to 90 μm.

The cellulose acylate film is produced by a solvent cast method, utilizing a prepared cellulose acetate solution (dope). A various kinds of dope are cast on a drum or a band and the solvent is evaporated to form a film. The dope before casting is preferably adjusted to have the concentration in which the solid content is 18 to 35%. The surface of the drum or band is preferably a mirror finished surface. A casting method or a drying method in the solution casting method is disclosed in publications of U.S. Pat. Nos. 2,336,310, 2,367,603, 2,492,078, 2,492,977, 2,492,978, 2,607,704, 2,739,069, and 2,739,070, GB Patent Nos. 640731 and 736892, JP-B Nos. 45-4554 and 49-5614, JP-A Nos. 60-176834, 60-203430, and 62-115035. The dope is preferably cast on a drum or a band whose surface temperature is 10° C. or less. And then, the dope is preferably dried by a wind for 2 seconds or more. The obtained film is peeled off from the drum or the band, is dried by a hot air whose temperature is gradually changed to 100 to 160° C., and then the residual solvent is evaporated. The above-mentioned method is disclosed in the publication of JP-B No. 5-17844. By using the method, it is possible to reduce the time from the casting to the peeling-off. In order to apply the above method, it is required to make the dope be a gel state at the surface temperature of the drum or the band when casting it.

It is further possible to form a film by a co-casting method that casts two or more layers, utilizing the produced cellulose acetate solution (dope). In this case, it is preferable to produce the cellulose acetate film by using a solution casting method. The dope is cast over a drum or band and the solvent is evaporated therefrom to form a film. The dope before casting is preferably adjusted to have the concentration in which the solid content is 10 to 40%. The surface of the drum or band is preferably a mirror finished surface.

In the case of forming two or more layers, it is possible to cast a plurality of cellulose acetate solutions. Therefore, the film may be produced by individually casting solutions containing the cellulose acetate from a plurality of casting slots that is separated from each other with a distance in a moving direction of a support and laminating them. For example, it is possible to use a method described in JP-A Nos. 61-158414, 1-122419, and 11-198285. It is further possible to form a film by simultaneously laminating cellulose acetate solutions from two casting slots to cast them. For example, it is possible to use a method described in JP-B No. 60-27562, JP-A Nos. 61-94724, 61-947245, 61-104813, 61-158413, and 6-134933. Furthermore, it is possible to use a casting method of cellulose acetate film that flow of a thick cellulose acetate solution is encapsulated by a thin cellulose acetate solution and then the thick and thin cellulose acetate solutions are simultaneously extruded. The casting method is described in JP-A No. 56-162617.

It is possible to produce a film using two casting slots, by peeling a film molded on the support by a first casting slot and then performing a second casting on a side being contact with a surface of the support. For example, an example of the above method is described in JP-B No. 44-20235. A cellulose acetate solution for casting may be any of the same solution or different solutions. In order to give a function to a plurality of cellulose acetate layers, a cellulose acetate solution suitable for the function may be extruded from the corresponding casting slot. It is possible to simultaneously cast the cellulose acetate solution of the invention with another functional layer (for example, a bonding layer, a colorant layer, an antistatic layer, an antihalation layer, a ultraviolet absorbing layer, a polarizing layer, etc.).

For a conventional single layer solution, it is required to extrude a high concentration and high viscosity cellulose acetate solution in order to obtain a desired film thickness. In this case, there are problems in that the stability of the cellulose acetate solution is lowered, solidified materials are generated, a dent trouble is occurred, and the flatness is deteriorated. By casting the plurality of cellulose acetate solutions from the casting slot, high viscosity solution can be simultaneously extruded on the support, the flatness is improved, an excellent planar film can be produced, a drying load can be further reduced by using a thick cellulose acetate solution. Furthermore, it is possible to speed up the manufacturing of film.

With respect to an optical film of the invention, all of the layers constituting the film do not use a cellulose acylate as a main component, but a layer constituting a part of the optical film may use a cellulose acylate as a main component. In this case, the layer having the cellulose acylate as a main component may be formed as an outer-most portion or an inner layer. When the layer is formed as an inner layer, layers formed on and below the layer may be single layers or lamination symmetric or asymmetric to each other with respect to the inner layer. Two successive layers may be formed of cellulose acylate having the same degree of substitution of acyl groups. When the kinds or the proportions of the solvent of the dope that forms the respective layers, an additive or kinds of additive, and the content of the additive are different from each other, the two layers may be different from each other.

A method of forming layers of the optical film according to the invention is not limited to the above-described method. It is possible to appropriately change the kinds or properties of coating solution and the kinds of the support supporting the layer. It is most preferable to use a coating method as a method of forming the layers.

(2) Cycloolefin Polymer

The cycloolefin polymer can be also used as the main component of the optical film according to the invention. Hereinafter, a cycloolefin addition polymer and a cycloolefin ring-opening polymer as an example of the cycloolefin polymer will be explained.

(Cycloolefin Addition Polymer)

The cycloolefin addition polymer used in the invention is preferably a cycloolefin addition polymer containing a structural unit (a) represented by the following formula (11) and a structural unit (b) represented by the following formula (12).

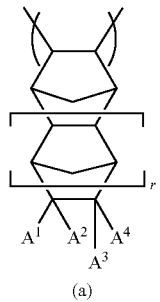

Formula(11)

(a)

In the formula (11), $A^1$, $A^2$, $A^3$, and $A^4$ each independently represent a hydrogen atom, an alkyl group having 1 to 10 carbon atoms, an aryl group, a cycloalkyl group having 4 to 15 carbon atoms or a halogen atom. Further, $A^1$ to $A^4$ also include an alkylene group formed from $A^1$ and $A^2$, $A^1$ and $A^3$ or $A^2$ and $A^4$. r represents an integer of 0 to 2.

Such structural unit (a) is formed by conducting addition polymerization of a cyclic olefin compound represented by the following formula (12):

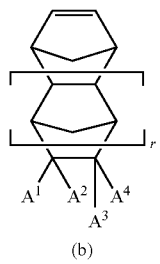

Formula(12)

(b)

In the formula (12) $A^1$, $A^2$, $A^3$, and $A^4$ each independently represent a hydrogen atom, an alkyl group having 1 to 10 carbon atoms, an aryl group, a cycloalkyl group having 4 to 15 carbon atoms or a halogen atom. Further, $A^1$ to $A^4$ also include an alkylene group and an alkylidene group formed from $A^1$ and $A^2$, $A^1$ and $A^3$ or $A^2$ and $A^4$. r represents an integer of 0 to 2.

Specific examples of the compound represented by the formula (12) include bicyclo[2.2.1]hept-2-ene, 5-methyl-bicyclo[2.2.1]hept-2-ene, 5-ethyl-bicyclo[2.2.1]hept-2-ene, 5-propyl-bicyclo[2.2.1]hept-2-ene, 5-butyl-bicyclo[2.2.1]-hept-2-ene, 5-pentyl-bicyclo[2.2.1]hept-2-ene, 5-hexyl-bicyclo[2.2.1]hept-2-ene, 5-heptyl-bicyclo[2.2.1]hept-2-ene, 5-octyl-bicyclo[2.2.1]hept-2-ene, 5-decyl-bicyclo[2.2.1]-hept-2-ene, 5-dodecy-bicyclo[2.2.1]hept-2-ene, 5,6-dimethyl-bicyclo[2.2.1]hept-2-ene, 5-methyl-5-ethyl-bicyclo[2.2.1]hept-2-ene, 5-phenyl-bicyclo[2.2.1]hept-2-ene, 5-cyclohexyl-bicyclo[2.2.1]hept-2-ene, 5-cyclooctyl-bicyclo[2.2.1]hept-2-ene, 5-fluoro-bicyclo[2.2.1]hept-2-ene, 5-chloro-bicyclo[2.2.1]hept-2-ene, tricyclo[4.2.0.1$^{5,8}$]nona-2-ene, 1-methyltricyclo[4.2.0.1$^{5,8}$]nona-2-ene, 6-methyl-tricyclo[4.2.0.1$^{5,8}$]nona-2-ene, tricyclo[5.2.1.0$^{2,6}$]dec-8-ene, 3-methyltricyclo[5.2.1.0$^{2,6}$]dec-8-ene, 4-methyltricyclo-[5.2.1.0$^{2,6}$]dec-8-ene, tricyclo[6.2.1.0$^{2,7}$]undec-9-ene, 1-methyltricyclo-[6.2.1.0$^{2,7}$]undec-9-ene, 3-methyltricyclo-[6.2.1.0$^{2,7}$]undec-9-ene, 1-ethyltricyclo[6.2.1.0$^{2,7}$]undec-9-ene, 3-ethyltricyclo[6.2.1.0$^{2,7}$]undec-9-ene, tricyclo-[8.2.1.0$^{2,9}$]tridec-11-ene, 1-methyltricyclo[8.2.1.0$^{2,9}$]tridec-11-ene, 5-methyltricyclo[8.2.1.0$^{2,9}$]tridec-11-ene, tetracyclo[4.4.0.1$^{2,5}$.1$^{7,10}$]dodec-3-ene, 8-methyl-tetracyclo-[4.4.0.1$^{2,5}$.1$^{7,10}$]dodec-3-ene and 8-ethyl-tetracyclo-[4.4.0.1$^{2,5}$.1$^{7,10}$]dodec-3-ene.

Furthermore, the structural unit (a) may be also one obtained by subjecting a cyclic diolefin compound such as 5-vinyl-bicyclo[2.2.1]hept-2-ene, 5-(1-butenyl)-bicyclo[2.2.1]hept-2-ene, tricyclo[5.2.1.0$^{2,6}$]deca-3,8-diene, 1-methyltricyclo[5.2.1.0$^{2,6}$]deca-3,8-diene and 1-ethyltricyclo[5.2.1.0$^{2,6}$]deca-3,8-diene to addition polymerization and then subjecting a cyclic olefinic unsaturated bond at the branched chain to hydrogenation.

Among compounds represented by the formula (12), bicyclo[2.2.1]hept-2-ene or tricyclo[5.2.1.0$^{2,6}$]dec-8-ene is preferred. Further, tricyclo[5.2.1.0$^{2,6}$]dec-8-ene has a stereoisomer of an endo isomer and an exo isomer. In the invention, the endo isomer is preferably used since the film finally obtained has high toughness, and tricyclo[5.2.1.0$^{2,6}$]dec-8-ene containing at least 80% of the endo isomer is preferably used. Further, a method in which the endo isomer of tricyclo[5.2.1.0$^{2,6}$]deca-3,8-diene is subjected to addition polymerization and then the cyclic olefinic unsaturated bond at the branched chain is subjected to hydrogenation, is likewise preferred. Also in this case, it is preferable to contain at least 80% of the endo isomer. Cyclic olefin polymers obtained by using these have low water absorption rate, low dielectric constant and high toughness, as well as excellent transparency and excellent heat resistance. Furthermore, the compound represented by the formula (12) can be used in one kind or in two or more kinds.

(Cycloolefin Ring-Opening Polymer)

As the cycloolefin ring-opening polymer, a ring-opening polymer having a repeating unit represented by the following formula (13) can be preferably used.

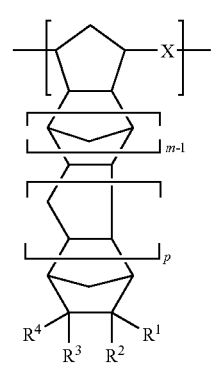

Formula(13)

In the formula (13), m represents an integer of 1 or more; p represents an integer of 0 or 1 or more; X represents a vinylene group (—CH=CH—) or an ethylene group (—CH$_2$CH$_2$—); and R$^1$ to R$^4$ each independently represent a hydrogen atom, a halogen atom, a substituted or unsubstituted hydrocarbon group having 1 to 30 carbon atoms, which may have a bonding group containing an oxygen atom, a nitrogen atom, a sulfur atom or a silicon atom, or a polar group. R$^1$ and R$^2$, R$^3$ and R$^4$ or R$^2$ and R$^3$ may bind to each other to form a carbocyclic ring or heterocyclic ring having each a monocyclic structure or of a polycyclic structure obtained by condensing with other rings and the carbocyclic ring or heterocyclic ring formed may be an aromatic ring or nonaromatic ring.

Use of Optical Film

The optical film of the invention is effective in a protection film for a polarizing plate, an optical compensatory sheet for a liquid crystal display device, an optical compensatory sheet for a reflective liquid crystal display device, or a support for silver halide photosensitive material. The thickness of the optical film of the invention is determined depending on the uses, and is not particularly limited. The thickness is preferably 30 μm or more, more preferably 30 to 200 μm.

(Functional Layer)

The uses of the film of the invention are applied to an optical use and a photosensitive material. In particular, the optical use is preferable a liquid crystal display device. The liquid crystal display device preferably includes a liquid crystal cell that is formed by interposing the liquid crystal between two electrode substrates, two polarizing elements disposed on both sides of the cell, and at least one optical compensatory sheet between the liquid crystal cell ad the polarizing elements. Examples of the liquid crystal display device preferably include TN, IPS, FLC, AFLC, OCB, STN, ECB, VA and HAN types.

When using the optical film of the invention as the above-described optical use, various kinds of functional layers are applied thereto. Examples of the functional layer include an antistatic layer, a curing resin layer (transparent hard coat layer), an antireflective layer, an easy-adhesive layer, an antiglare layer, an optical compensatory layer, an alignment layer, a liquid crystal layer. Examples of a functional layer or the material thereof that can use the optical film (especially, cellulose acylate optical film) of the invention includes a surfactant, a lubricant, a matting agent, an antistatic layer, a hard coat layer, etc. This is described in detail in pages 32 to 45 of journal of Technical publication issued by Japan Institute of Invention and Innovation No. 2001-1745 (Mar. 15, 2001, published by Japan Institute of Invention and Innovation), which is preferably used in the invention.

(Polarizing Plate)

The optical film of the invention is effective in a polarizing plate protection film. When using the optical film as the polarizing plate protection film, a method of manufacturing the polarizing plate is not particularly restricted, but a general method may be used. There is a method in which the cellulose acylate film obtained is subjected to an alkali treatment, and it is bonded to both sides of a polarizer, which has been produced by dipping a polyvinyl alcohol film in an iodine solution and drawing, using an aqueous solution of a completely saponified polyvinyl alcohol. Instead of the alkali treatment, it may be subjected to an adhesion promotion treatment (ref. JP-A No. 6-94915, JP-A No. 6-118232).

Examples of the adhesive used for bonding the protection film treated surface to the polarizer include a polyvinyl alcohol based adhesive such as polyvinyl alcohol or polyvinyl butyral and a vinyl based latex such as butyl acrylate.

The polarizing plate is formed from the polarizer and the protection films protecting the two sides thereof or, furthermore, from a protection film on one side of the polarizing plate and a separator film on the other side. The protection film and the separator film are used in order to protect the polarizing plate while shipping the polarizing plate, inspecting the product, etc. In this case, the protection film is bonded in order to protect the surface of the polarizing plate, and is used on the side opposite to the side of the polarizing plate which is bonded to the liquid crystal plate. The separator film is used in order to cover the adhesive layer which is bonded to the liquid crystal plate, and is used on the side of the polarizing plate which is bonded to the liquid crystal plate.

In a liquid crystal display device, a substrate containing liquid crystal is usually disposed between two polarizing plates, but the polarizing plate protection film to which the optical film of the present invention is applied can give excellent display properties in whichever position it is disposed. Since the polarizing plate protection film on the outermost surface on the display side of the liquid crystal display device, in particular, is provided with a transparent hard coat layer, an antiglare layer, an antireflective layer, etc., the above-mentioned polarizing plate protection film is particularly preferably used in this portion.

(Structure of General Liquid Crystal Display Device)

When the optical film of this invention (especially, cellulose acylate optical film) is used as an optical compensatory film, a transmission axis of the polarizing element and a lagging axis of the optical compensatory film formed of the optical film may be arranged parallel or perpendicular to each other. The liquid crystal display device a liquid crystal cell carrying liquid crystal between two electrode substrates, two polarizing elements disposed on both sides of the cell, and at least one optical compensatory film between the liquid crystal cell and the polarizing elements.

The liquid crystal layer of the liquid crystal cell is usually formed by sealing in the liquid crystal in the space made between two pieces of substrate by putting in a spacer. The transparent electrode layer is formed on the substrate as transparent film including electro conductive substance. Further, a gas barrier layer, a hard coat layer or an undercoat layer (used for adhesion of the transparent electrode layer) may be applied on the liquid crystal cell. These layers are usually applied on the substrate. The thickness of the substrate for the liquid crystal cell is generally from 50 μm to 2 mm.

(Kinds of Liquid Crystal Display Device)

The optical film of the present invention (especially cellulose acylate optical film) can be used as the liquid crystal cell of various display modes. Various display modes such as TN (Twisted Nematic), IPS (In-Plane Switching), FLC (Ferroelectric Liquid Crystal), AFLC (Anti-Ferroelectric Liquid Crystal), OCB (Optically Compensated Bend), STN (Supper Twisted Nematic), VA (Vertically Aligned), ECB (Electrically Controlled Birefringence), and HAN (Hybrid Aligned Nematic) are proposed. In addition, the display mode dividing the orientation of said display mode is also proposed. The optical film of the invention is effective in all the liquid crystal display device of each display mode. Further, it is effective for any of transmissive, reflective, or transflective liquid crystal display.

(TN Type Liquid Crystal Display Device)

The optical film of the present invention (especially, cellulose acylate optical film) can be used as the support for optical compensatory sheet of TN type liquid crystal display device having the liquid crystal cell of TN mode. The liquid crystal cell of TN kind and the TN mode liquid crystal display device are well known for a long time. Regarding the optical compensatory sheet used for the TN type liquid crystal display device, each of JP-A Nos. 3-9325, 6-148429, 8-50206 and 9-26572 discloses in detail. Further, paper by Mori and other (Jpn. J. Appl. Phys. Vol. 36 (1997) p. 143 or Jpn. J. Appl. Phys. Vol. 36 (1997) p. 1068) describes about it.

(STN Type Liquid Crystal Display Device)

The optical film of the present invention (especially, cellulose acylate optical film) can be used as the support for optical compensatory sheet for STN type liquid crystal display device having the liquid crystal cell of STN mode. In the STN type liquid crystal display device, cylindrical shape mesomorphism molecular in the liquid crystal cell is generally twisted in the range of 90 to 360 degrees and the product (Δnd) of both index of refractive anisotropy (Δn) and cell gap (d) of the cylindrical shape mesomorphism molecular is in the range of 300 to 1500 nm. Regarding the optical compensatory sheet used for the STN type liquid crystal display device, JP-A No. 2000-105316 discloses in detail.

(VA Type Liquid Crystal Display Device)

The optical film of the present invention (especially, cellulose acylate optical film) can be used as the support for optical compensatory sheet of VA type liquid crystal display device having the liquid crystal cell of VA mode. It is preferable that Re retardation value of the optical compensatory film used for the VA type liquid crystal display device is 0 to 150 nm, and Rth retardation value thereof is 70 to 400 nm. Re retardation value is more preferably 20 to 70 nm. When two optically anisotropic polymer films are used for the VA type liquid crystal display device, the Rth retardation value of the film is preferably 70 to 250 nm. When one optically anisotropic polymer film is used for the VA type liquid crystal display device, the Rth retardation value of the film is preferably 150 to 400 nm. The VA type liquid crystal display device may be aligned as described in JP-A No. 10-123576.

(IPS Type Liquid Crystal Display Device and ECB Type Liquid Crystal Display Device)

The optical film of the present invention (especially, cellulose acylate optical film) can be used as the support for optical compensatory sheet or the protection film of the polarizing plate of IPS type liquid crystal display device having liquid crystal cell of IPS mode or of ECB type liquid crystal display device having the liquid crystal cell of ECB mode. According to these modes, the liquid crystal materials are arranged to be substantially parallel to each other during black display, and when applying no voltage, the liquid crystal molecules are aligned parallel to the substrate to perform black display. Therefore, the polarizing plate using the optical film of this invention shows an improved color, a wider viewing angel, and high contrast. According to this example, among the protection film of the polarizing plates on and below the liquid crystal cell, the polarizing plates that use the optical film of this invention is preferably used for at least one protection film (that faces the cell) disposed between the liquid cell and the polarizing plate. It is more preferable to dispose an optically anisotropic layer between the protection film of the polarizing plate and the liquid cell to make the retardation value of the optically anisotropic layer two times large than the value of Δn·d of liquid crystal layer.

(OCB Type Liquid Crystal Display Device and HAN Type Liquid Crystal Display Device)

The optical film of the present invention (especially, cellulose acylate optical film) can be used as the support for optical compensatory sheet of OCB type liquid crystal display device having liquid crystal cell of OCB mode or of HAN type liquid crystal display device having the liquid crystal cell of HAN mode. It is preferable for the optical compensatory sheet used for OCB type liquid crystal display device or HAN type liquid crystal display device that the direction that magnitude of retardation becomes minimum exists neither in the optical compensatory sheet nor in its normal direction. Optical property of the optical compensatory sheet used for the OCB type liquid crystal display device or for the HAN type liquid crystal display device is also determined by the optical property of the optically anisotropic layer, by the optical property of the support and by the arrangement between the optically anisotropic layer and the support. Regarding the optical compensatory sheet used for the OCB type liquid crystal display device or HAN type liquid crystal display device, JP-A No. 9-197397 discloses in detail. In addition, paper by Mori and other (Jpn. J. Appl. Phys. Vol. 38 (1999) p. 2837) describes about it.

(Reflective Liquid Crystal Display Device)

The optical film of the present invention (especially, cellulose acylate optical film) can be used as the optical compensatory sheet of TN kind, STN kind, HAN kind, GH (Guest-Host) kind reflective liquid crystal display device. These display modes are well known for a long time. Regarding the TN kind reflective liquid crystal display device, JP-A No. 10-123478, WO 98/48320, and Japanese Patent No. 3022477 describes about it. The optical compensatory sheet that is used in the reflective liquid crystal display device is described in pamphlet of WO 00/65384.

(The Other Liquid Crystal Display Device)

The optical film of this invention is effective in a support of an optical compensatory sheet of ASM type liquid crystal display device with ASM (Axially Symmetric Aligned Microcell) mode liquid crystal cell. The thickness of the ASM mode liquid crystal cell is maintained by a resin spacer that is capable of adjusting the distance. The other properties are same as the TN mode liquid crystal cell. Regarding the ASM mode liquid crystal cell and the ASM type liquid crystal display device, paper of Kume and other (Kume et al., SID98 Digest 1089 (1998)) describes in detail.

The characteristics of the present invention will be described in detail with reference to the following Examples and Comparative Examples. The materials, the amounts to be used, the proportions, the treatment specifications, the treatment orders, or the like in the following Examples can be modified without departing from the subject matters of the present invention. Thus, the scope of the present invention is not intended to be limited to the following Examples.

Example 1

(1) Preparation of Dope for Inner Layer

The composition as described in Table 3 was introduced to a mixing tank, and stirred under heating to dissolve each component, and thus to prepare Dopes T-1 to T-11 for an inner layer.

TABLE 3

| Cellulose acylate solution | Solvent Methylene chloride Amount | Solvent Methanol Amount | Main component of layer Cellulose acetate Degree of substitution | Main component of layer Cellulose acetate Amount | Organic compound with molecular weight of 1000 or less Triphenyl phosphate Amount | Organic compound with molecular weight of 1000 or less Biphenyldiphenyl phosphate Amount | Retardation regulating agent Kind | Retardation regulating agent Amount | Retardation regulating agent ClogP | Ultraviolet absorber Kind | Ultraviolet absorber Amount | Ultraviolet absorber ClogP |
|---|---|---|---|---|---|---|---|---|---|---|---|---|
| T-1 | 300 | 40 | 2.60 | 100 | 7.8 | 3.9 | No. 13-14 | 2.0 | 10.2 | — | — | — |
| T-2 | 300 | 40 | 2.86 | 100 | 7.8 | 3.9 | No. 13-14 | 2.0 | 10.2 | — | — | — |
| T-3 | 300 | 40 | 2.94 | 100 | 7.8 | 3.9 | No. 13-14 | 2.0 | 10.2 | — | — | — |
| T-4 | 300 | 40 | 2.60 | 100 | 7.8 | 3.9 | No. 13-14 | 2.0 | 10.2 | UV102 | 1.0 | 4.6 |
| T-5 | 300 | 40 | 2.60 | 100 | 7.8 | 3.9 | No. 13-14 | 2.0 | 10.2 | — | — | — |
| T-6 | 300 | 40 | 2.86 | 100 | 7.8 | 3.9 | No. 13-14 | 2.0 | 10.2 | UV102 | 1.0 | 4.6 |
| T-7 | 300 | 40 | 2.86 | 100 | 7.8 | 3.9 | No. 13-14 | 2.0 | 10.2 | — | — | — |
| T-8 | 300 | 40 | 2.86 | 100 | 7.8 | 3.9 | No. 13-14 | 2.0 | 10.2 | UV102 | 1.0 | 4.6 |
| T-9 | 300 | 40 | 2.86 | 100 | 7.8 | 3.9 | No. 13-19 | 2.0 | 13.4 | — | — | — |
| T-10 | 300 | 40 | 2.86 | 100 | 7.8 | 3.9 | No. 13-19 | 2.0 | 13.4 | UV102 | 1.0 | 4.6 |
| T-11 | 300 | 40 | 2.86 | 100 | 7.8 | 3.9 | No. 13-19 | 2.0 | 13.4 | — | — | — |

(Note) The unit of the amount is part by mass (2) Preparation of Dope for Outer Layer 20 parts by mass of silica particles as described in Table 4 (manufactured by Nippon Aerosil), and 80 parts by mass of methanol were mixed under stirring for 30 minutes to obtain a silica fine particle dispersion.

TABLE 4

| Cellulose acylate solution | Inorganic fine particles Kind | Inorganic fine particles Amount | Inorganic fine particles ClogP |
|---|---|---|---|
| S-1 | R-972 | 0.16 | 67 |
| S-2 | R-972 | 0.16 | 67 |
| S-3 | R-972 | 0.16 | 67 |
| S-4 | R-972 | 0.16 | 67 |
| S-5 | R-972 | 0.16 | 67 |
| S-6 | R-972 | 0.16 | 67 |
| S-7 | R-972 | 0.16 | 67 |
| S-8 | R-812 | 0.16 | 33 |
| S-9 | R-812 | 0.16 | 33 |
| S-10 | R-972 | 0.16 | 67 |
| S-11 | R-972 | 0.16 | 67 |

(Note)
The amount denotes parts by mass, relative to 100 parts by mass of cellulose acylate in a dope.

The obtained silica fine particle dispersion was introduced with the following components, and the mixture was stirred for 30 minutes or longer to dissolve each component, and thus to prepare Dopes S-1 to S-11 for an outer layer.

<Composition of dope for outer layer>

| | |
|---|---|
| Silica fine particle dispersion | 10.0 parts by mass |
| Methylene chloride (First solvent) | 76.3 parts by mass |
| Methanol (Second solvent) | 3.4 parts by mass |
| Cellulose acylate solution (T-2) | 10.3 parts by mass |

(3) Filtration

The obtained each dope for the outer layer was filtered using a filter with an absolute filtration precision of 0.0025 mm (FHO25, manufactured by Pole) at 50° C. Similarly, each dope for the inner layer was filtered using a filter with an absolute filtration precision of 0.01 mm (#63, manufactured by Toyo Filter Co., Ltd.).

(4) Co-Casting

These dopes were set such that by means of a co-casting process using a 3-layer co-casting die, a dope T-1 for an inner layer is in the inside, and a dope S-1 for an outer layer S-1 is in the both outsides, and simultaneously discharged on a metal support to perform a double-layer casting. At this time, the co-casting was performed under the settings such that the thickness of the inner layer after drying was 100 μm and the thickness of the outer layer was 5 μm. Then, the cast film was dried at 70° C. for 3 minutes, and then at 120° C. for 5 minutes, and peeled from the support. The peeled film was tenter-stretched at a stretch ratio of 20% in an axial direction, and then stepwise dried at 130° C. for 30 minutes to evaporate the solvent, thus preparing a cellulose acetate film CAT-1. In the same manner, films CAT-9 to 11 (thickness: 92 μm) were obtained. The amount of the remaining solvent was 0.5% by mass relative to the prepared film.

Comparative Example 1

(1) Preparation of Cellulose Acylate Solution A

The following composition was introduced to a mixing tank, and stirred under heating to dissolve each component, and thus to prepare a cellulose acylate solution A.
<Composition of Cellulose Acylate Solution A>

Cellulose acylate with degree of substitution 2.86 100 parts by mass Triphenyl phosphate (plasticizer) 7.8 parts by mass Biphenyldiphenyl phosphate (plasticizer) 3.9 parts by mass Methylene chloride (First solvent) 402.0 parts by mass Methanol (Second Solvent) 60.0 parts by mass

TABLE 5

| Cellulose acylate solution | Solvent | | Main component of layer Cellulose acetate | | Organic compound with molecular weight of 1000 or less | | | | |
|---|---|---|---|---|---|---|---|---|---|
| | Methylene chloride Amount | Methanol Amount | Degree of substitution | Amount | Triphenyl phosphate Amount | Biphenyldiphenyl phosphate Amount | Retardation regulating agent | | |
| | | | | | | | Kind | Amount | ClogP |
| T-12 | 300 | 40 | 2.60 | 100 | 7.8 | 3.9 | Compound A | 5.0 | 8.5 |
| T-13 | 300 | 40 | 2.86 | 100 | 7.8 | 3.9 | Compound A | 5.0 | 8.5 |
| T-14 | 300 | 40 | 2.94 | 100 | 7.8 | 3.9 | Compound A | 5.0 | 8.5 |
| T-15 | 300 | 40 | 2.60 | 100 | 7.8 | 3.9 | No. 13-14 | 2.0 | 10.2 |
| T-16 | 300 | 40 | 2.60 | 100 | 7.8 | 3.9 | No. 13-14 | 2.0 | 10.2 |
| T-17 | 300 | 40 | 2.86 | 100 | 7.8 | 3.9 | No. 13-14 | 2.0 | 10.2 |
| T-18 | 300 | 40 | 2.86 | 100 | 7.8 | 3.9 | No. 13-14 | 2.0 | 10.2 |
| T-19 | 300 | 40 | 2.86 | 100 | 7.8 | 3.9 | No. 13-14 | 2.0 | 10.2 |
| T-20 | 300 | 40 | 2.86 | 100 | 7.8 | 3.9 | No. 13-14 | 2.0 | 10.2 |
| T-21 | 300 | 40 | 2.86 | 100 | 7.8 | 3.9 | No. 13-19 | 2.0 | 13.4 |
| T-22 | 300 | 40 | 2.86 | 100 | 7.8 | 3.9 | No. 13-19 | 2.0 | 13.4 |

| Cellulose acylate solution | Organic compound with molecular weight of 1000 or less Ultraviolet absorber | | | Inorganic fine particles Silica | | |
|---|---|---|---|---|---|---|
| | Kind | Amount | ClogP | Kind | Amount | MW |
| T-12 | — | — | — | R-972 | 0.16 | 67 |
| T-13 | — | — | — | R-972 | 0.16 | 67 |
| T-14 | — | — | — | R-972 | 0.16 | 67 |
| T-15 | — | — | — | R-972 | 0.16 | 67 |
| T-16 | UV102 | 1.0 | 4.6 | R-972 | 0.16 | 67 |
| T-17 | — | — | — | R-972 | 0.16 | 67 |
| T-18 | UV102 | 1.0 | 4.6 | R-972 | 0.16 | 67 |
| T-19 | — | — | — | R-812 | 0.16 | 33 |
| T-20 | UV102 | 1.0 | 4.6 | R-812 | 0.16 | 33 |
| T-21 | — | — | — | R-972 | 0.16 | 67 |
| T-22 | UV102 | 1.0 | 4.6 | R-972 | 0.16 | 67 |

(Note) The unit of the amount is part by mass.

Compound A (Retardation Regulating Agent)

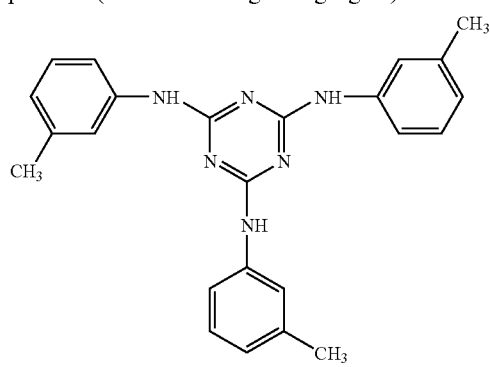

(2) Preparation of Additive Solution B

The following composition was introduced to a separate mixing tank, and stirred under heating to dissolve each component, and thus to prepare an additive solution B.

<Composition of Additive Solution B>

Methylene chloride (First solvent) 80 parts by mass

Methanol (Second Solvent) 20 parts by mass

Retardation regulating agent and ultraviolet absorber (refer to Table 5) 30 parts by mass (3) Preparation of Inorganic Fine Particle Dispersion C 20 parts by mass of inorganic fine particles as described in Table 5 (silica particles manufactured by Nippon Aerosil), and 80 parts by mass of methanol were mixed under stirring for 30 minutes to obtain a silica fine particle dispersion. The silica fine particle dispersion was introduced to a dispersing machine with the following components, and the mixture was stirred for 30 minutes or longer to dissolve each component, and thus to prepare inorganic fine particle dispersion C (matting agent dispersion).

<Composition of Inorganic Fine Particle Dispersion C>

Silica fine particle dispersion 10.0 parts by mass

Methylene chloride (First solvent) 76.3 parts by mass

Methanol (Second solvent) 3.4 parts by mass

Cellulose acylate solution A 10.3 parts by mass (4) Dope Preparation and Casting 10 parts by mass of the inorganic fine particle dispersion C was added to 20 parts by mass of the additive solution B, and the mixture was stirred, and then added to 477 parts by mass of a cellulose acetate solution A. The mixture was sufficiently stirred to prepare dopes T-12 to 22. The dope was cast on the band which had been cooled to 10° C. from the casting opening. It was peeled at a solvent content of 50% by mass, and the resultant was tenter-stretched under maintaining the gap of a stretch ratio of 1.08 in the transverse direction (perpendicular to the machine direction) at a solvent content of 5 to 40% by mass, and then dried. Then, after dividing whether it would be dried, as it is or alignment, heat treatment at 135° C. would be performed, and it was returned between the rolls of the heat treatment device and further dried to prepare cellulose acetate film samples CAT-12 to 22 having the thickness of 80 μm.

Test Example 1

As for the produced cellulose acetate film (CAT-1 to 22), Re retardation value and Rth retardation value is measured at a wavelength of 550 nm by using an ellipsometer (M-150, manufactured by JASCO corporation). The haze is measured using a sample of the cellulose acylate film of the invention cut into the size of 40 mm×80 mm by hazemeter (HGM-2DP, manufactured by Suga test instruments Co., Ltd.) under the condition of 25° C. and 60% RH according to JIS K-6714. The results are shown in Table 6.

TABLE 6

| Cellulose acylate film | Re | Rth | Haze | Note |
|---|---|---|---|---|
| CAT-1 | 45 | 156 | 0.34 | This Invention |
| CAT-2 | 73 | 187 | 0.36 | This Invention |
| CAT-3 | 92 | 206 | 0.33 | This Invention |
| CAT-4 | 50 | 176 | 0.36 | This Invention |
| CAT-5 | 43 | 159 | 0.35 | This Invention |
| CAT-6 | 81 | 195 | 0.36 | This Invention |
| CAT-7 | 76 | 188 | 0.38 | This Invention |
| CAT-8 | 82 | 198 | 0.41 | This Invention |
| CAT-9 | 85 | 103 | 0.32 | This Invention |
| CAT-10 | 89 | 121 | 0.34 | This Invention |
| CAT-11 | 83 | 105 | 0.33 | This Invention |
| CAT-12 | 43 | 157 | 0.45 | Comparative Example |
| CAT-13 | 75 | 190 | 0.46 | Comparative Example |
| CAT-14 | 90 | 203 | 0.44 | Comparative Example |
| CAT-15 | 51 | 177 | 0.89 | Comparative Example |
| CAT-16 | 44 | 161 | 1.04 | Comparative Example |
| CAT-17 | 82 | 198 | 0.91 | Comparative Example |
| CAT-18 | 77 | 191 | 1.06 | Comparative Example |
| CAT-19 | 84 | 200 | 1.21 | Comparative Example |
| CAT-20 | 86 | 104 | 1.56 | Comparative Example |
| CAT-21 | 90 | 119 | 1.36 | Comparative Example |
| CAT-22 | 85 | 108 | 1.67 | Comparative Example |

As shown in Table 6, CAT-1 to 11 that produces a film using a co-casting method had a haze better than CAT-12 to 22 regardless of the kind of the additive or inorganic fine particles. Further, compared with CAT-12 to 22 that is produced by a conventional inorganic fine particle in-line adding method, it was confirmed that CAT-1 to 11 produced by the co-casting method does not change the retardation Re, Rth. That is, after measuring an in-plane retardation R0 of a film that is just produced, the film was left on a cell storage with a constant temperature and humidity at 60° C. and a relative humidity of 98% for 400 hours, and then the in-plane retardation R1 was re-measured. Thereby, a retardation property was evaluated on the basis of the rate of variability of the retardation R=(R0−R1)/R0(%). CAT-1 to 11 shows a preferable result under the condition of the rate of variability R<1%.

According to the conventional method, in CAT-19 to 20 that uses a hydrophobic additive, or CAT-21 to 22 that uses hydrophobic inorganic fine particles, the degradation of haze is remarkable. On the contrary, CAT-9 to 10, CAT-11 to 12 according to the invention can restrict the haze to have a low value.

Example 2

Alkali Saponification Treatment

The following alkali saponification treatment was performed on the produced film sample CAT-1 to 22.

The produced stretched film sample was dipped in 1.5 mol/L aqueous sodium hydroxide at 55° C. for 2 minutes. The sample was cleansed in a water washing bath at room temperature, and then neutralized by using a sulfuric acid of 0.05 mol/L at 30° C. Once more, the sample was cleansed in the water washing bath at room temperature, and then dried by a hot air of 100° C. With this process, a sample in which a surface of the cellulose acylate film is alkali-safonificated was produced.

<Production of Polarizing Plate>

Using the optical compensatory film sample 1 to 22 that has been alkali-safonificated, a polarizing plate was produced. That is, an adhesive coating solution of 20 ml/m² was applied on a surface of the cellulose acylate film of the optical compensatory film that the film treatment is completed, and then was dried at 100° C. for 5 minutes to complete a sample of a film with an adhesion.

Subsequently, a roll polyvinylalcohol film with a thickness of 80 μm is continuously five times stretched in aqueous iodine, and then dried to obtain a polarizing film with a thickness 30 μm. Referring to FIG. 1, in the samples 1 to 22 of the optical compensatory film 4 with an adhesion, a polarizing film 3 was bonded onto a surface on which an adhesion is applied, and a commercially available cellulose acetate film 2 (FUJITAC TD80UF, manufactured by Fuji Photo Film Co., Ltd., Re value is 3 nm and Rth value is 50 nm) was similarly bonded on another surface of the polarizing film 3 to produce a sample of a polarizing plate with an optical compensatory film 4.

Example 3

With a cell gap between the substrate of 3.6 μm, a liquid crystal material having a negative refractive anisotropy ("MLC6608", manufactured by Merck Ltd.) is dripped and injected between the substrate, sealed them and a liquid crystal layer between the substrates is formed to produce a liquid crystal cell. The retardation of the liquid crystal layer (that is, a product Δn·d of a thickness d (μm) of the liquid crystal layer and the refractive anisotropy Δn) was 275 nm. Further, the liquid crystal material is vertically aligned.

Using the produced liquid crystal cell, the liquid crystal display device shown in FIG. 1 was manufactured. That is, an upper polarizing plate 6, a liquid crystal cell 5 of VA mode (upper substrate, liquid crystal layer, lower substrate), a lower polarizing plate (cellulose acetate film 2, polarizing film 3, optical compensatory film 4) were laminated in this order from a viewing direction 1 (upper). A backlight source is further disposed. A commercially available super high contrast product (HLC-5618 manufactured by SANRITZ CORPORATION) and a polarizing plate produced in Example 2 were bonded as the upper polarizing plate, and the lower polarizing plate at the viewer side and the backlight side, respectively by using the adhesion so as to make the optical compensatory sheet 4 (CAT-1 to 11) face the liquid crystal cell 5, and then a liquid crystal display device was manufactured. A cross Nicole is arranged so that the transmission axis of the polarizing plate at the viewer side is longitudinal direction, and the transmission axis of the polarizing plate at the backlight side is transverse direction.

Test Example 2

Regarding the liquid crystal display device produced in Example 2, under a condition of 30° C., a relative humidity of 80%, front color change immediately after lighting and after lighting for 500 hours is measured by Ezcontrast manufactured by ELDIM to calculate a contrast, and absolute values Δx and Δy of color change on an xy chromaticity diagram. The results are shown in Table 7.

TABLE 7

| Cellulose acylate film | Contrast | Δx | Δy | Note |
|---|---|---|---|---|
| CAT-1 | 945 | 0.03 | 0.02 | This Invention |
| CAT-2 | 943 | 0.02 | 0.02 | This Invention |
| CAT-3 | 945 | 0.02 | 0.03 | This Invention |
| CAT-4 | 940 | 0.01 | 0.02 | This Invention |
| CAT-5 | 945 | 0.01 | 0.01 | This Invention |
| CAT-6 | 940 | 0.02 | 0.01 | This Invention |
| CAT-7 | 938 | 0.03 | 0.03 | This Invention |
| CAT-8 | 924 | 0.01 | 0.01 | This Invention |
| CAT-9 | 950 | 0.02 | 0.02 | This Invention |
| CAT-10 | 947 | 0.01 | 0.01 | This Invention |
| CAT-11 | 944 | 0.02 | 0.03 | This Invention |
| CAT-12 | 912 | 0.07 | 0.06 | Comparative Example |
| CAT-13 | 917 | 0.06 | 0.06 | Comparative Example |
| CAT-14 | 916 | 0.06 | 0.07 | Comparative Example |
| CAT-15 | 868 | 0.05 | 0.06 | Comparative Example |
| CAT-16 | 834 | 0.05 | 0.05 | Comparative Example |
| CAT-17 | 878 | 0.06 | 0.05 | Comparative Example |
| CAT-18 | 833 | 0.07 | 0.07 | Comparative Example |
| CAT-19 | 798 | 0.05 | 0.05 | Comparative Example |
| CAT-20 | 777 | 0.06 | 0.06 | Comparative Example |
| CAT-21 | 789 | 0.05 | 0.05 | Comparative Example |
| CAT-22 | 746 | 0.06 | 0.07 | Comparative Example |

As shown in Table 7, a liquid crystal display device with CAT-1 to 11 that produces a film by a co-casting method has a better contrast than CAT-12 to 22 regardless of the kind of additive or inorganic fine particles. Further, compared with CAT-12 to 22 produced by a conventional inorganic fine particle inline adding method, in CAT-1 to 11 produced by the co-casting method, the color change Δx and Δy are not deteriorated.

According to the convention method, in the liquid crystal display device in which CAT-19 to 20 using the hydrophobic additive and CAT-21 to 22 using the hydrophobic fine particles are bonded to each other, the contrast is significantly degraded. On contrast, the liquid crystal display device according to this invention in which CAT-9 to 10 and CAT-11 to 12 are bonded to each other has no contrast degradation and excellent visibility.

The optical film according to this invention has low haze regardless of containing an additive and inorganic fine particles formed of organic compounds, and high contrast when being assembled into the liquid crystal display device. Further, according to the manufacturing method of this invention, it is possible to efficiently manufacture the optical film with the above excellent properties. Therefore, according to this invention, it is further possible to provide an optical compensatory film and a polarizing film with an excellent optical property, and a liquid crystal display device with high contrast. As a result, the industrial applicability of this invention is high.

The present disclosure relates to the subject matter contained in Japanese Patent Application No. 197913/2005 filed on Jul. 6, 2005, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An optical film comprising: a first layer comprising an organic compound; and a second layer comprising inorganic fine particles wherein a content of an organic compound having a molecular weight of 1000 or less of the second layer is 30% by mass or less based on a content of the inorganic fine particles of the second layer, wherein the organic compound of the first layer comprises a retardation regulating agent represented by the following Formula (1):

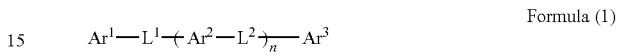

Formula (1)

wherein $Ar^1$ and $Ar^3$ each independently represent an aryl group or an aromatic heterocyclic group, $Ar^2$ represents an arylene group or a divalent aromatic heterocyclic group, $L^1$ and $L^2$ each independently represent a single bond or a divalent linking group, n represents an integer of 3 or more, $Ar^2$'s may be the same or different from each other, and $L^2$'s may be the same or different from each other, and the molecular weight of the retardation regulating agent represented by Formula (1) is 1000 or less.

2. The optical film according to claim 1, wherein the optical film is produced by discharging the following two solutions from different dies for casting: a first solution comprising the organic compound, and a second solution comprising inorganic fine particles wherein a content of an organic compound having a molecular weight of 1000 or less of the second solution is 30% by mass or less based on a content of the inorganic fine particles of the second solution.

3. The optical film according to claim 1, wherein the inorganic fine particles comprise silicon.

4. The optical film according to claim 1, wherein methanol wettability (MW) of the inorganic fine particles satisfies the following Equation (B):

$$0 \leq MW \leq 80 \qquad (B).$$

5. The optical film according to claim 1, wherein a primary particle size of the inorganic fine particles is 100 nm or less.

6. The optical film according to claim 1, wherein a component constituting the film is cellulose acylate.

7. The optical film according to claim 1, wherein the layer containing the inorganic fine particles is disposed as an outermost layer.

8. An optical compensatory film comprising the optical film according to claim 1.

9. A polarizing plate comprising a polarizer and two protective films disposed on both sides of the polarizer, wherein at least one protective film is the optical film according to claim 1.

10. A liquid crystal display comprising a liquid crystal cell and two polarizing plates disposed on both sides of the liquid crystal cell, wherein at least one polarizing plate is the polarizing plate according to claim 9.

11. A method of producing an optical film comprising: discharging a first solution comprising an organic compound, and a second solution containing inorganic fine particles in which a content of an organic compound having a molecular weight of 1000 or less is 30% by mass or less based on a content of the inorganic fine particles of the second solution, from different dies for casting, wherein the organic com pound of the first solution comprises a retardation regulating agent represented by the following Formula (1):

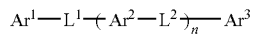 Formula (1)

wherein $Ar^1$ and $Ar^3$ each independently represent an aryl group or an aromatic heterocyclic group, $Ar^2$ represents an arylene group or a divalent aromatic heterocyclic group, $L^1$ and $L^2$ each independently represent a single bond or a divalent linking group, n represents an integer of 3 or more, $Ar^2$'s may be the same or different from each other, and $L^2$'s may be the same or different from each other, and the molecular weight of the retardation regulating agent represented by Formula (1) is 1000 or less.

12. The method according to claim 11, further comprising:
stretching the film produced by the casting.

13. An optical film produced by the method according to claim 11.

* * * * *